United States Patent [19]
Momose et al.

[11] Patent Number: 5,483,446
[45] Date of Patent: Jan. 9, 1996

[54] METHOD AND APPARATUS FOR ESTIMATING A VEHICLE MANEUVERING STATE AND METHOD AND APPARATUS FOR CONTROLLING A VEHICLE RUNNING CHARACTERISTIC

[75] Inventors: Nobuo Momose; Masayoshi Ito; Hiroaki Yoshida; Masanori Tani, all of Okazaki; Yoshiaki Sano, Anjo; Masahito Taira, Okazaki; Takashi Tejima, Toyota, all of Japan

[73] Assignee: Mitsubishi Jidosha Kogyo Kabushiki Kaisha, Tokyo, Japan

[21] Appl. No.: 288,034

[22] Filed: Aug. 10, 1994

[30] Foreign Application Priority Data

Aug. 10, 1993 [JP] Japan ................................. 5-198188
Dec. 29, 1993 [JP] Japan ................................. 5-351804

[51] Int. Cl.⁶ ........................................... G06F 17/00
[52] U.S. Cl. ............................. 364/424.01; 395/905
[58] Field of Search ........................... 364/424.01, 436, 364/424.05, 426.01, 554, 431.04; 395/905

[56] References Cited

U.S. PATENT DOCUMENTS

| | | | |
|---|---|---|---|
| 4,747,055 | 5/1988 | Eto et al. | 364/424 |
| 5,182,710 | 1/1993 | Tomisawa | 364/424.1 |
| 5,189,621 | 2/1993 | Onari et al. | 364/431.04 |
| 5,285,523 | 2/1994 | Takahashi | 395/22 |
| 5,361,213 | 11/1994 | Fujieda et al. | 364/431.08 |

FOREIGN PATENT DOCUMENTS 5-185947  7/1993  Japan.

*Primary Examiner*—Michael Zanelli

[57] ABSTRACT

An apparatus for estimating a vehicle maneuvering state and controlling a vehicle running characteristic includes a controller having a fuzzy estimating function and a neural network function. The controller carries out frequency analysis on vehicle driving parameters such as vehicle speed, steering angle, opening degree of an accelerator, and longitudinal acceleration and lateral acceleration of a vehicle, to thereby determine a mean value and variance of each parameter. It implements fuzzy inference based on a traveling time ratio, an average speed, and an average lateral acceleration, which are obtained from vehicle speed and/or steering angle, to thereby calculate road traffic condition parameters, including a city area degree, a jammed road degree, and a mountainous road degree. According to the neural network function, the controller further determines an output parameter, indicative of the vehicle maneuvering state, by subjecting the mean value and variance of the vehicle driving parameters and the weighted total sum of the road traffic condition parameters to nonlinear conversion. Then, it variably controls the operating characteristic of a vehicle-mounted apparatus such as a rear-wheel steering controlling unit in accordance with the output parameter, thereby variably controlling the vehicle running characteristic.

36 Claims, 35 Drawing Sheets

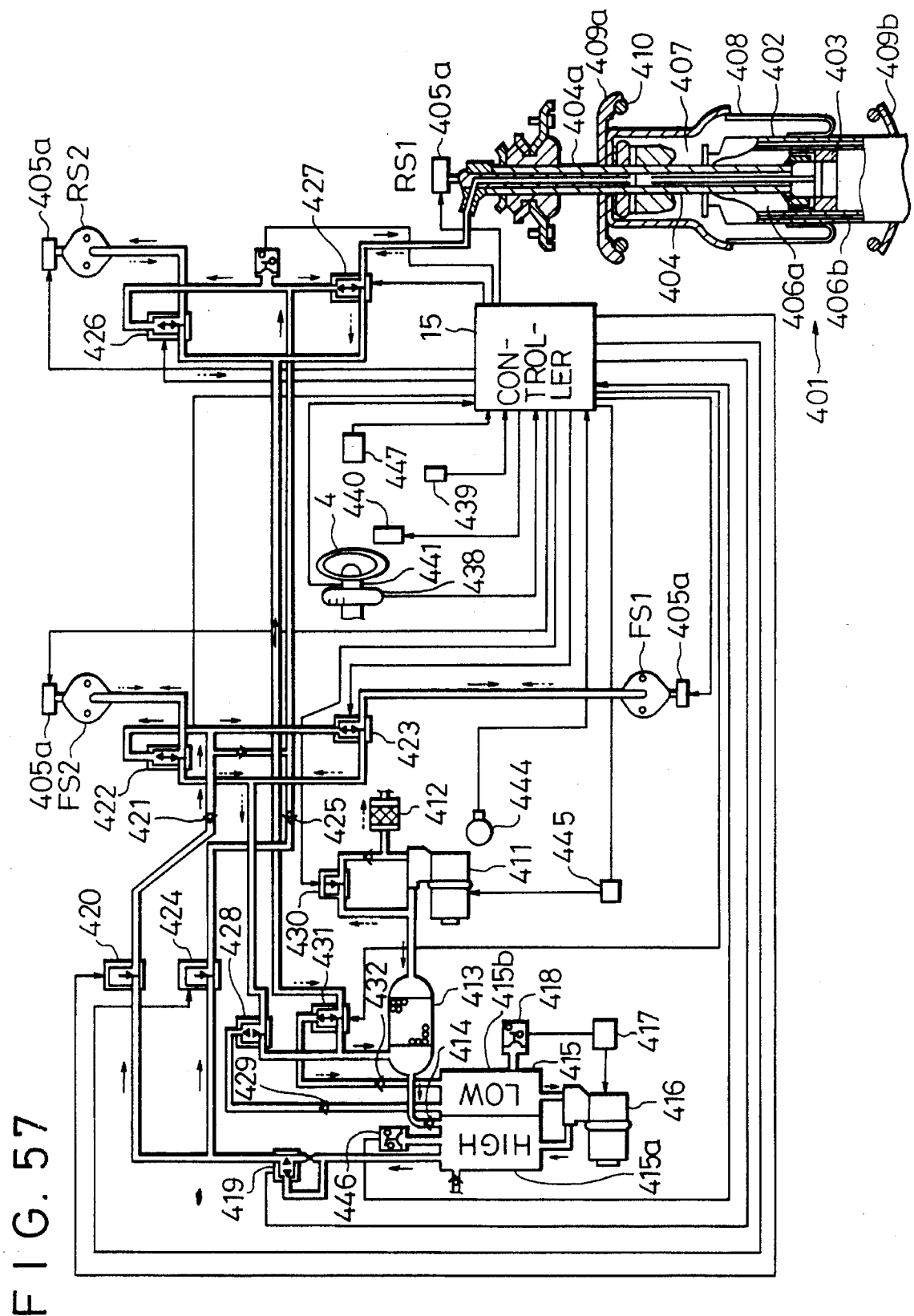

1

METHOD AND APPARATUS FOR ESTIMATING A VEHICLE MANEUVERING STATE AND METHOD AND APPARATUS FOR CONTROLLING A VEHICLE RUNNING CHARACTERISTIC

BACKGROUND OF THE INVENTION

1. Field of the Invention

The present invention relates to a method and apparatus for estimating a vehicle maneuvering state given by a driver, and a method and apparatus for controlling the running characteristic of a vehicle to adapt the same to the vehicle maneuvering state estimated by the aforementioned estimating method and apparatus.

2. Description of the Related Art

A vehicle is equipped with various apparatuses to improve the traveling stability, maneuverability, riding comfort, etc. of the vehicle.

For instance, a vehicle is provided with an electronic fuel supply controller to optimally control the quantity of fuel supplied to an engine in accordance with the vehicle running state represented by a vehicle speed, the opening degree of an accelerator pedal, etc., an automatic transmission for selecting a gearshift position optimum for the current vehicle running state, and an anti-skid brake system for providing optimum braking power. The vehicle is further equipped with a traction control system for ensuring an optimum slip ratio of driving wheels, a four-wheel steering system for steering rear wheels in the case of turning front-wheels, an active suspension system for variably changing suspension characteristics, and an electric power steering for variably adjusting the steering power.

The vehicle provided with the aforementioned systems features high maneuverability and running stability, and satisfies to a great extent the performance required of a vehicle.

Nevertheless, the driving capability and the inclination in driving vary from one person to another; therefore, the running characteristic required of a vehicle accordingly vary from one driver to another. Moreover, a driver does not constantly require the same vehicle running characteristic. For example, the vehicle running characteristic required by the same driver may vary, depending on whether the driver is driving in an urban area or a mountainous area, or they may vary from day to day.

On the other hand, conventionally, the systems, mounted on the vehicle for controlling the vehicle running characteristic, are operated in accordance with the vehicle driving state indicated by physical quantities such as the vehicle speed and the opening degree of the accelerator. This sometimes makes it difficult to achieve the vehicle running characteristic required by individual drivers.

An apparatus for recognizing the vehicle driving state is also publicly known through unexamined Japanese patent publication no. 2-267030, for instance, which corresponds to U.S. Pat. No. 5,182,710 and European patent application no. 391387. In these publications, the driving state is determined based on the frequency distribution of a plurality of driving parameters, including the opening degree of a throttle valve and engine speed. In other words, based on the plurality of driving parameters, factor analysis is carried out to recognize and determine the driving state such as congested traffic driving, urban area driving, high-speed driving, and sports driving. Based on the recognition result, optimum vehicle control is carried out.

In this publicly known example, however, the frequency-distribution-related parameters only include mean values. This leads to insufficient reliability in the driving state determining result. Moreover, the driving state (sports driving) is determined at the same level as traffic conditions; therefore, it is difficult to determine a proper driving state, i.e., a driver's intent, in response to changes in the traffic conditions.

SUMMARY OF THE INVENTION

An object of the present invention is to provide a vehicle maneuvering state estimating method and apparatus for estimating a maneuvering state of a vehicle given or intended by a driver, the maneuvering state being difficult to be indicated directly by physical quantities, including vehicle speed.

Another object of the present invention is to provide a vehicle running characteristic controlling method and apparatus for controlling a vehicle running characteristic so as to be optimum for the vehicle maneuvering state, which has been estimated by the aforesaid estimating method and apparatus, thereby enabling vehicle drive suited to an overall vehicle driving state, which includes the vehicle maneuvering state intended by the driver and road traffic conditions.

A vehicle maneuvering state estimating method according to a first aspect of the present invention comprises the steps of (a) detecting a plurality of vehicle driving parameters, (b) carrying out a frequency analysis on each of the vehicle driving parameters, and (c) estimating a vehicle maneuvering state intended by a driver based on results of the frequency analyses. The step (b) includes determining a frequency distribution of each vehicle driving parameter, and determining a plurality of types of analysis values for each vehicle driving parameter. These analysis values characterize the frequency distribution. The step (c) includes outputting an output parameter, which indicates a vehicle maneuvering state, based on a weighted sum total of input parameters with use of the plurality of types of analysis values for each vehicle driving parameter, as the input parameters.

According to this estimating method, it is possible to estimate a vehicle maneuvering state such as driver's sportiness in driving the vehicle, which is difficult to be indicated directly in terms of vehicle speed or other physical quantities.

Preferably, the step (b) includes the determination of the mean value and variance of the frequency distribution of each vehicle driving parameter, as the plurality of types of analysis values.

According to the preferred embodiment of the invention, the vehicle maneuvering state can be properly estimated.

A vehicle maneuvering state estimating method according to a second aspect of the present invention comprises the steps of (a) detecting a plurality of vehicle driving parameters, (b) carrying out frequency analysis on each of the plurality of the vehicle driving parameters, (c) estimating a vehicle maneuvering state intended by a driver according to results of frequency analyses, and (d) outputting at least one estimated value, which indicates a road traffic condition when a vehicle is traveling. The step (b) includes the determination of the frequency distribution of each vehicle driving parameter, and the determination of at least one analysis value for each vehicle driving parameter. The analysis value characterizes the frequency distribution. The step (c) includes outputting an output parameter, which indicates the vehicle maneuvering state, based on a weighted sum total input parameters, with use of the estimated value of the road traffic condition and the analysis value for each vehicle driving parameter, as the input parameters.

This estimating method makes it possible to estimate a vehicle maneuvering state intended by a driver, which state is difficult to be indicated directly by vehicle speed or other physical quantities. Further, in estimating the vehicle maneuvering state, influences exerted by road traffic conditions on the vehicle maneuvering state are reflected. This allows a further proper estimating result to be obtained.

Preferably, the step (b) includes the determination of the mean value or variance of the frequency distribution of each vehicle driving parameter, as the at least one analysis value. The step (d) includes outputting at least one estimated value based on detected values of vehicle traveling state parameters and a plurality of preset fuzzy rules or a map. The step (d) alternatively includes outputting, based on an average speed and a traveling time ratio, a city area degree and a road jam degree, as the at least one estimated value. Further alternatively, the step (d) includes outputting, based on an average lateral acceleration, a mountainous area degree as the at least one estimated value.

According to these preferred embodiments, a vehicle maneuvering state can be properly estimated, or a road traffic condition can be accurately determined. This permits accurate estimation of the vehicle maneuvering state.

In the first and second aspects of the present invention, the step (a) preferably includes the detection of the vehicle speed, the opening degree of an accelerator, and the longitudinal acceleration of the vehicle, as the plurality of vehicle driving parameters. The step (b) includes the determination of a frequency distribution by changing weight of a detected value of each vehicle driving parameter in dependence on an area into which the detected value falls. The step (c) includes the determination of an output parameter by applying the input parameters to a neural network. The step (c) alternatively includes the determination of a weighted total sum of the input parameters so that the output parameter indicates a degree of driving sportiness of the driver.

According to these preferred embodiments, the vehicle maneuvering state can be properly estimated, or the estimation of the vehicle maneuvering state can be made relatively easily.

A vehicle running characteristic controlling method according to a third aspect of the present invention comprises the step of (a) detecting a plurality of vehicle driving parameters, (b) carrying out frequency analysis on each of the plurality of the vehicle driving parameters, (c) estimating a vehicle maneuvering state intended by a driver based on results of the frequency analyses, and (d) variably controlling a running characteristic of a vehicle by variably controlling an operating characteristic of an apparatus mounted on the vehicle in accordance with the estimated vehicle maneuvering state. The step (b) includes the determination of a frequency distribution of each vehicle driving parameter, and the determination of a plurality of types of analysis values for each vehicle driving parameter. These analysis values characterize the frequency distribution. The step (c) includes the output of an output parameter, which indicates the vehicle maneuvering state, based on a weighted sum total of input parameters, with use of the plurality of types of analysis values for each vehicle driving parameter, as the input parameters.

According to this control method, the vehicle running characteristic can be controlled to meet an estimated vehicle maneuvering state. This permits vehicle drive suited to the overall vehicle driving state including the vehicle maneuvering state intended by the driver or road traffic conditions.

A vehicle running characteristic control method according to a fourth aspect of the present invention comprises the steps of (a) detecting a plurality of vehicle driving parameters, (b) carrying out frequency analysis on each of the plurality of vehicle driving parameters, (c) estimating a vehicle maneuvering state intended by a driver according to results of the frequency analyses, (d) variably controlling a running characteristic of a vehicle by variably controlling an operating characteristic of an apparatus mounted on the vehicle according to the vehicle maneuvering state, and (e) outputting at least one estimated value, which indicates a road traffic condition under which the vehicle is traveling. The step (b) includes the determination of the frequency distribution of each vehicle driving parameter, and the determination of a plurality of types of analysis values, which characterize the frequency distribution, for each vehicle driving parameter. The step (c) includes outputting an output parameter, indicating the vehicle maneuvering state, in accordance with a weighted total sum of the input parameters, with use of the at least one estimated value of the road traffic condition and the at least one analysis value for each vehicle driving parameter, as the input parameters.

According to this control method, the vehicle running characteristic can be controlled to meet the estimated vehicle maneuvering state, and moreover, a vehicle running characteristic required by an individual driver can be achieved in response to changes in road traffic conditions.

In the third and fourth aspects, preferably, the step (d) includes variably controlling an operating characteristic of a rear-wheel steering apparatus, which serves as the apparatus mounted on the vehicle and which sets a target rear-wheel steering angle by multiplying a detected value of a front-wheel steering state or a detected value of a vehicle behavior by a coefficient, by variably controlling the coefficient in accordance with the output parameter. Alternatively, the step (d) includes variably controlling a steering reaction force vs. vehicle speed characteristic of a power steering unit in accordance with the output parameter. The power steering unit serves as the apparatus mounted on the vehicle and changes a steering reaction force in accordance with vehicle speed. Alternatively, the step (d) includes variably setting a speed change map in accordance with the output parameter. This map is based on vehicle speed and throttle opening degree, and is provided on an automatic transmission which serves as the apparatus mounted on the vehicle. Further alternatively, the step (d) includes variably controlling an operating characteristic of a traction control unit, which serves as the apparatus mounted on the vehicle and which restricts an engine output to a target drive torque based on a turning state of the vehicle and also restricts a variation amount of the target drive torque to a predetermined amount, by changing the predetermined amount in accordance with the output parameter. Further alternatively, the step (d) includes switchingly controlling a damping power or a spring constant of a suspension unit in accordance with the output parameter. The suspension unit is of a variable damping power or variable spring constant type and serves as the apparatus mounted on the vehicle.

According to these preferred embodiments, the rear-wheel steering characteristic of the rear-wheel steering apparatus, the steering power characteristic of the power steering unit, the shift feeling of the automatic transmission, the operating characteristic of the traction control unit or the suspension unit can be controlled to adapt it to an estimated vehicle maneuvering state and road traffic conditions.

A vehicle maneuvering state estimating apparatus according to a fifth aspect of the present invention comprises a driving parameter detecting means for detecting a plurality of vehicle driving parameters, a frequency analyzing means for carrying out frequency analysis on each of the plurality of vehicle driving parameters, and a vehicle maneuvering state estimating means for estimating a vehicle maneuvering state intended by a driver according to results of frequency analyses. The frequency analyzing means is designed to determine a frequency distribution of each vehicle driving parameter and to determine a plurality of types of analysis values, characterizing the frequency distribution, for each vehicle driving parameter. The vehicle maneuvering state estimating means is designed to give an output parameter, indicating the vehicle maneuvering state, according to a weighted total sum of input parameters with use of the plurality of types of analysis values for each vehicle driving parameter as the input parameters.

Preferably, the frequency analyzing means is configured to determine the mean value and variance of the frequency distribution of each vehicle driving parameter as the plural types of analysis values.

A vehicle maneuvering state estimating apparatus according to a sixth aspect of the present invention comprises a driving parameter detecting means for detecting a plurality of vehicle driving parameters, a frequency analyzing means for carrying out frequency analysis on each of the plurality of vehicle driving parameters, a road traffic condition estimating means for outputting at least one estimated value, indicating a road traffic condition under which the vehicle is traveling, and a vehicle maneuvering state estimating means for estimating a vehicle maneuvering state intended by a driver according to results of frequency analyses. The frequency analyzing means is designed to determine a frequency distribution of each vehicle driving parameter and to determine at least one analysis value, characterizing the frequency distribution, for each vehicle driving parameter. The vehicle maneuvering state estimating means is designed to give an output parameter, indicating the vehicle maneuvering state, according to a weighted total sum input parameters, with use of the at least one estimated value of the road traffic condition and the at least one analysis value of each vehicle driving parameter, as the input parameters.

Preferably, the frequency analyzing means is designed to determine the mean value or variance of the frequency distribution on each vehicle driving parameter as the analysis value.

Preferably, the road traffic condition estimating means is designed to output the estimated value in accordance with detected values of vehicle traveling state parameters and a plurality of preset fuzzy rules or a map. Alternatively, the road traffic condition estimating means is designed to output a city area degree and a jammed road degree, as the at least one estimated value, in accordance with an average speed and a traveling time ratio. Further alternatively, the road traffic condition estimating means is configured to output a mountainous road, as the estimated value, according to an average lateral acceleration.

In the fifth and sixth aspects, preferably, the driving parameter detecting means is designed to detect the vehicle speed, the opening degree of the accelerator, and the longitudinal acceleration of the vehicle, as the plurality of vehicle driving parameters. The frequency analysis means is configured to determine the frequency distribution by changing the weight of a detected value of each vehicle driving parameter in dependence on an area into which the detected value falls. The vehicle maneuvering state estimating means is designed to determine an output parameter by supplying the input parameters to a neural network. Alternatively, the vehicle maneuvering state estimating means is designed to determine the weighted total sum of the input parameters so that the output parameter indicates the driving sportiness of the driver.

According to the vehicle maneuvering state estimating apparatus in accordance with the fifth or sixth aspect of the present invention or the preferred mode thereof, a corresponding one or ones of the aforementioned advantages, provided by the vehicle maneuvering state estimating methods of the first and second aspects and the preferred embodiments thereof, can be attained.

A vehicle running characteristic control apparatus according to a seventh aspect of the present invention comprises a driving parameter detecting means for detecting a plurality of vehicle driving parameters, a frequency analyzing means for carrying out frequency analysis on each of the plurality of vehicle driving parameters, a vehicle maneuvering state estimating means for estimating a vehicle maneuvering state intended by a driver according to results of the frequency analyses, and a characteristics controlling means for variably controlling a running characteristic of the vehicle, by variably controlling an operating characteristic of an apparatus mounted on the vehicle in accordance with the estimated vehicle maneuvering state. The frequency analyzing means is designed to determine a frequency distribution of each vehicle driving parameter and to determine a plurality of types of analysis values, characterizing the frequency distribution, for each vehicle driving parameter. The driving state estimating means is designed to give an output parameter, indicating the vehicle maneuvering state, according to a weighted total sum of input parameters, with use of the plurality of types of analysis values of each vehicle driving parameter, as the input parameters.

A vehicle running characteristic control apparatus according to an eighth aspect of the present invention comprises a driving parameter detecting means for detecting a plurality of vehicle driving parameters, a frequency analyzing means for carrying out frequency analysis on each of the plurality of vehicle driving parameters, a road traffic condition estimating means for outputting at least one estimated value, indicating a road traffic condition under which the vehicle is traveling, a vehicle maneuvering state estimating means for estimating a vehicle maneuvering state intended by a driver according to results of the frequency analyses, and a characteristics controlling means for variably controlling a running characteristic of the vehicle, by variably controlling an operating characteristic of an apparatus mounted on the vehicle in accordance with the estimated vehicle maneuvering state. The frequency analyzing means is designed to determine a frequency distribution of each vehicle driving parameter and to determine at least one analysis value, characterizing the frequency distribution, for each vehicle driving parameter. The vehicle maneuvering state estimating means is designed to give an output parameter, indicating the vehicle maneuvering state, according to a weighted total sum of input parameters, with use of the at least one estimated value of the road traffic condition and the at least one analysis value of each vehicle driving parameter, as the input parameters.

In the seventh and eighth aspects of the present invention, preferably, the characteristic controlling means is designed to variably control an operating characteristic of a rear-wheel steering unit, which serves as the apparatus mounted on the vehicle and which sets a target rear-wheel steering angle by multiplying a detected value of a front-wheel steering state or a detected value of a vehicle behavior by a coefficient, by variably controlling the coefficient in accordance with the output parameter. Alternatively, the characteristic controlling means is designed to variably control a steering reaction force vs. vehicle speed characteristic of a power steering unit in accordance with the output parameter. The power steering unit serves as the apparatus mounted on the vehicle and changes a steering reaction force in accordance with the vehicle speed. Alternatively, the characteristic controlling means is configured to variably set a speed change map in accordance with the output parameter. The map is based on the vehicle speed and the opening degree of a throttle, and is proved on an automatic transmission which serves as the apparatus mounted on the vehicle. Further alternatively, the characteristic controlling means is configured to variably control an operating characteristic of a traction control unit, which serves as the apparatus mounted on the vehicle, and which restricts an engine output to a target drive torque based on a turning state of the vehicle and also restricts a variation amount of the target drive torque to a predetermined amount, by changing the predetermined amount in accordance with the output parameter. Further alternatively, the characteristic controlling means is designed to variably control a damping power or a spring constant of a suspension unit in accordance with the output parameter. The suspension unit is of a variable damping force or variable spring constant type and serves as the apparatus mounted on the vehicle.

According to the vehicle running characteristic control apparatus of the seventh or eighth aspect of the present invention or the preferred embodiments thereof, a corresponding one or ones of the aforementioned advantages, provided by the vehicle running characteristic control method according to the third and fourth aspects of the invention and the preferred embodiments, can be attained.

These and other objects and advantages will become more readily apparent from an understanding of the preferred embodiments described below with reference to the following drawing figures.

BRIEF DESCRIPTION OF THE DRAWINGS

The invention will become more fully understood from the detailed description herein below with reference to the accompanying figures, given by way of illustration only and not intended to limit the present invention in which:

FIG. 57 is a schematic configuration diagram of a suspension unit mounted on a vehicle, to which a vehicle running characteristic control method according to a tenth embodiment of the present invention is applied.

DESCRIPTION OF THE PREFERRED EMBODIMENTS

A method for estimating a vehicle maneuvering state, a method for controlling vehicle running characteristic, and apparatuses for carrying out these methods will now be described with reference to the attached drawings.

An estimating method according to a first embodiment of the present invention is designed to estimate a vehicle maneuvering state, given by a driver, in accordance with a road traffic condition and physical amounts indicative of a vehicle driving state, the road traffic condition being determined based on vehicle traveling state parameters.

Figure 1:
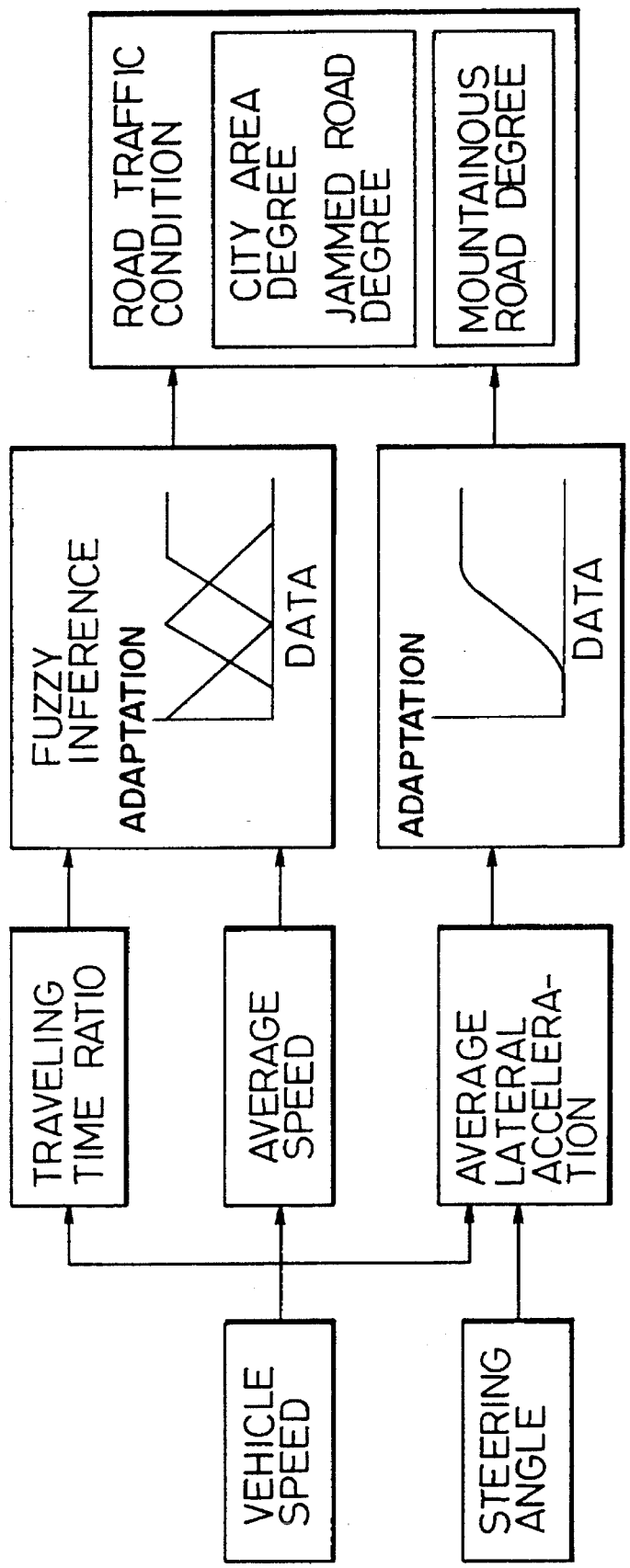
FIG. 1 is a conceptual view showing a road traffic condition determining procedure in a vehicle maneuvering state estimating method according to a first embodiment of the present invention.

To be more specific, as shown in FIG. 1, an average speed, a traveling time ratio (a ratio of the traveling time to the total time including the vehicle traveling time and the vehicle stopping time), and an average lateral acceleration are determined, as vehicle traveling state parameters, from the vehicle speed and the steering wheel angle. Further, a city area degree, a road congestion degree, and a mountainous road degree are detected, as parameters indicative of the road traffic condition, by fuzzy inference based on the vehicle traveling state parameters.

Figure 2:
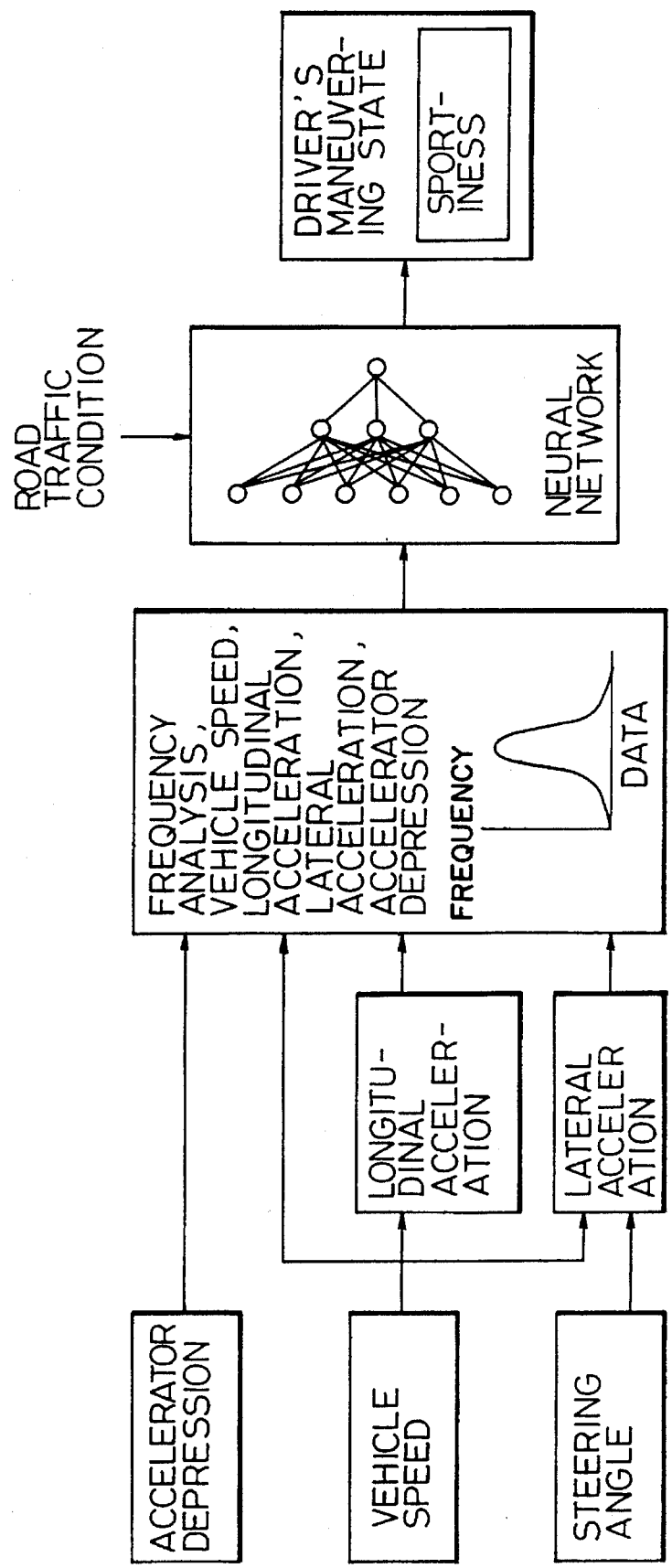
FIG. 2 is a conceptual view showing a vehicle maneuvering state determining procedure in the embodiment.

On the other hand, as shown in FIG. 2, physical amounts such as the opening degree of an accelerator, vehicle speed, and steering wheel angle, which represent the vehicle driving state, are detected. Then, the longitudinal acceleration is determined from the vehicle speed by arithmetic operation, and the lateral acceleration is determined from the vehicle speed and the steering wheel angle by arithmetic operation. Further, the frequency distribution of each of the vehicle speed, the opening degree of the accelerator, the longitudinal acceleration, and the lateral acceleration, which are vehicle driving parameters, is determined by frequency analysis. Then, the mean value and variance of each frequency distribution are determined as parameters which characterize the frequency distribution.

Further, the road traffic condition representative parameters (city area degree, road traffic jam degree, and mountainous road degree) and the parameters (the mean value and the variance) characterizing the frequency distribution of each vehicle driving parameter are supplied to a neural network. The neural network determines a weighted total sum of these parameters, thereby determining an output parameter, indicative of the vehicle maneuvering state intended by the driver, e.g., the sportiness of the driver in driving the vehicle.

Figure 3:
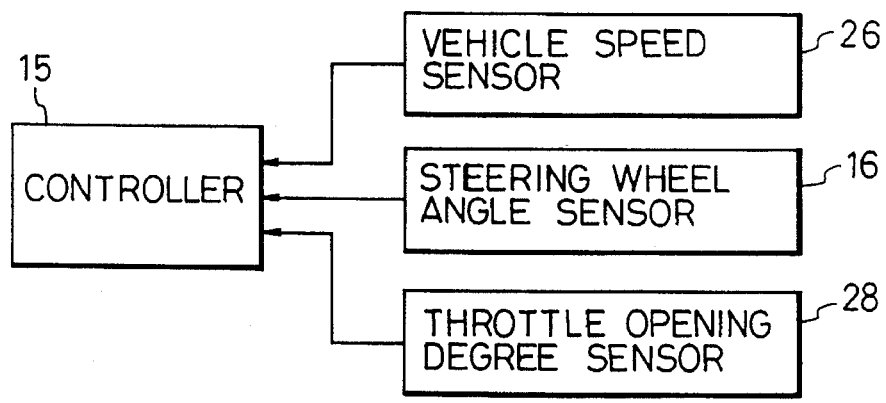
FIG. 3 is a schematic block diagram showing a controller and sensors for implementing the estimating method according to the embodiment.

A vehicle, to which the estimating method according to this embodiment is applied, is provided with a controller 15, as shown in FIG. 3. Although the illustration is omitted, the controller 15 includes a processor having a fuzzy inference function and a neural network function, a memory storing various control programs and various data, and I/O circuits. Connected to the controller 15 are a vehicle speed sensor 26, a steering wheel angle sensor 16, and a throttle opening degree sensor 28.

The processor of the controller 15 receives a vehicle speed signal from the sensor 26, a steering wheel angle signal from the sensor 16, and a throttle opening degree signal from the sensor 28, and executes various routines, to be discussed later, in order to estimate the sportiness of the driver.

"Traveling time ratio calculating routine"

Figure 4:
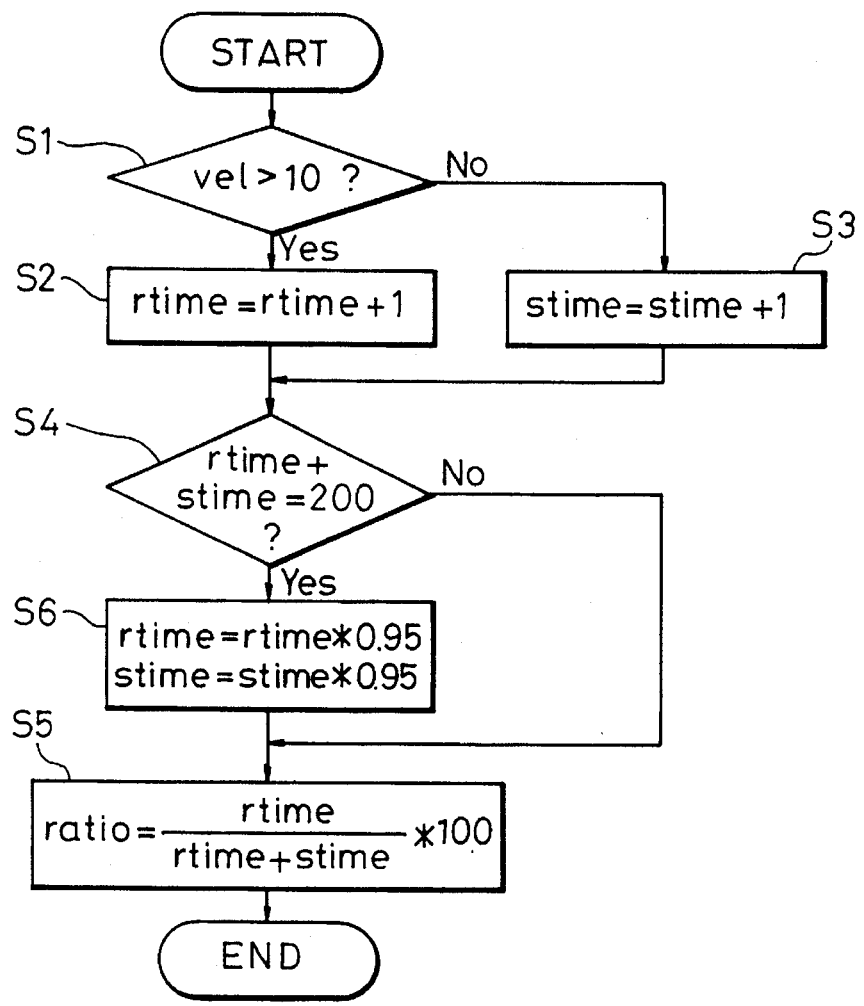
FIG. 4 is a flowchart of a traveling time ratio calculating routine executed by the controller shown in FIG. 3.

While the vehicle is in a driven state (including the traveling state and traveling stop state), e.g., after the engine is started, the processor of the controller 15 repeatedly implements the routine for calculating the traveling time ratio shown in FIG. 4 at intervals of two seconds.

In each calculating routine executing cycle, the processor receives a vehicle signal vel, indicative of an actual vehicle speed, from the vehicle speed sensor 26, and determines whether the vehicle speed vel exceeds a predetermined vehicle speed (e.g., 10 km/h) (step S1). If the determination result is affirmative, then "1" is added to a count value rtime of a traveling time counter (not shown) built in the controller 15 (step S2). On the other hand, if the determination result in the step S1 is negative, then "1" is added to a count value stime of a traveling stop time counter (not shown) (step S3).

In a step S4, which follows the step S2 or S3, it is determined whether the sum of the value rtime of the traveling time counter and the value stime of the traveling stop time counter is equal to a value "200." If the determination result is negative, then a value, which is obtained by dividing the traveling time counter value rtime by the sum of the value and the traveling stop time counter value stime, is multiplied by a value "100" to calculate the traveling time ratio (%) (step S5).

On the other hand, if the determination result of the step S4 is affirmative, then a value, which is equal to the product of the traveling time counter value rtime and a value "0.95," is reset in the traveling time counter. In addition, a value, which is equal to the product of the traveling stop time counter value stime and the value "0.95" is reset in the traveling stop time counter (step S6), and the traveling time ratio is calculated in the step S5.

In other words, the two counter values are reset when 400 seconds, which is equivalent to the value "200" and during which the vehicle has been driven, has elapsed from the time when the engine was started. After that, the counter values are reset each time 20 seconds elapse. This makes it possible to calculate the traveling time ratio, which reflects the vehicle driving state before the present time, even by means of counters with relatively small capacities.

"Average speed calculating routine"

Figure 5:
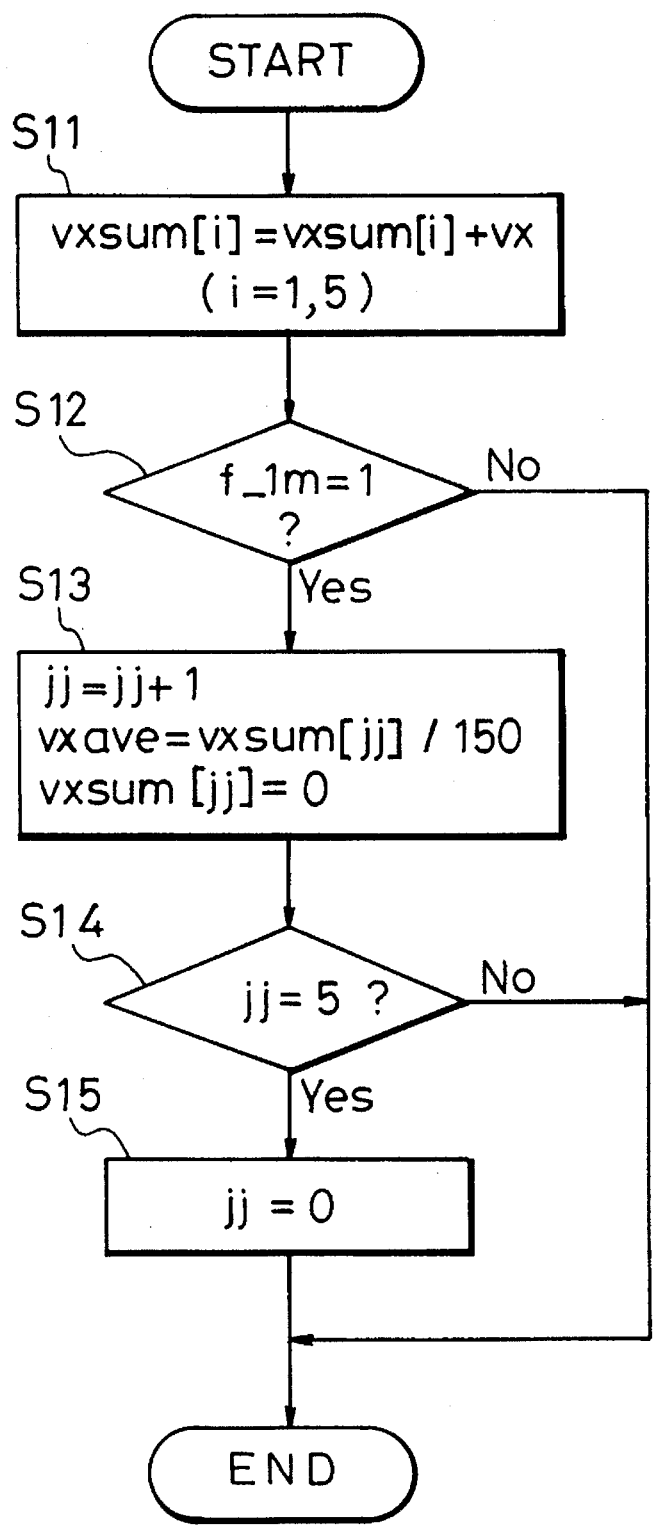
FIG. 5 is a flowchart showing an average speed calculating routine executed by the controller.

The processor of the controller 15 repeatedly executes an average speed calculating routine shown in FIG. 5 at intervals of two seconds.

In each routine executing cycle, the processor reads vehicle speed data vx from the vehicle speed sensor 26, and adds the vehicle speed vx to each of stored value vxsum[i] (i= 1 to 5) of five cumulative speed registers incorporated in the controller 15 (step S11). Then, the processor determines whether the value of a flag f_1m is "1," which indicates that average speed calculating timing is reached (step S12). The flag f_1m takes a value "1" at 1-minute cycle. If the determination result in the step S12 is negative, then the processing in the present cycle is terminated.

If the determination result in the step S12 becomes affirmative in 1 minute since the routine was started, "1" is added to an index jj to update the index jj, an average speed vxave is calculated by dividing a cumulative speed register value vxsum[jj], which corresponds to the updated index jj, by "150," and the register value vxsum[jj] is reset to "0" (step S13). Next, a determination is made as to whether the updated index jj is "5" (step S14). If the determination result is negative, then the processing in the present cycle is terminated.

After that, the index jj is updated every 1 minute, and the average speed vxave is determined from the cumulative speed register value vxsum[jj] corresponding to the updated index jj. Further, the index jj is reset to "0" every 5 minutes (step S15).

Thus, the actual vehicle speed vx is added to each of the five cumulative speed register values vxsum[i] every 2 seconds, and the average speed vxave is calculated every minute according to the stored value vxsum[jj] of a corresponding one of the five cumulative speed registers, the stored value showing a total of vehicle speeds detected 150 times (for 5 minutes).

"Average lateral acceleration calculating routine"

Figure 6:
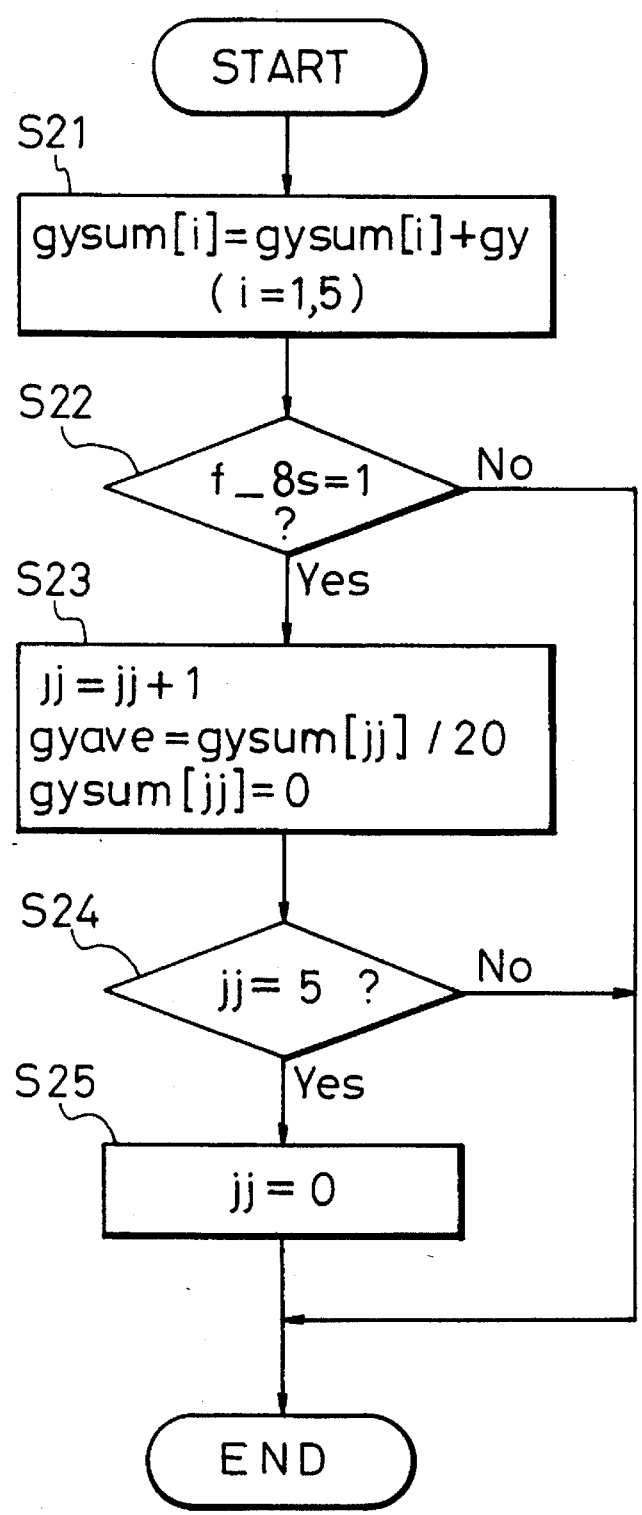
FIG. 6 is a flowchart showing an average lateral acceleration calculating routine executed by the controller.

The processor of the controller 15 repeatedly executes an average lateral acceleration calculating routine shown in FIG. 6 at intervals of 2 seconds, for example.

In each routine executing cycle, the processor reads an output signal of the vehicle speed sensor 26 indicative of a vehicle speed vx, and an output signal of the steering wheel angle sensor 16 indicative of a steering wheel angle steera, and determines a predetermined steering wheel angle gygain, which gives 1 (G) lateral acceleration and which is represented as the function of the vehicle speed vx, according to the vehicle speed vx by referring to a map (not shown). Then, the processor calculates a lateral acceleration gy by dividing the steering wheel angle steera by the predetermined steering wheel angle gygain, and adds the lateral acceleration gy to a stored value gysum[i] (i= 1 to 5) of each of the five cumulative lateral acceleration registers incorporated in the controller 15 (step S21). The processor then determines whether the value of a flag f_8s is "1" which indicates that average lateral acceleration calculating timing is reached (step S22). This flag f_8s takes the value "1" at 8-second intervals. If the determination result in the step S22 is negative, then the processing in the present cycle is terminated.

If the determination result in the step S22 becomes affirmative in 8 seconds since the routine was started, "1" is added to the index jj to update the index jj, an average lateral acceleration gyave is calculated by dividing a cumulative lateral acceleration register value gysum[jj], which corresponds to the updated index jj, by "20," and the register value gysum[jj] is reset to "0" (step S23). Next, a determination is made as to whether the updated index jj is "5" (step S24). If the determination result is negative, then the processing in the present cycle is terminated.

After that, the index jj is updated every 8 seconds, and the average lateral acceleration gyave is determined from the cumulative lateral acceleration register value gysum[jj] corresponding to the updated index jj. Further, the index jj is reset to "0" every 40 seconds (step S25).

Thus, the calculated lateral acceleration gy is added to each of the five cumulative lateral acceleration register values gysum[i] every 2 seconds, and the average lateral acceleration gyave is calculated every 8 seconds according to the stored value gysum[jj] of a corresponding one of the five cumulative lateral acceleration registers, the stored value showing a total lateral accelerations calculated 20 times (for 40 seconds).

"City area degree/road jam degree/mountainous road degree calculating routine"

In the present embodiment, a city area traveling mode, a jammed road traveling mode, and a mountainous road traveling mode, as vehicle traveling modes associated with estimation of a vehicle maneuvering state given by a driver, are selected to be determined. In this respect, the present embodiment is designed to determine a city area degree, a road jam degree, and a mountainous road degree.

The city area and the road jam degree are determined by fuzzy inference. In connection with the fuzzy inference, membership functions (FIG. 7 and FIG. 8) representative of fuzzy subsets in the universe of discourse (carrier set) for the traveling time ratio and the average speed, and nine fuzzy rules shown in Table 1, are set beforehand and stored in the memory of the controller 15.

The setting of the fuzzy rules given in Table 1 is based on the fact that the average speed is low and the traveling time ratio is medium when traveling is made in a city area, and that the average speed is low and the traveling time ratio is low when traveling is made on a jammed road.

TABLE 1

| No. | Traveling Time Ratio | Average Speed | Rate of City Area [r_city] | Rate of Road Jam [r_jam] |
| --- | --- | --- | --- | --- |
| 1 | S | S | 100 | 100 |
| 2 | S | M | 50 | 100 |
| 3 | S | B | 0 | 100 |
| 4 | M | S | 50 | 100 |
| 5 | M | M | 100 | 25 |
| 6 | M | B | 50 | 0 |
| 7 | B | S | 0 | 100 |
| 8 | B | M | 20 | 0 |
| 9 | B | B | 0 | 0 |

Figure 7:
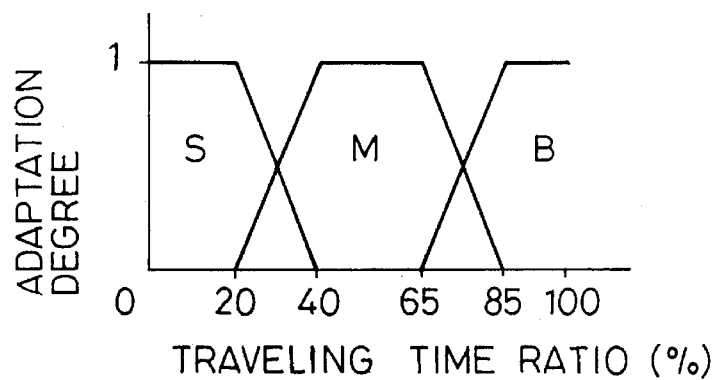
FIG. 7 is a graph indicating membership functions, which define fuzzy sets related to traveling time ratio.

In FIG. 7, symbols S, M, and B are labels representing fuzzy sets in the carrier set related to the traveling time ratio. The membership function which defines the fuzzy set S is determined, so that the conformity degree or adaptation is "1" for a traveling time ratio ranging from 0% to 20%, and the adaptation decreases from "1" to "0" as the traveling time ratio increases from 20% to 40%. Further, the membership function defining the fuzzy set M is established so that the adaptation increases from "0" to "1" as the traveling time ratio increases from 20% to 40%, the adaptation stays at "1" while the traveling time ratio stays within a range of 40% to 65%, and the adaptation decreases from "1" to "0" as the traveling time ratio increases from 65% to 85%. The membership function defining the fuzzy set B is established so that the adaptation increases from "0" to "1" as the traveling time ratio increases from 65% to 85%, and the adaptation stays at "1" when the traveling time ratio is 85% or more.

Figure 8:
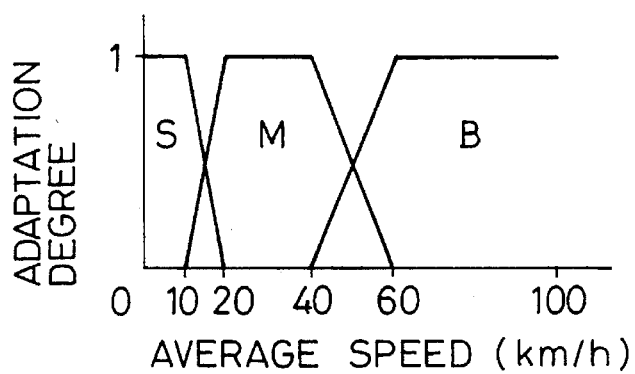
FIG. 8 is a graph indicating membership functions, which define fuzzy sets related to average speed.

Referring to FIG. 8, the membership function defining the fuzzy set S in the carrier set related to the average speed is established so that the adaptation is "1" for the average speed of 0 km/h to 10 km/h, and the adaptation decreases from "1" to "0" as the average speed increases from 10 km/h to 20 km/h. Likewise, the membership function defining the fuzzy set M is established so that the adaptation increases from "0" to "1" as the average speed increases from 10 km/h to 20 km/h, the adaptation is "1" for the average speed of 20 km/h to 40 km/h, and the adaptation decreases from "1" to "0" as the average speed increases from 40 km/h to 60 km/h. The membership function defining the fuzzy set B is established so that the adaptation increases from "0" to "1" as the average speed increases from 40 km/h to 60 km/h, and the adaptation is "1" when the average speed is 60 km/h or more.

The processor of the controller 15 determines an adaptation adap[i] of a combination of the traveling time ratio (%) and the average speed (km/h) to each of the 1st through 9th rules, the traveling time ratio and the average speed being determined according to the calculating routines shown in FIG. 4 and FIG. 5. Then, the processor calculates the city area degree and the road jam degree in accordance with the following calculating formulas:

*City area degree* $[city] = \Sigma(adap[i] \times r\_city[i]) \div adap[i]$ (i=1 to 9)

*Road jam degree* $[jam] = \Sigma(adap[i] \times r\_jam[i]) \div adap[i]$ (i=1 to 9)

More specifically, the processor determines the adaptation of the actual traveling time ratio to that one of the fuzzy sets S, M, and B related to the traveling time ratio which corresponds to the i'th rule. Then, the processor determines the adaptation of the actual average speed to that one of the fuzzy sets S, M, and B related to the average speed which corresponds to the i'th rule. Of the two adaptations, the smaller one is taken as the adaptation adapt[i] for the combination of the actual traveling time ratio and the actual average speed for the i'th rule.

Figure 9:
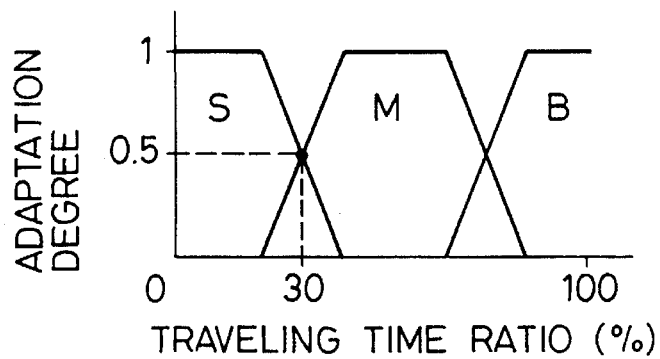
FIG. 9 is a graph showing an example of the calculation of the conformity degree of an actual traveling time ratio to traveling time ratio fuzzy sets concerned.
Figure 10:
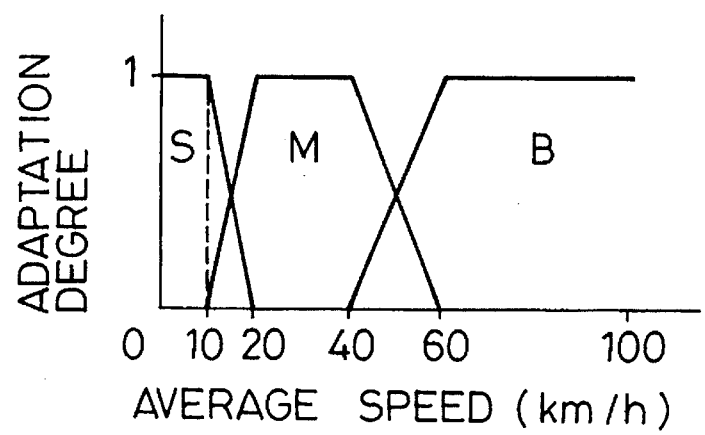
FIG. 10 is a graph showing an example of the calculation of the conformity degree of an actual average speed to an average speed fuzzy set concerned.

With regard to the first rule, as shown in FIGS. 9 and 10, in case that the actual traveling time ratio is 30% and the actual average speed is 10 km/h, a value "0.5" is determined as the adaptation of the actual traveling time ratio 30% to the traveling time ratio fuzzy set S, and a value "1" is determined as the adaptation of the actual average speed 10 km/h to the average speed fuzzy set S. Therefore, the adaptation adapt[1] of a combination of the actual traveling time ratio 30% and the actual average speed 10 km/h, to the first rule, is "0.5."

Figure 11:
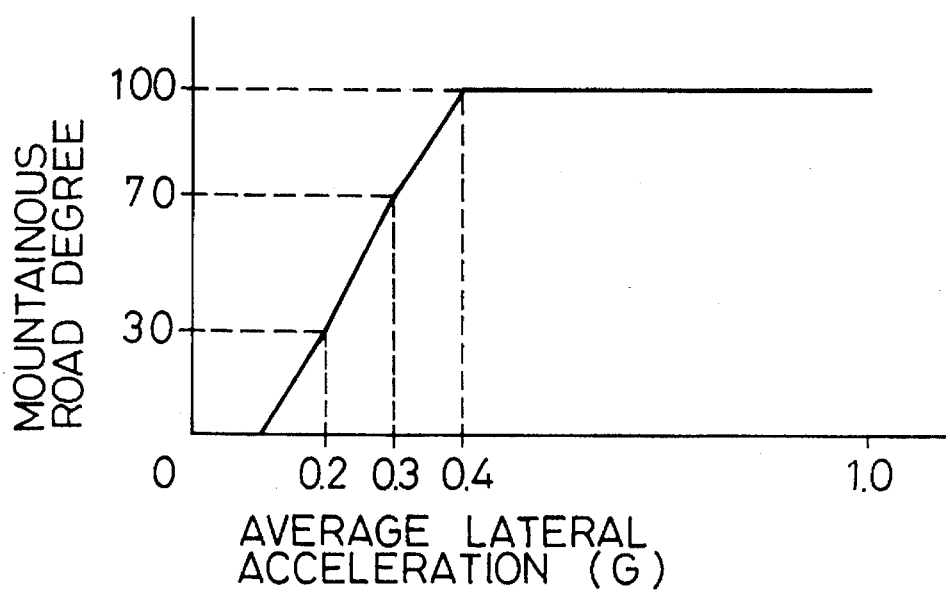
FIG. 11 is a graph illustrating an average lateral acceleration vs. mountainous road degree map.

The processor of the controller 15 then refers an average lateral acceleration vs. mountainous road degree map stored in the memory of the controller 15, and calculates the mountainous road degree in accordance with the average lateral acceleration determined in the routine of FIG. 6. As exemplarily shown in FIG. 11, the map is set so that the mountainous road degree is "0" while the average lateral acceleration ranges from 0 G to about 0.1 G, the mountainous road degree increases from "0" to "100" as the average lateral acceleration increases from about 0.1 G to 0.4 G, and the mountainous road degree becomes "100" when the average lateral acceleration is 0.4 G or more. The map setting is made based on the fact that the integral value of the lateral acceleration increases when traveling is made on a mountainous road.

"Frequency analyzing routine"

Figure 12:
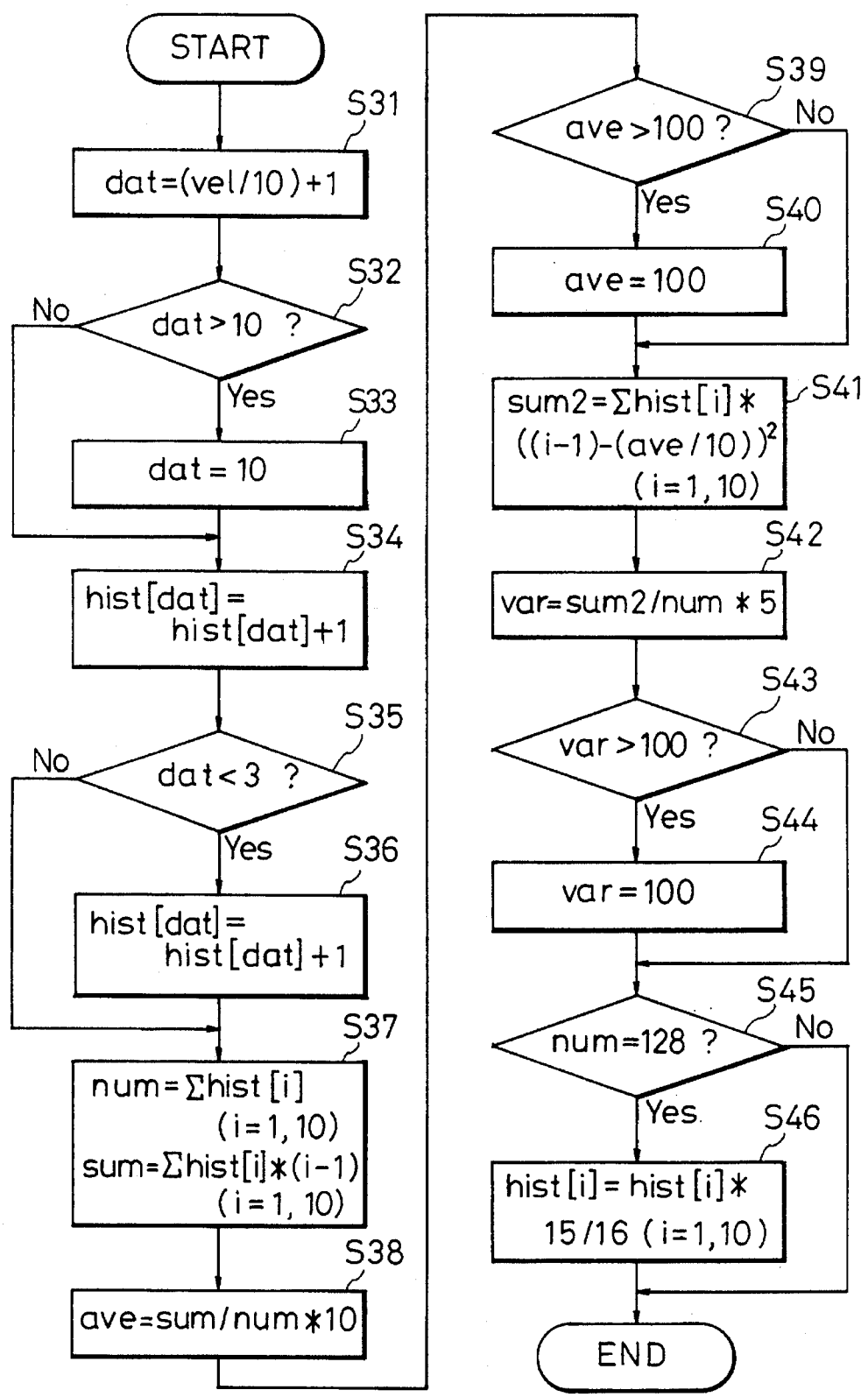
FIG. 12 is a flowchart of a frequency analysis routine implemented by the controller of FIG. 3.

The processor of the controller 15 performs frequency analysis of each of the vehicle speed, longitudinal acceleration, lateral acceleration, and the opening degree of the accelerator at intervals of, for example, 200 ms to determine the mean values and variances of the respective physical quantities. FIG. 12 shows the frequency analyzing routine for the vehicle speed. The frequency analyzing routines (not shown) for the quantities other than the vehicle speed are configured in the same manner as that of this routine.

The vehicle speed as the frequency analysis parameter is represented by the output signal from the vehicle speed sensor 26, and the input range thereof is set for 0 to 100 km/h, for example.

In accordance with the formula shown below, the opening degree of the accelerator tps(%) is calculated based on the output signal of a throttle opening degree sensor 28, the input range thereof being 0 to 100%.

$tps = (tdata - tpsoff) \div (tpson - tpsoff) \times 100$ where the symbol tdata indicates the present throttle opening degree sensor output, the symbol tpsoff indicates the throttle opening degree sensor output when the accelerator is OFF, and the symbol tpson indicates the throttle opening degree sensor output when the accelerator is fully open.

The processor also samples the output of the vehicle sensor 26 at intervals of 100 ms, for example, and calculates a longitudinal acceleration gx (unit: G) according to the formula shown below. The input range of the longitudinal acceleration is, for example, 0 to 0.3 G.

$gx = (vx - vx0) \times 10 \div (3.6 \times 9.8)$ where the symbol vx indicates the present vehicle speed (km/h), and the symbol vx0 indicates the vehicle speed (km/h) 100 ms ago.

The processor further reads the output signal from the vehicle sensor 26 representative of the vehicle speed vx, and the output signal from the steering wheel angle sensor 16 representative of the steering wheel angle steera. Next, the processor refers to a map, not shown, to determine a predetermined steering wheel angle gygain, which is represented as the function of the vehicle speed vx and which gives the lateral acceleration of 1 (G), according to the vehicle speed vx. Then, the processor calculates the lateral acceleration gy (G) by dividing the steering wheel angle steera by the predetermined steering wheel angle gygain, as shown in the formula shown below. The input range of the lateral acceleration is 0 to 0.5 G, for example.

$$gy = steera \div gygain$$

Referring to FIG. 12, the processor determines a value dat by adding "1" to a value (vel/10), which is obtained by dividing the vehicle speed signal vel, as the frequency analysis parameter (input data), into ten equal parts in the input range of 0 to 100 km/h (step S31). Further, the processor determines whether the value dat is larger than "10" (step S32). If the determination result is affirmative, then the processor resets the value dat to "10" in a step S33 before it moves to a step S34. On the other hand, if the determination result in the step S32 is negative, then the processor immediately moves from the step S32 to the step S34. In the step S34, as shown in FIG. 13, "1" is added to an element number hist[dat] of a corresponding one of ten arrays, which constitute the population of the input data (the element number of the array on the maximum value side is 0 in FIG. 13).

Figure 13:
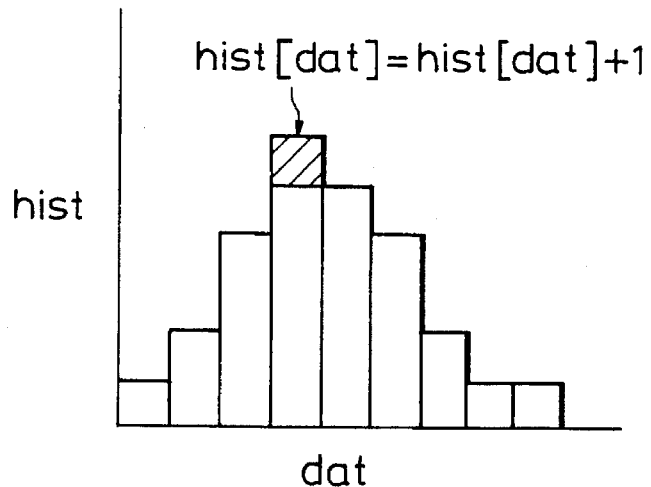
FIG. 13 is a graph showing an array constituting a population of input data subject to frequency analysis.

In a step S35, the processor determines whether the value dat determined in the step S31 is smaller than "3." If the determination result is affirmative, then the processor adds "1" to the element number hist[dat] of a corresponding one of the ten arrays constituting the population of the input data (the element number of the array on the maximum value side is 0 in FIG. 13) in a step S36, in the same manner as in the step S34, before the processor moves to a step S37. On the other hand, if the determination result in the step S35 is negative, then the processor immediately moves from the step S35 to the step S37.

In the next step S37, the processor determines the total sum "num" of the element numbers of the first through tenth arrays, and also determines the total sum "sum" of the products of the element number and a value "i-1" which has been determined in relation to each array (i'th array). The processor divides the total sum "sum" of the products by the total sum "num" of the element numbers, and further divides the result by a value "10" to determine the mean value ave of the input data (the vehicle speed in this case) (step S38).

The processor then determines whether or not the mean value ave is larger than "100" (step S39). If the determination result is affirmative, then it resets the mean value ave to "100" in a step S40 before it proceeds to a step S41. On the other hand, if the determination result in the step S39 is negative, then the processor immediately moves from the step S39 to the step S41. In other words, the mean value ave of the input data is limited to a value of up to "100."

In the step S41, the processor determines, for each array, the product of the array element number hist[i] and a squared value of ((i−1)−(ave/10)), which is obtained by subtracting a value, obtained by dividing the mean value ave by "10," from a value "i−1." Next, it calculates a total sum "sum2" of the products. The processor then divides a value, which has been obtained by dividing the total sum "sum2" by the total sum "num" of the element numbers, by a value "5" to calculate a variance var of the input data (step S42). Then, the processor determines whether the variance var of the input data is larger than "100" (step S43). If the determination result is affirmative, then it resets the variance var to "100" in a step S44 before it moves to a step S45, while it directly moves from the step S41 to the step S45 if the determination result in the step S43 is negative. In other words, the value of the variance var of the input data is limited to a value of up to "100."

In the step S45, the processor determines whether the total sum "num" of the element numbers is larger than "128." If the determination result is negative, then the processor terminates the processing in the present cycle. On the other hand, if the determination result is affirmative, the processor resets the element number hist[i] of each of the first through tenth arrays to a value, which is obtained by multiplying the element number hist[i] by a value "15/16," (step S46), before it terminates the processing in the present cycle. In other words, the processor decreases the element number of each array by multiplying it by "15/16" if the element number "num" of the population exceeds "128." After that, the processing shown in FIG. 12 is repeated to periodically determine the mean value and variance of the vehicle speed vel, which are the input data.

The mean values and variances of other input data, i.e., the opening degree of accelerator, the longitudinal acceleration, and lateral acceleration, are determined in the same manner.

As the driver increases its driving sportiness, the mean values and variances of the respective input data increase. The mean value of the vehicle speed, however, is greatly dependent on the road traffic condition. "Vehicle maneuvering state calculating routine"

The processor of the controller 15 determines, through its neural network function, a vehicle maneuvering state given or intended by the driver. In this embodiment, the city area degree, the road jam degree, and the mountainous road degree, which have been determined by the aforesaid fuzzy inference, are supplied to a neural network, in addition to the mean values and variances of the vehicle speed, accelerator opening degree, longitudinal acceleration, and lateral acceleration, which have been determined from the aforesaid frequency analysis, so as to determine the driver's driving sportiness, as the vehicle maneuvering state given by the driver.

Figure 14:
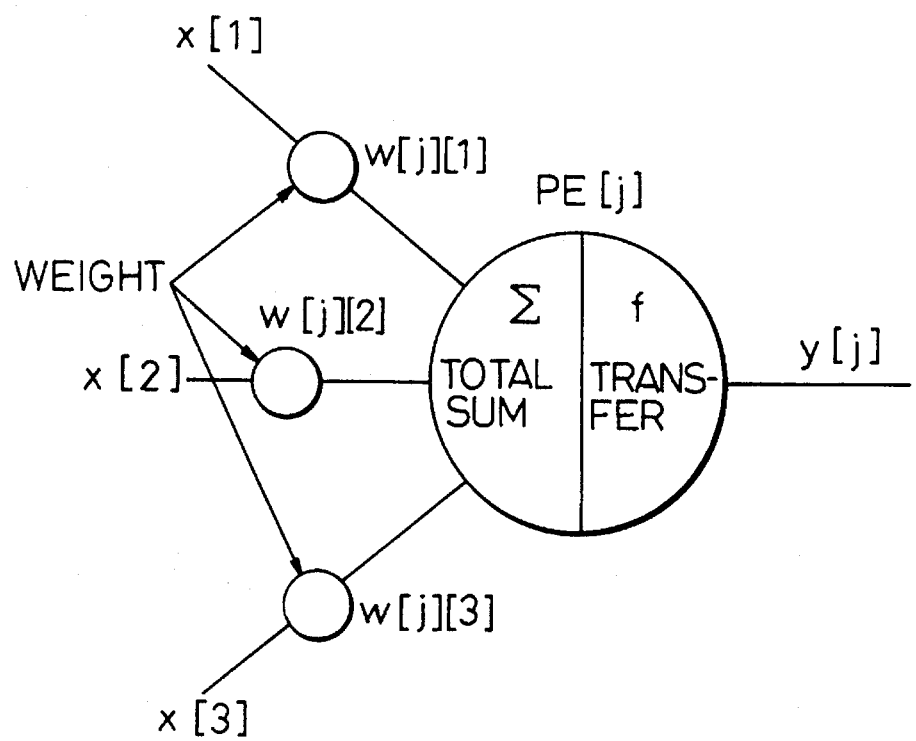
FIG. 14 is a conceptual diagram showing processing elements making up a neural network.
Figure 15:
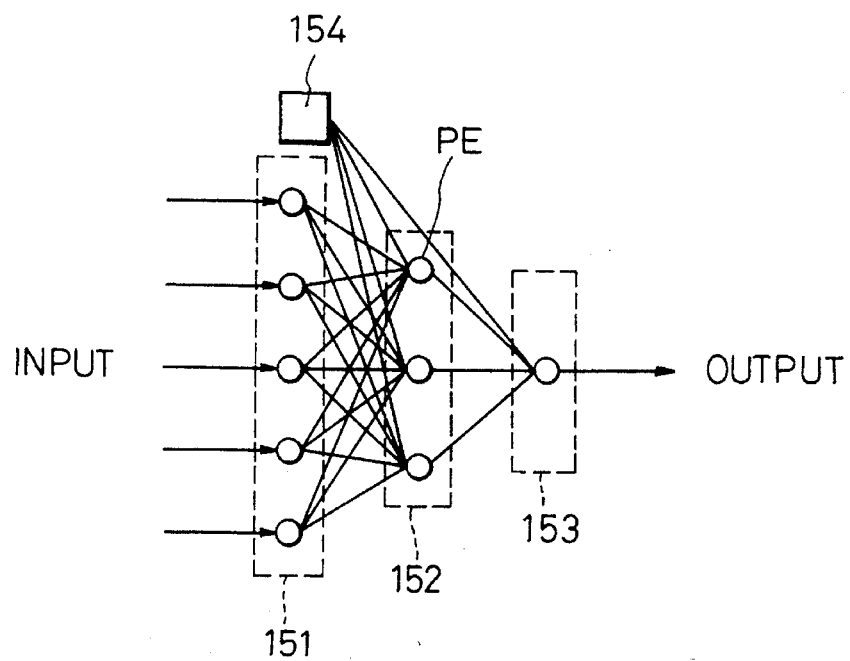
FIG. 15 is a conceptual diagram of the neural network comprised of the processing elements shown in FIG. 14.

Conceptually, the neural network is made up of processing elements (PE) shown in FIG. 14, which are interconnected in a complicated manner as illustrated in FIG. 15. Each PE receives the total sum of many inputs x[i] each multiplied by the weight w[j][i] of each of the inputs. In each PE, the total sum is converted by a certain transfer function f, and a resulting output y[i] is sent out from the PE.

With reference to FIGS. 14 and 15, the neural network used in this embodiment has a hidden layer 152 located between an input layer 151 and an output layer 153. The input layer 151 is comprised of eleven PEs, the hidden layer 152 is comprised of six PEs, and the output layer 153 is comprised of one PE. The transfer function f of PE is defined by f(x)= x. The weight w[j][i] in the coupling between the PEs is decided in the course of a learning process. The neural network of the present embodiment has an additional input 154 called a bias.

In this embodiment, the function of the neural network is accomplished by the controller 15.

Figure 16:
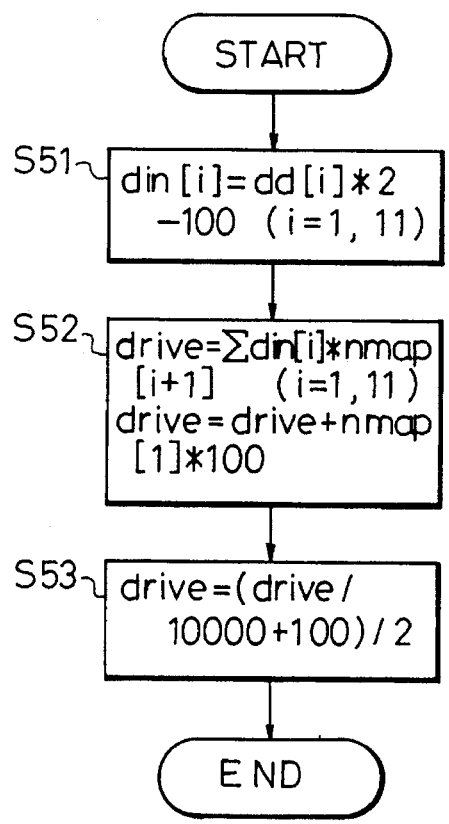
FIG. 16 is a flowchart showing a sportiness calculating routine executed by the controller of FIG. 3.

In order to implement the neural network function, the processor of the controller 15 periodically carries out a sportiness calculating routine shown in FIG. 16, with use of, as the input data, the respective mean values and variances of the vehicle speed, accelerator opening degree, longitudinal acceleration, and lateral acceleration, together with city area degree, road jam degree, and mountainous road degree (all of them having the output range of 0 to 100).

In the routine shown in FIG. 16, the processor subtracts "100" from the product of input data dd[i] and "2," to convert the range for eleven input data dd[i] (i= 1 through 11) from "0 to 100" to "–100 to 100," thereby obtaining input data din[i], which have undergone the range conversion (step S51).

The processor then determines a total sum "drive" of the products of the pieces of input data din[i] and weight coefficients nmap[i+1], which have been determined for each input data din[i] having undergone the range conversion. Further, the processor determines a similar product (nmap[1]*100) on the bias. The processor further adds the product (nmap[1]*100) related to the bias to the total sum "drive" related to the input data, thus determining the output "drive" representing the sportiness (step S52).

The processor adds "100" to the sportiness output "drive," which has been divided by "10000," divides the result of the addition by "2," and converts the sportiness output range from "–1000000 to 1000000" to "0 to 100" (step S53), thus terminating the calculation of the sportiness in one calculation cycle.

In the above-mentioned manner, the output "drive" representative of the driver's sportiness, as the vehicle maneuvering state, is determined. According to test driving results, the estimated value of the driver's sportiness indicated by the output "drive" well coincided with the sportiness evaluated and reported by the test driver himself. This is interpreted that the vehicle maneuvering state given or intended by the driver, which is difficult to evaluate by physical quantities such as vehicle speed, was evaluated on the basis of the mean values and variances of the physical quantities by which the frequency distributions of the respective physical quantities are characterized, and that the road traffic condition was taken into account in the evaluation of the vehicle maneuvering state.

The following describes an estimating method according to a second embodiment of the present invention (hereinafter referred to as the second estimating method).

The second estimating method is similar to the estimating method of the first embodiment (hereinafter referred to as the first estimating method) in that the vehicle maneuvering state intended by the driver is estimated according to the road traffic condition determined based on the vehicle traveling state parameters and the physical quantities representative of the vehicle driving state, but it is different from the first estimating method in that the method can be applied also to a vehicle which is provided with no steering wheel angle sensor.

Figure 17:
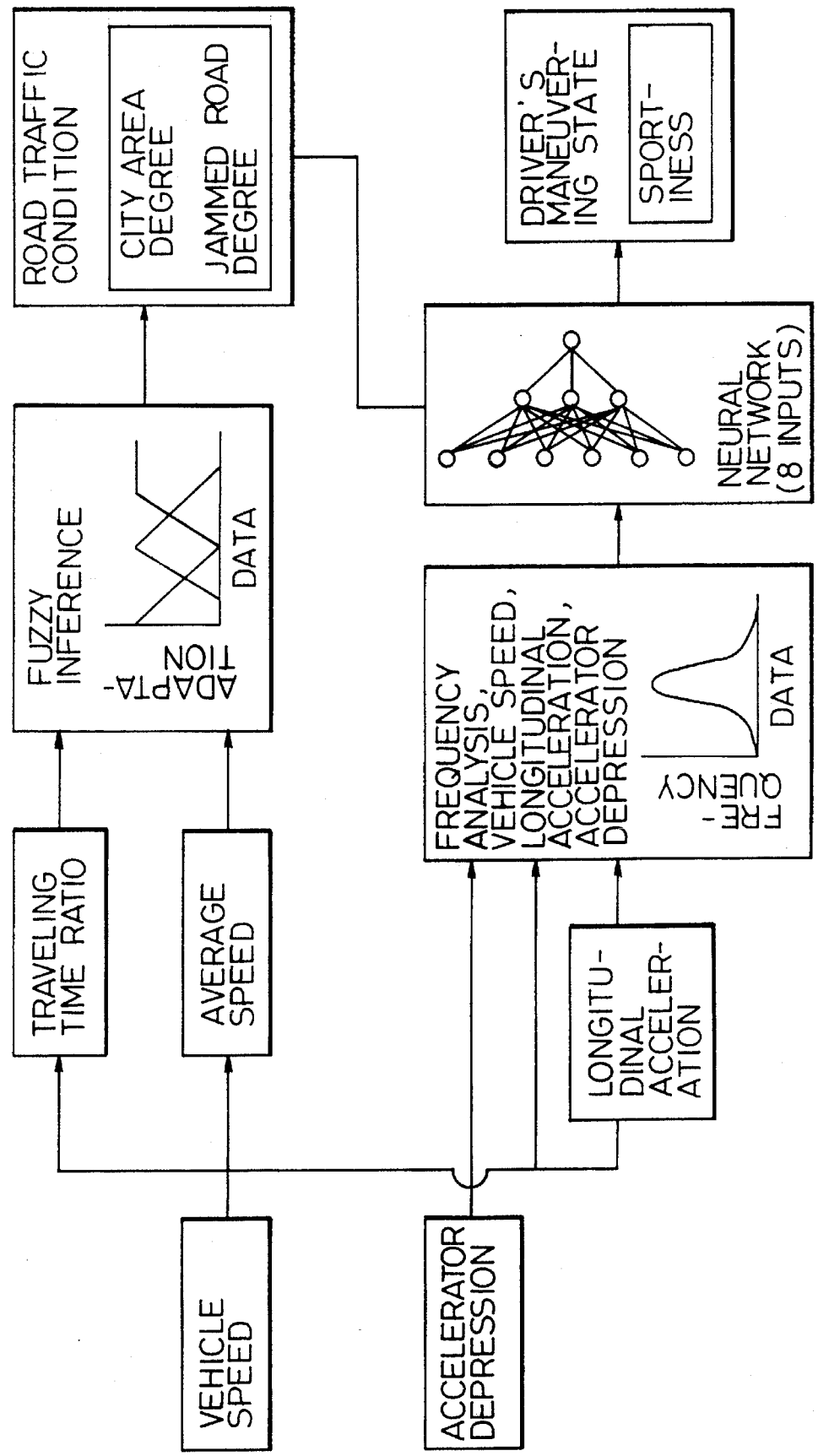
FIG. 17 is a conceptual view showing an estimating method for a vehicle maneuvering state (road traffic condition) according to a second embodiment of the present invention.

As shown in FIG. 17, the average speed and the traveling time ratio, as the vehicle traveling state parameters, can be determined from the vehicle speed. In this estimating method, no steering wheel angle sensor is used. Therefore, the average lateral acceleration, which can be determined from the steering wheel angle and the vehicle speed, is not calculated.

The city area degree and the road traffic jam degree, which serve as the parameters for indicating the road traffic condition, are detected by fuzzy inference based on these vehicle driving state parameters. In this estimating method, since the average lateral acceleration is not calculated as a vehicle traveling state parameter, the mountainous road degree, which serves as a parameter for indicating the road traffic condition, is not detected.

Instead, physical quantities indicative of the vehicle driving state, such as the accelerator opening degree and vehicle speed, are detected, and further the longitudinal acceleration is determined from the vehicle speed. Also, the frequency distributions of the vehicle speed, accelerator opening degree, and the longitudinal acceleration, which serve as the vehicle driving parameters, are determined by frequency analysis. Then, the mean values and variances of the frequency distributions are determined as the parameters, which characterize the frequency distributions. In this estimating method, the lateral acceleration, obtainable from the vehicle speed and the steering wheel angle, is not calculated.

Further, the parameters (the city area degree and the road jam degree), which represent the road traffic condition, and the parameters (the mean values and variances), which characterize the frequency distributions of the respective vehicle driving parameters are supplied to a neural network. In the neural network, a weighted total sum of these parameters is determined, thus determining an output parameter such as the driver's driving sportiness, which indicates the vehicle maneuvering state given or intended by the driver.

The number of input data in the second estimating method is eight, while that in the first estimating method is eleven. An output parameter equivalent to the sportiness obtained in the first estimating method can be obtained also in the second estimating method, by restructuring the weights of the parameters in the neural network. Hence, the vehicle maneuvering state can be estimated, even if the vehicle is provided with no steering wheel angle sensor.

The following describes a vehicle running characteristic control method according to a third embodiment of the present invention.

This embodiment is intended to control the vehicle running characteristic to adapt it to the vehicle maneuvering state (sportiness) estimated, e.g., by the estimating method of the first embodiment described above. The procedure for estimating the sportiness is identical to that of the aforesaid estimating method; therefore, the explanation of the equipment configuration for that purpose will be omitted.

In this embodiment, the description is given to a motorcar provided with a 4-wheel steering system as the apparatus for controlling the vehicle running characteristics.

Figure 18:
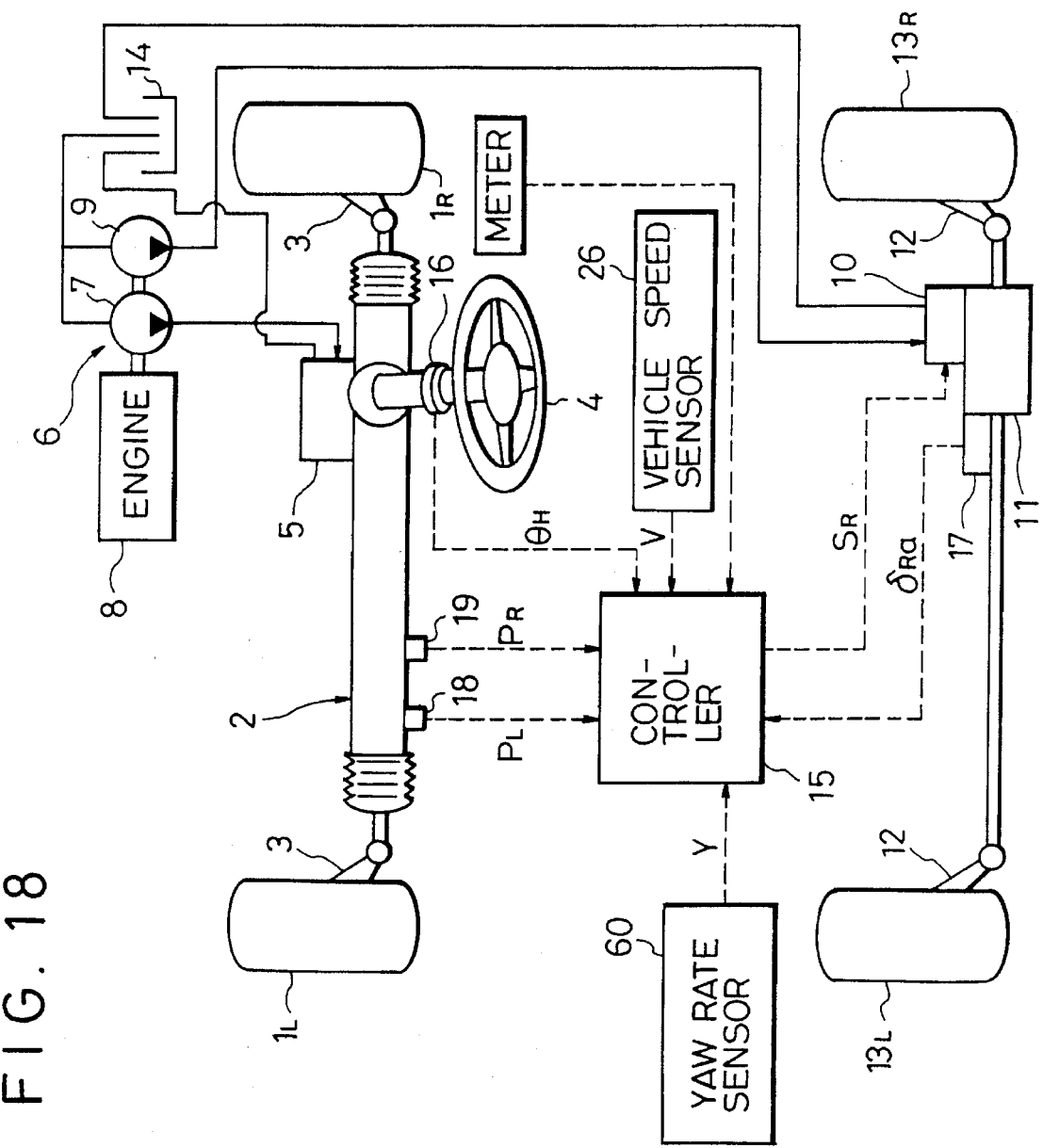
FIG. 18 is a schematic diagram showing a major section of a four-wheel steering system mounted on a vehicle, to which a vehicle running characteristic control method according to third through sixth embodiments of the present invention is applied.

Referring to FIG. 18, the right and left front wheels 1L, 1R of the motorcar are coupled to a front-wheel power steering system 2 via tie rods 3. This system 2, which constitutes the 4-wheel steering system in cooperation with various elements to be discussed later, includes a rack and pinion mechanism (not shown) operated by a steering wheel 4, and a front-wheel steering actuator (not shown) coupled to the rack and pinion mechanism and having a hydraulic cylinder.

The front-wheel steering actuator is connected to one hydraulic pump 7 of a pump unit 6 via a front-wheel steering valve 5 operated by the steering wheel 4. The pump unit 6 is of a double pump type driven by an engine 8, and the other hydraulic pump 9 is connected to a rear-wheel steering actuator 11 via a rear-wheel steering valve 10.

The rear-wheel actuator 11, which is also comprised of a hydraulic cylinder, has a piston rod thereof linked to the right and left rear wheels 13L, 13R via tie rods 12. In FIG. 18, reference numeral 14 denotes a reservoir tank.

The front-wheel steering actuator is operated in accordance with the steering direction by the hydraulic oil supplied from the hydraulic pump 7 via the front-wheel steering valve 5 at the time when the steering wheel 4 is operated, while the operation of the rear-wheel steering actuator 11 is controlled by a controller 15. More specifically, when the steering wheel 4 is operated, the controller 15 supplies an operation control signal SR suited to the vehicle traveling state to the rear-wheel steering valve 10, thereby controlling the hydraulic oil supplied from the hydraulic pump 9 to the rear-wheel steering actuator 11 via the valve 10.

In relation to the control of the operation of the rear-wheel steering actuator discussed above, the controller 15 is electrically connected to diverse sensors and meters. Specifically, supplied to the controller 15 are the vehicle speed V (corresponding to the aforesaid vehicle speed signal vx) from the meter concerned, sensor signals indicative of operating states of various devices, sensor signals indicative of steering wheel angle θH (corresponding to the aforesaid steering wheel angle steera) from a steering wheel angle sensor 16, and a sensor signal indicative of the power steering pressure (the working pressure of the power steering system 2 and the front-wheel steering actuator). In this embodiment, the difference between pressures PL, PR of the right and left pressure chambers (not shown) of the front-wheel steering actuator, which are detected by a pair of pressure sensors 18, 19, is determined as the power steering pressure. Further, a yaw rate sensor 60 for detecting the actual yaw rate (the speed of the autorotation around the center of gravity of the vehicle body) of the vehicle is connected to the controller 15 to supply a signal indicative of the actual yaw rate Y from the sensor 60 to the controller 15. In FIG. 18, reference numeral 17 denotes a rear-wheel steering angle sensor for detecting an actual rear-wheel steering angle δRa.

Figure 19:
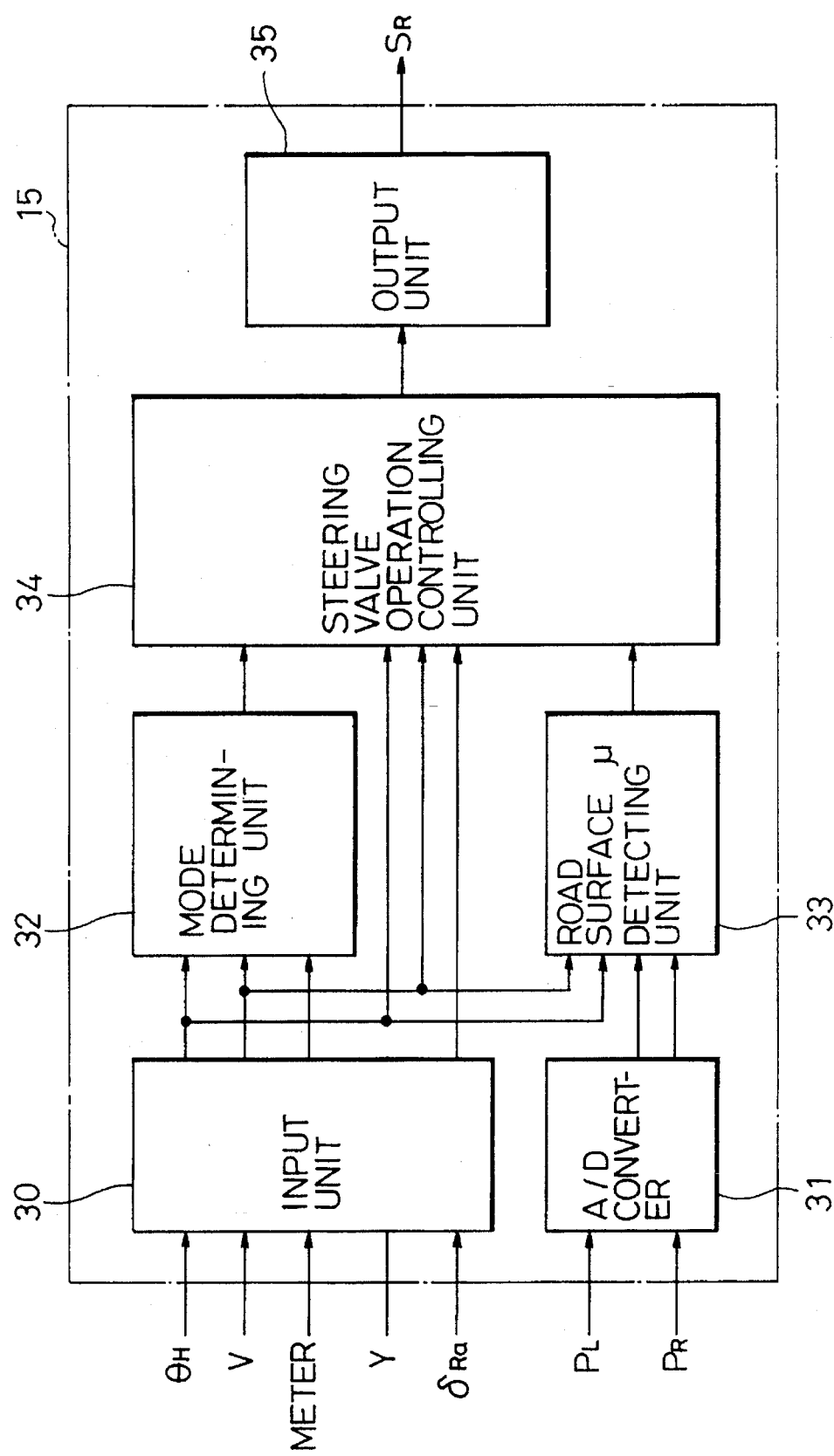
FIG. 19 is a functional block diagram showing the configuration of the controller of FIG. 18, which configuration is related to a four-wheel steering function.

As shown in FIG. 19, functionally, the controller 15 is provided with an input unit 30 for receiving data from the steering wheel angle sensor 16, a vehicle speed sensor 26, the yaw rate sensor 60, the meter and the rear-wheel steering angle sensor 17; an A/D converter 31 for receiving signals from the pressure sensors 18, 19; a mode determining unit 32 for determining the traveling mode of the vehicle in accordance with the data supplied from the input unit 30; and a road surface μ detecting unit 33 for computing a road surface friction coefficient, i.e., the road surface μ, in accordance with the data received from the input unit 30 and the A/D converter 31. The controller 15 is further provided with a steering valve operation controlling unit 34 for calculating an operation control signal SR for the rear-wheel steering valve 10 in accordance with the data received from the input unit 30, the mode determining unit 32, and the road surface μ detecting unit 33; and an output unit 35 for outputting the operation control signal SR, calculated by the controlling unit 34, to the rear-wheel steering valve 10.

The mode determining unit 32 has a function to select the steering mode rear wheels (e.g., stop of the control, large steering angle control of the rear wheels or phase control of the rear wheels) in accordance with the steering, wheel angle θH, the vehicle speed V, and the data supplied to the input unit 30 from the meter. The road surface μ detecting unit 33 has a function to detect the road surface μ from the steering wheel angle θH, the vehicle speed V, and the pressures PL, PR.

Figure 20:
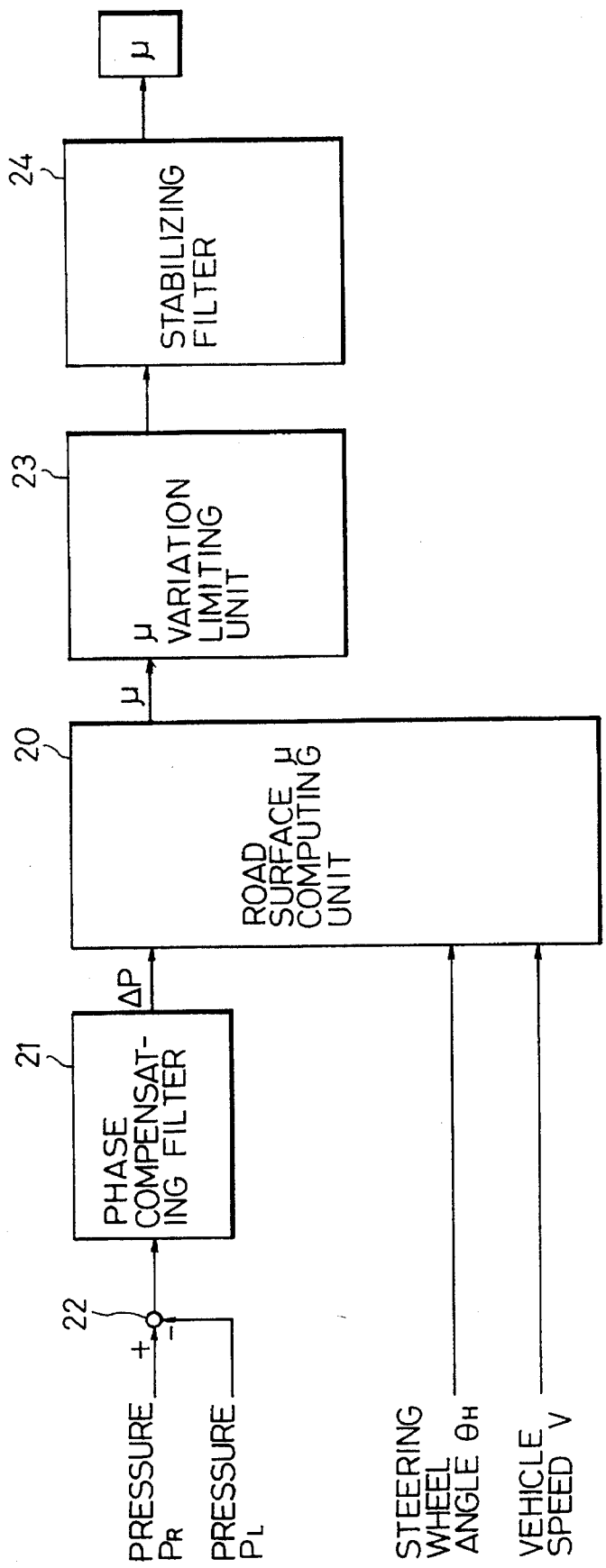
FIG. 20 is a functional block diagram showing, in detail, the configuration of a road surface μ detecting unit of FIG. 19.

As shown in FIG. 20, the road surface μ detecting unit 33 is equipped with a subtracting unit 22 for calculating the difference between the pressures PL and PR from the pressure sensors 18 and 19, as a power steering pressure ΔP. The power steering pressure ΔP from the subtracting unit 22 goes through a phase compensating filter 21 to eliminate noises and to compensate the advance of the phase of the power steering pressure ΔP with respect to the steering wheel angle θH during a steering transition period of the steering wheel 4 before it is supplied to the road surface μ computing unit 20. Supplied to the computing unit 20 are the steering wheel angle θH detected by the steering wheel angle sensor 16 and the vehicle speed V detected by the vehicle speed sensor 26. The road surface μ computing unit 20 calculates the road surface μ from the power steering pressure ΔP, the steering wheel angle θH, and the vehicle speed V according to the formula shown below:

$$P/\theta H = \mu \cdot C1 \cdot V2/(\mu + C2 \cdot V2)$$

where C1 and C2 denote constants.

Although a detailed explanation will be omitted, the formula shown above is derived from the fact that the power steering pressure ΔP, which is nearly proportional to cornering force, is proportional to the product of a side skid angle and the road surface μ, and that the side skid angle is represented as a function of the vehicle speed V, the steering wheel angle θH, and the road surface μ.

The road surface μ calculated by the road surface μ computing unit 20 is sent out from a μ variation limiter 23 to a stabilizing filter 24 when the changing rate thereof stays within a predetermined range, and the value of the road surface μ is stabilized by the filter 24.

The operation of the controller 15 serving as the road surface μ detecting unit 33 will now be briefly described.

The pressures PL, PR, the steering wheel angle θH, the vehicle speed V, and the actual yaw rate Y detected by the pressure sensors, 18, 19, the steering wheel angle sensor 16, the vehicle speed sensor 26 (meter), and the yaw rate sensor 60, respectively, are read into the controller 15.

Then, the power steering pressure ΔP (= PR–PL) is calculated, and the result is subjected to filtering to eliminate the phase advance of the power steering pressure ΔP in the steering transition period of the steering wheel 4. Next, a determination is made as to whether the steering wheel 4 is being turned or unturned according to the magnitude of the steering wheel angle θH and the changing trend thereof. If the steering wheel 4 is being turned, then it is further determined whether or not the absolute value of the steering wheel angle θH is a predetermined value θ1 (e.g., 10°) or more. If the steering wheel 4 has been kept unturned or if the steering wheel angle θH has not reached the predetermined value θ1, then the procedure following the reading of the sensor outputs is repeated. If the steering wheel θH is the predetermined value θ1 or more and the power steering pressure ΔP has been substantially risen, then the ratio (ΔP/θH) of the power steering pressure ΔP to the steering wheel angle θH is determined.

Next, it is determined whether the sign of ΔP/θH is positive or not, in order to determine whether the direction of the power steering pressure ΔP is identical to that of the steering wheel angle θH so as to accurately calculate the road surface μ by eliminating influences exerted by the inertia of the front wheels and the like. If the determination result is negative, then it is determined that phase inversion has taken place between the power steering pressure ΔP and the steering wheel angle θH due to the filtering, and the procedure following the reading of the sensor outputs is repeated. On the other hand, if the sign of ΔP/θH is positive, then a coefficient Kμ represented by the formula below is read out from a map stored in a memory (not shown) of the road surface μ computing unit 20.

$$K\mu = 1 + C2 \cdot V2/(C1 \cdot V2)$$

Then, the road surface μ is calculated by multiplying the coefficient Kμ by a value ΔP/θH. Further, a determination is made as to whether a changing rate (differential value) dμ/dt of the computed road surface μ is a predetermined value Δ (e.g., 0.2μ/sec) or less. If the determination result is negative, then the procedure following the reading of the sensor outputs is executed. On the other hand, if the determination result is positive, then the filtering for stabilizing the value of the road surface μ is carried out, to prevent a sudden change in the road surface μ before the road surface μ is supplied to the steering valve operation controlling unit 34.

Figure 21:
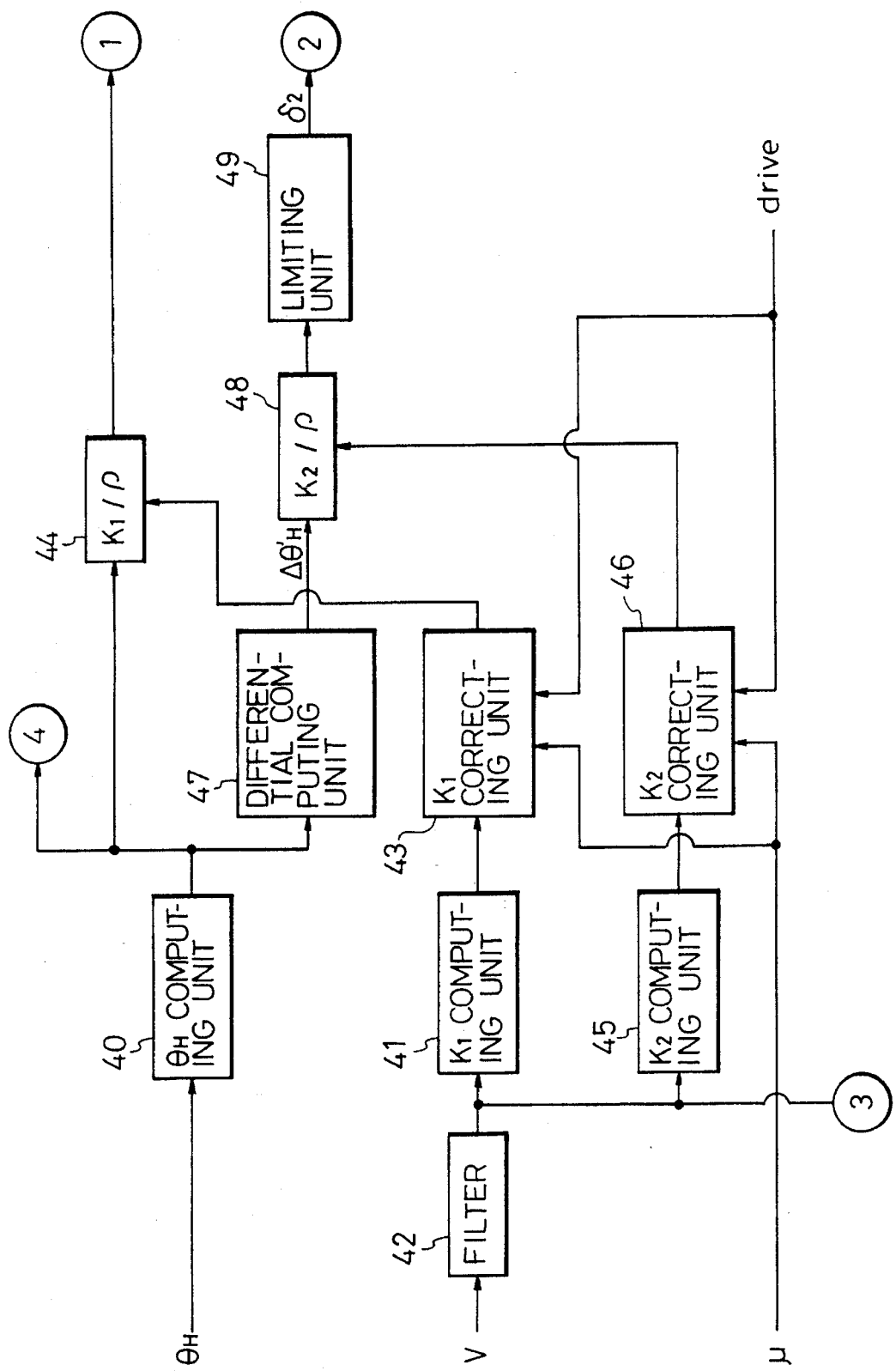
FIG. 21 is a functional block diagram showing the details of part of the configuration of a steering valve operation controller of FIG. 19, the part being related to a rear-wheel steering angle computing function.
Figure 22:
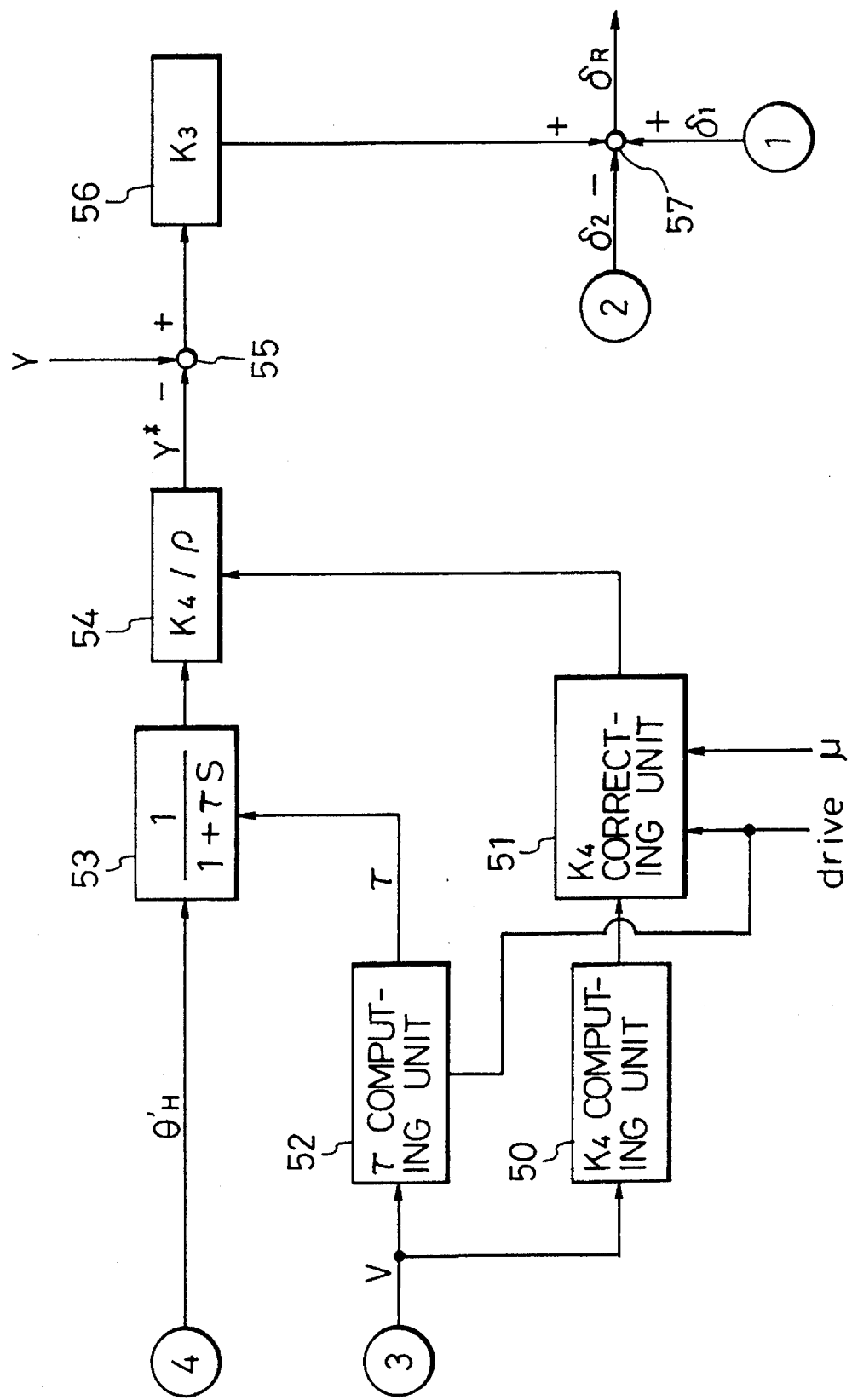
FIG. 22 is a functional block diagram showing the rest of the configuration of the steering valve operation controller.

The steering valve operation controlling unit 34 calculates the rear-wheel steering valve operation controlling signal SR in accordance with the output data received from the mode determining unit 32 and the road surface μ detecting unit 33; if the rear-wheel phase control is selected by the mode determining unit 32, then the controlling unit 34 computes the rear-wheel steering angle δR in accordance with the road surface μ, the steering wheel angle θH, and the vehicle speed V. The controlling unit 34 is configured as shown in FIGS. 21 and 22 in relation to the rear-wheel steering angle computing function thereof.

Figure 23:
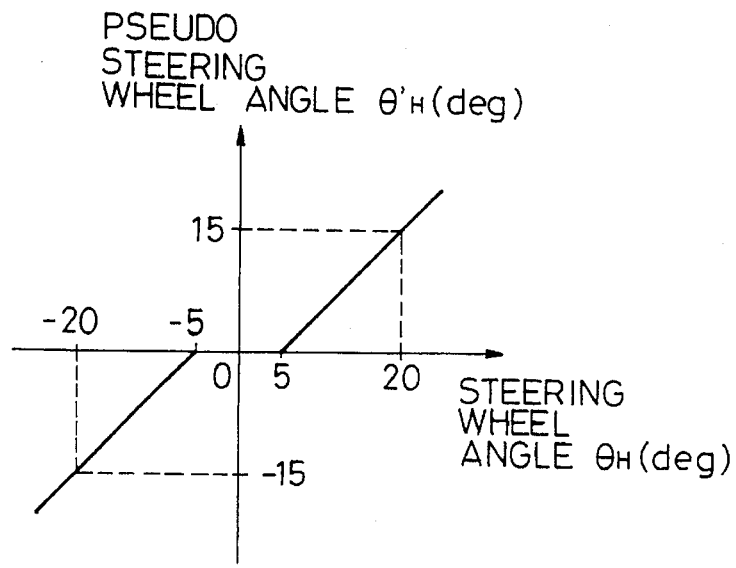
FIG. 23 is a graph showing a map used for computing a pseudo steering wheel angle θ'H based on steering wheel angle θH.

Specifically, the steering valve operation controlling unit 34 is functionally equipped with a pseudo steering angle computing unit 40 and various elements to be discussed later. In the computing unit 40, a pseudo steering wheel angle θ'H, which has a dead zone in a neutral section, which zone corresponds to an assembly error (e.g., ±5°) of the steering wheel angle sensor, is calculated using a map shown in FIG. 23 in accordance with the steering wheel angle θH signal supplied from the steering wheel angle sensor 16.

Figure 24:
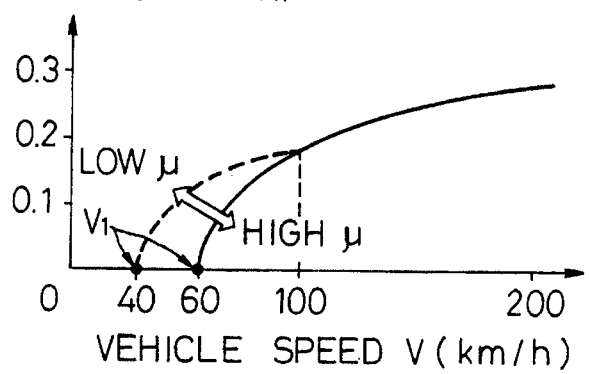
FIG. 24 is a graph showing a map used for computing a in-phase coefficient K1 based on vehicle speed V and for correcting the in-phase coefficient K1 in accordance with road surface μ.
Figure 25:
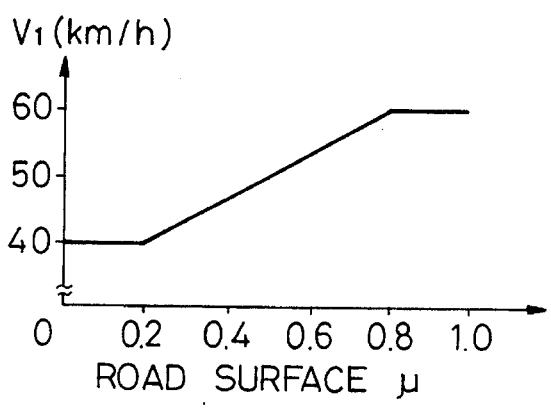
FIG. 25 is a graph showing a relationship between road surface μ and speed V1 at which the in-phase coefficient K1 rises.

In an in-phase coefficient computing unit 41, the in-phase coefficient K1 suited to a high-μ road is calculated in accordance with the vehicle speed V signal supplied from the vehicle speed sensor 26 via the filter 42 and in accordance with a map, which is stored in a memory (not shown) built in the controlling unit 34 and which corresponds to a vehicle speed vs. in-phase coefficient characteristic indicated by a solid line in FIG. 24. The in-phase coefficient K1, which represents the ratio of the front-wheel steering angle to the rear-wheel steering angle, takes a value which increases with an increase in the vehicle speed V in a vehicle speed range of a predetermined vehicle speed V1 (e.g., 60 km/h) or more.

The in-phase coefficient K1 calculated by the computing unit 41 is corrected by an in-phase coefficient correcting unit 43, as shown by a broken line in FIG. 24, in accordance with the road surface μ detected by the road surface μ detecting unit 33. Specifically, the in-phase coefficient K1 is corrected so that the in-phase coefficient K1 takes a larger value as the road surface μ decreases. In other words, the vehicle speed V is corrected so that a speed V1 at which the in-phase coefficient K1 starts to rise decreases as the road surface μ decreases (FIG. 24). As a result, the in-phase coefficient K1 suited to the actual road surface condition and the vehicle speed is determined.

Figure 28:
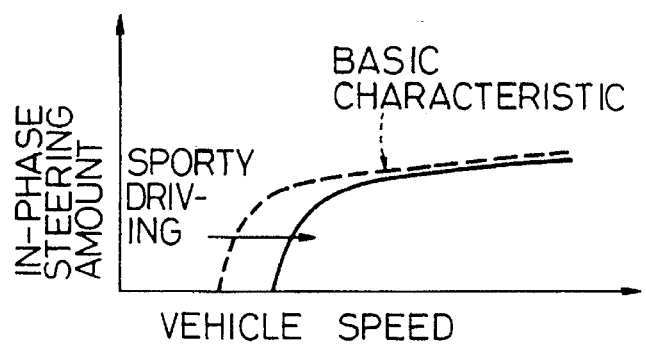
FIG. 28 is a graph showing correction of a vehicle speed vs. in-phase steering amount characteristic, which is effected according to an increase in sportiness.

The in-phase coefficient correcting unit 43 receives the output "drive" indicative of the driver's sportiness from the controller 15 serving as the neural network. The output "drive" is calculated in the same manner as that in the first embodiment described above and the explanation of the calculating procedure will be omitted. The in-phase coefficient correcting unit 43 corrects the in-phase coefficient K1, so that the in-phase coefficient K1 takes a smaller value especially on a mountainous road as the driver's sportiness indicated by the output "drive" increases. As a result, the in-phase steering amount decreases as the sportiness increases, as shown in FIG. 28.

Further, in a multiplying unit 44, the pseudo steering wheel angle θ'H is multiplied by a value (K1/ρ), which is obtained by dividing the corrected in-phase coefficient K1 by a steering gear ratio ρ, to thereby calculate a in-phase steering angle δ1 (= K1·θ'H/ρ), which serves as a first target rear-wheel steering angle in a medium- to high-speed area.

On the other hand, in relation to the calculation of an antiphase steering angle δ2 as the first target rear-wheel steering angle in a low-speed area, the vehicle speed V signal is supplied to an antiphase coefficient computing unit 45 via the filter 42. The road surface μ signal is also supplied to the antiphase coefficient correcting unit 46, and the pseudo steering wheel angle θ'H signal is supplied to a differential computing unit 47.

In the computing unit 45, an antiphase coefficient K2 suited to a high-μ road is calculated in accordance with a map, not shown. The antiphase coefficient K2 is set so that it takes a maximum value when the vehicle speed V takes a relatively low value (e.g., 30 km/h), while it takes a smaller value as the vehicle speed V deviates from 30 km/h.

Figure 29:
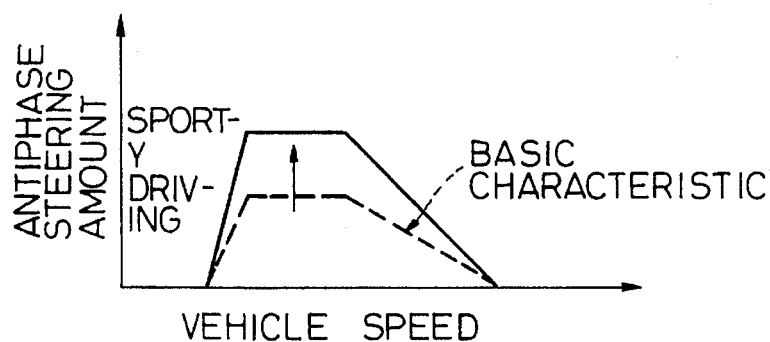
FIG. 29 is a graph showing correction of a vehicle speed vs. antiphase steering amount characteristic, which is effected according to an increase in sportiness.

The correcting unit 46 corrects the antiphase coefficient K2 so that the antiphase coefficient K2 takes a larger value as the road surface μ decreases. The correcting unit 46 receives a neural network output "drive" indicating the driver's sportiness from the controller 15. The correcting unit 46 corrects the antiphase coefficient K2 so that the antiphase coefficient K2 takes a larger value especially on a mountainous road as the driver's sportiness indicated by the output "drive" increases. As a result, the antiphase steering amount increases as the sportiness increases, as shown in FIG. 29.

Further, the differential computing unit 47 differentiates the pseudo steering wheel angle θ'H. The multiplying unit 48 multiplies a value (K2/ρ), which is obtained by dividing the antiphase coefficient K2 by the steering gear ratio ρ, by a differential value ΔΘ'H of the pseudo steering wheel angle, thereby determining an antiphase steering angle δ2. A limiter 49, which receives the antiphase steering angle δ2, outputs an input value when the absolute value of the antiphase steering angle δ2 is a predetermined value (e.g., 0.03°) or more, while it outputs a value of 0° when the input value is smaller than the predetermined value.

Figure 26:
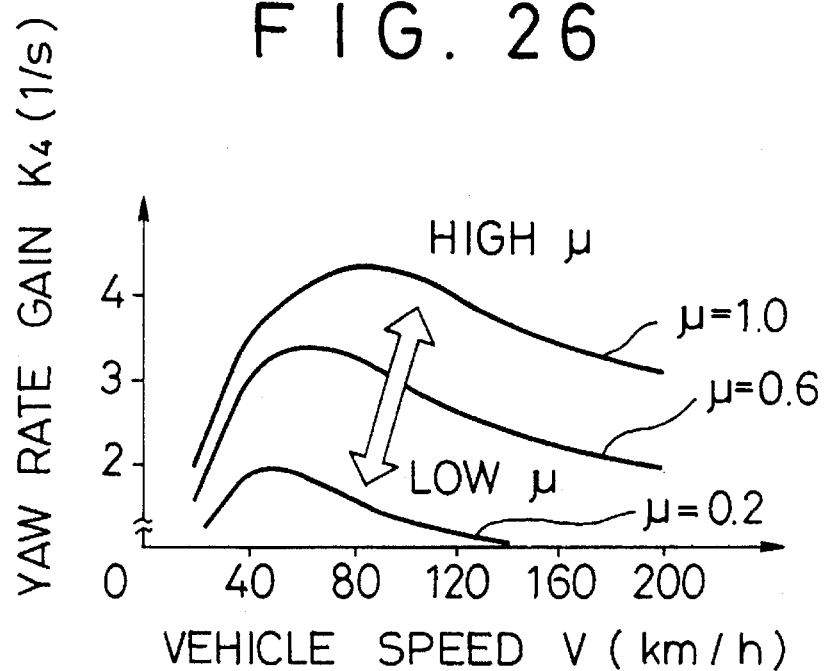
FIG. 26 is a graph showing a map used for computing a yaw rate gain K4 based on vehicle speed V and for correcting the yaw rate gain K4 in accordance with road surface μ.

In relation to yaw rate feedback control, the steering valve operation controller 34 is equipped with a yaw rate gain computing unit 50, which receives the vehicle speed V signal from the vehicle speed sensor 26 via the filter 42, and various elements to be discussed later (FIG. 22). The computing unit 50 calculates a yaw rate gain K4 suited to a high-μ road (μ= 1) in accordance with the vehicle speed V signal. The gain K4 is corrected by a yaw rate correcting unit 51 so that it takes a smaller value as the road surface μ decreases (FIG. 26). The correcting unit 51 receives a neural network output "drive" from the controller 15. The correcting unit 51 corrects the gain K4 so that the yaw rate gain K4 increases as the sportiness, which is indicated by the output "drive", increases (refer to FIG. 30).

Figure 27:
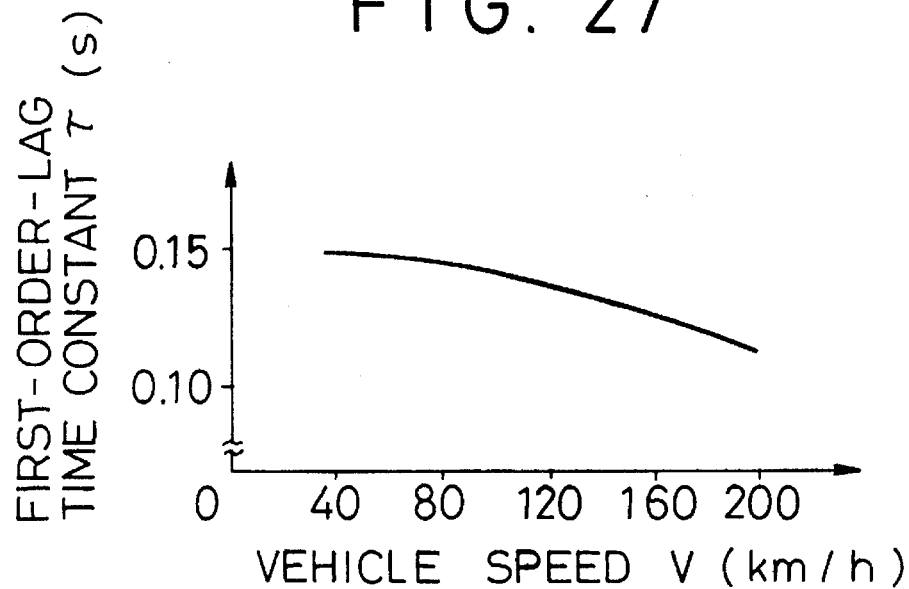
FIG. 27 is a graph showing a map used for computing a first-order-lag time constant τ based on vehicle speed V.
Figure 30:
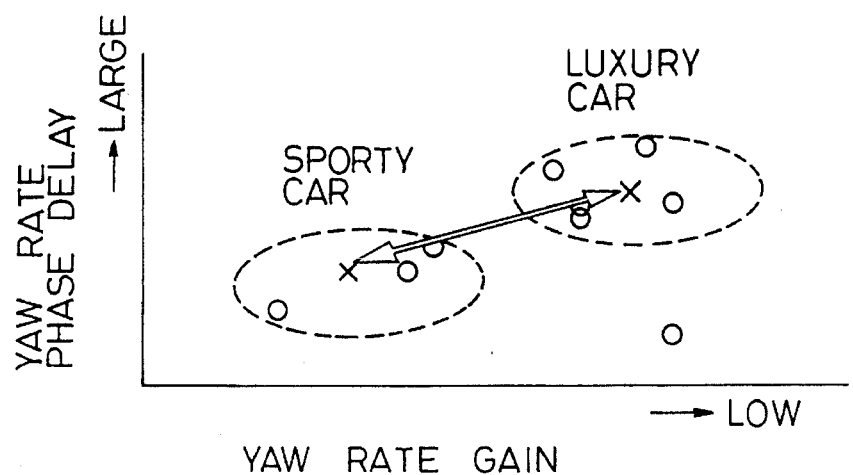
FIG. 30 is a graph showing selection of a yaw rate gain vs. yaw rate phase delay characteristic, which is effected in accordance with sportiness.

In addition, a time constant computing unit 52 calculates a first-order-lag time constant τ, which corresponds to the vehicle speed V signal supplied by the filter 42, in accordance with a vehicle speed vs. first-order-lag time constant characteristic shown in FIG. 27. The time constant τ takes a value, which gradually decreases as the vehicle speed V increases. The time constant computing unit 52 also receives the neural network output "drive" from the controller 15. The time constant computing unit 52 sets the time constant τ to a smaller value as the driver's sportiness, which is indicated by the output "drive," increases. As a result, the yaw rate phase delay decreases as the sportiness increases as shown in FIG. 30, thus providing the motorcar with the operating characteristics of a sporty car.

A first-order-lag computing unit 53 carries out first-order-lag computation on the pseudo steering wheel angle θ'H by using the first-order-lag time constant τ, in order to approximate the response delay of the car body with respect to the operation of the steering wheel 4. In a multiplying unit 54, a value (K4/ρ), obtained by dividing the corrected yaw rate gain K4 by the steering gear ratio ρ, is multiplied by the pseudo steering wheel angle θ'H, which has undergone the first-order-lag computation, thereby determining a target yaw rate Y* (= K4/(1+τS)θ'H/ρ).

Then, in a subtracting unit 55, the target yaw rate Y* is subtracted from an actual yaw rate signal Y received from a yaw rate sensor 60. A multiplying unit 56 multiplies a difference (Y–Y*) between the actual yaw rate and the target yaw rate by a feedback coefficient K3, thus determining a yaw rate feedback steering angle δ3 (= K3·(Y–Y*)).

In a subtracting unit 57, an antiphase steering angle δ2 is subtracted from a sum of the in-phase steering angle δ1 and the yaw rate feedback steering angle δ3, thus calculating a rear-wheel steering angle δR as a second target rear-wheel steering angle.

When the rear-wheel steering angle δR has been calculated as described above, the steering valve operation controlling unit 34 sends the operation control signal SR, which has been calculated based on the rear-wheel steering angle δR, to the rear-wheel steering valve 10 via the output unit 35. This causes the valve 10 and the rear-wheel steering actuator 11 to operate so that the actual steering angles of the rear wheels 13L and 13R coincide with the rear-wheel steering angle δR.

As discussed above, the method of this embodiment makes it possible to variably adjust the running characteristic of a vehicle, by controlling the in-phase steering amount, the antiphase steering amount, the yaw rate gain, and the yaw rate phase delay in accordance with the neural network output "drive," indicative of the driver's sportiness in driving, as vehicle maneuvering state. As a result, the vehicle is provided with the characteristic of a sporty car when the driving sportiness of the driver increases, while it is given the characteristic of a luxury car when the sportiness decreases and leisurely driving takes over.

A vehicle running characteristic control method according to a fourth embodiment of the present invention will now be described.

This embodiment and fifth and sixth embodiments to be discussed later share the same basic configuration with the 4-wheel steering system according to the third embodiment discussed above, however, they are applied to a 4-wheel steering system, which is controlled by a different method. The explanation on the configuration common to the third embodiment and to the fourth through sixth embodiments will be omitted.

In this embodiment, the steering valve operation controlling unit 34 calculates the rear-wheel steering valve operation control signal SR in accordance with the output data received from the input unit 30 and the mode determining unit 32, as in the third embodiment. The controlling unit 34 computes the rear-wheel steering angle δR based on road surface μ, steering wheel angle θH and vehicle speed V in accordance with the following publicly known computing formula when the mode determining unit 32 selects the rear-wheel phase control:

$$\delta R = K1 \cdot \delta F + K3 \cdot (Y - Y^*)$$

where symbols K1, K3, δF, Y, and Y* denote the in-phase coefficient, feedback coefficient, front-wheel steering angle, actual yaw rate, and target yaw rate, respectively.

In the above computation formula, the vehicle running characteristic can be changed to that of the luxury car or sporty car, by changing the in-phase coefficient K1 and the feedback coefficient K3 (FB coefficient in Table 2) in accordance with the control rules shown in Table 2. More specifically, increasing the in-phase coefficient K1 without changing the feedback coefficient K3 provides the luxury car characteristic, while increasing the feedback coefficient K3 and decreasing the in-phase coefficient K1 provide the sporty car characteristic.

TABLE 2

| | Characteristic of Car Response | In-Phase Coefficient K1 | FB Coefficient K3 |
|---|---|---|---|
| Luxury | Roll-based (Priority is given to lateral acceleration phase) | Increase | — |
| Sporty | Yaw-based (Priority is given to yaw gain) | Decrease | Increase |

Figure 31:
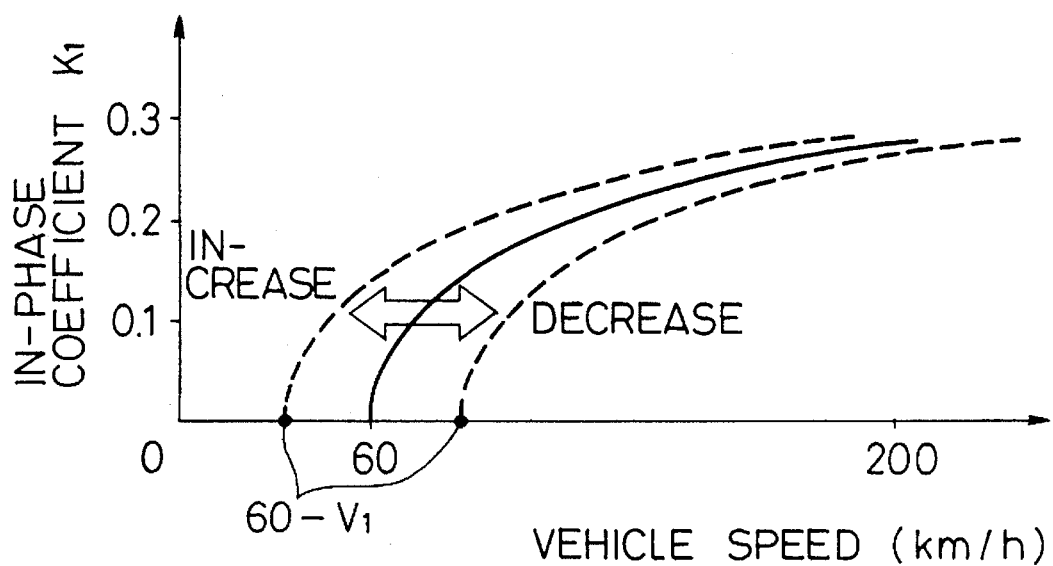
FIG. 31 is a map showing a relationship between vehicle speed and in-phase coefficient.

The controller 15 calculates the in-phase coefficient K1 corresponding to the vehicle speed V in accordance with the map, which corresponds to the vehicle speed vs. in-phase coefficient characteristic shown by the solid line in FIG. 31 and which is stored in the memory beforehand. The in-phase coefficient K1, which indicates the ratio of the rear-wheel steering angle to the front-wheel steering angle, takes a value, which increases as the vehicle speed increases in a vehicle speed range of a predetermined vehicle speed (e.g., 60 km/h) or more.

A map, exemplarily shown in Table 3, is stored beforehand in the memory of the controller 15. The map has optimum increasing/decreasing speed V1 and feedback coefficient K3, which have been set to match road traffic conditions and a vehicle maneuvering state (sportiness).

An expressway degree cannot be determined from the aforesaid estimating method, but the expressway degree in this case is defined as the value obtained by subtracting the city road degree from "100."

As shown in Table 3, the road traffic condition is classified into four groups, namely, expressway, mountainous road, city road, and jammed road. Of the four traffic conditions, the appropriate one is selected as the current traffic condition. The maneuvering state is classified into three levels, namely, leisurely, average, and sporty, which correspond to the sportiness "drive" ranges of "0 to 29," "30 to 79," and "80 to 100," respectively. In other words, the current maneuvering state is determined in accordance with the sportiness "drive."

The in-phase coefficient K1 is corrected as shown by the dotted lines shown in FIG. 31 in accordance with the increasing/decreasing speed V1, which is read out in accordance with the aforesaid map. More specifically, the in-phase coefficient K1 is corrected so that the in-phase coefficient K1 takes a larger value as the increasing/decreasing speed V1 takes a positive value. In other words, the characteristic line of the map is moved so that a rise starting speed "60–V1" of the in-phase coefficient K1 decreases as the increasing/decreasing coefficient takes a positive value. As a result, the in-phase coefficient K1 matched to the road traffic condition, vehicle maneuvering state, and vehicle speed can be determined.

TABLE 3

| Road Traffic Condition | | Maneuvering State | | |
|---|---|---|---|---|
| | | Leisurely | Average | Sporty |
| Expressway | V1 | 0 | 0 | 10 |
| | K3 | 0.05 | 0.05 | 0.08 |

TABLE 3-continued

| Road Traffic Condition | | Maneuvering State | | |
|---|---|---|---|---|
| | | Leisurely | Average | Sporty |
| Mountainous Road | V1 | −10 | −10 | −10 |
| | K3 | 0.05 | 0.07 | 0.1 |
| City Road | V1 | 0 | 0 | −5 |
| | K3 | 0.05 | 0.05 | 0.08 |
| Jammed Road | V1 | 0 | 0 | 0 |
| | K3 | 0.05 | 0.05 | 0.05 |

Moreover, from the aforesaid map, the feedback coefficient K3 suited for the road traffic condition, vehicle maneuvering state, and vehicle speed can be determined.

The steering valve operation controlling unit 34 outputs the operation control signal SR, which corresponds to the difference between the target rear-wheel steering angle δR calculated above and an actual rear-wheel steering angle δRa received from the rear-wheel steering angle sensor 17, to the rear-wheel steering valve 10 via the output unit 35. This causes the rear-wheel steering actuator 11 to work to make the actual steering angle of the rear wheels 13L and 13R match the rear-wheel steering angle δR.

According to the aforesaid 4-wheel steering system, as shown in Table 4, the steering characteristics matching each road traffic condition and vehicle maneuvering state can be achieved, leading to improved drive feeling at the time when the rear wheels are steered.

TABLE 4

| Traffic Condition | Maneuvering State | | |
|---|---|---|---|
| | Leisurely | Average | Sporty |
| Expressway | Luxury | Average | Sporty |
| Mountainous Road | Average | Sporty | Sporty |
| City Road | Average | Average | Sporty |
| Jammed Road | Average | Average | Average |

The following describes a vehicle running characteristic control method according to a fifth embodiment of the present invention.

In this embodiment and a sixth embodiment to be discussed later, some of the inputs and outputs related to the third embodiment described above are dispensable and therefore, unnecessary input and output sensors or the like may be omitted.

The steering valve operation controlling unit 34 in this embodiment is similar to that in the third embodiment in that the rear-wheel steering valve operation control signal SR is calculated but it is different in that it computes the rear-wheel steering angle δR according to the following publicly known computation formula based on the steering wheel angle θH, etc.

$$\delta R = K1 \cdot \delta F - K2 \cdot (d\delta F/dt)$$

where symbols K1, K2, δF, and dδF/dt denote the in-phase coefficient, antiphase coefficient, front-wheel steering angle, and the steering angle velocity of the front wheels, respectively.

In the above computation formula, the vehicle characteristics can be changed to those of a luxury car or sporty car by changing the in-phase coefficient K1 and the antiphase coefficient K2 in accordance with the control rule shown in Table 5. More specifically, increasing the in-phase coefficient K1 and decreasing the antiphase coefficient K2 provide the luxury vehicle characteristics, while decreasing the in-phase coefficient K1 and increasing the antiphase coefficient K2 provide the sporty vehicle characteristics.

TABLE 5

| | Characteristics of Car Response | In-Phase Coefficient K1 | AntiPhase Coefficient K2 |
|---|---|---|---|
| Luxury | Roll-based (Priority is given to lateral acceleration phase) | Increase | Decrease |
| Sporty | Yaw-based (Priority is given to yaw gain) | Decrease | Increase |

The controller 15 calculates the in-phase coefficient K1 corresponding to the vehicle speed V in accordance with the map (the same as that in the third embodiment), which corresponds to the vehicle speed vs. in-phase coefficient characteristic shown by the solid line in FIG. 31 and which is stored in the memory beforehand.

Figure 32:
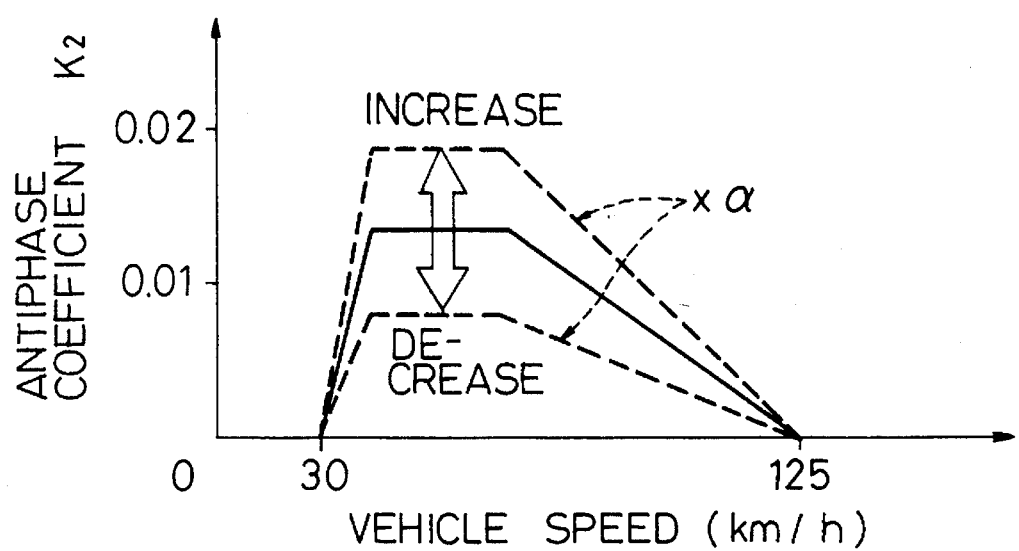
FIG. 32 is a map showing a relationship between vehicle speed and antiphase coefficient.

The controller 15 calculates the antiphase coefficient K1 corresponding to the vehicle speed V in accordance with the map, which corresponds to the vehicle speed vs. antiphase coefficient characteristic indicated by the solid line shown in FIG. 32 and which is stored in the memory beforehand. The antiphase coefficient K2 takes a value, which increases or decreases as the vehicle speed increases in a predetermined vehicle speed range (e.g., a vehicle speed range of 30 km/h to 125 km/h).

A map, exemplarily shown in Table 6, is stored beforehand in the memory of the controller 15. The map has optimum increasing/decreasing speed V1 and an increasing/decreasing coefficient α, which have been set to match a road traffic condition (e.g., jammed road) and vehicle maneuvering state (sportiness).

TABLE 6

| Road Traffic Condition | | Maneuvering State | | |
|---|---|---|---|---|
| | | Leisurely | Average | Sporty |
| Expressway | V1 | 0 | 0 | 10 |
| | α | 1.0 | 1.0 | 1.3 |
| Mountainous Road | V1 | −10 | −10 | −10 |
| | α | 1.0 | 1.2 | 1.5 |
| City Road | V1 | 0 | 0 | −5 |
| | α | 1.0 | 1.0 | 1.3 |
| Jammed Road | V1 | 0 | 0 | 0 |
| | α | 1.0 | 1.0 | 1.0 |

In the map of Table 6, just like in Table 3, the road traffic condition is classified into four groups, namely, expressway, mountainous road, city road, and jammed road, and the vehicle maneuvering state is classified into three levels, namely, leisurely, average, and sporty.

The in-phase coefficient K1 is corrected as shown by the dotted lines of FIG. 31 in accordance with the increasing/decreasing speed V1 read out according to the map of Table 6, as in the case of the fourth embodiment. This determines the in-phase coefficient K1 suited to the road traffic condition, vehicle maneuvering state and vehicle speed.

The antiphase coefficient K2 is corrected as shown by the dotted lines of FIG. 32 in accordance with the increasing/decreasing coefficient α read out according to the map of Table 6. More specifically, the antiphase coefficient K2 is corrected so that the antiphase coefficient K2 takes a larger value as the increasing/decreasing coefficient α takes a value larger than "1." In other words, the characteristic line is multiplied by α and moved accordingly in accordance with the determined increasing/decreasing coefficient α. As a result, an antiphase coefficient K2 suited to the road traffic condition, vehicle maneuvering state, and vehicle speed can be determined.

After that, the steering valve operation controlling unit 34 outputs the operation control signal SR, which corresponds to the difference between the target rear-wheel steering angle δR calculated above and the actual rear-wheel steering angle δRa received from the rear-wheel steering angle sensor 17, to the rear-wheel steering valve 10. This causes the rear-wheel steering actuator 11 to work to make the actual steering angle of the rear wheels 13L and 13R match the rear-wheel steering angle δR.

Accordingly, as shown in Table 4, the steering characteristics matching each road traffic condition and vehicle maneuvering state can be achieved also in the 4-wheel steering system of the fifth embodiment in the same manner as the fourth embodiment, leading to improved drive feeling when steering the rear wheels.

The following discusses a vehicle running characteristic control method according to a sixth embodiment of the present invention.

In this embodiment, the steering valve operation controlling unit 34 calculates the rear-wheel steering angle δR in accordance with the steering wheel angle θH and the yaw rate Y according to the following publicly known arithmetic formula:

$$\delta R = a\delta F + b\gamma \, (a<0)$$

where δF and δR indicate the front-wheel steering angle and the rear-wheel steering angle, respectively, γ indicates the yaw angle velocity, and a and b indicate coefficients.

As the first coefficient a, a constant, which is preset to, for example, −0.048, is used. The first coefficient a is stored beforehand in the memory (not shown) built in the controller 15, which serves as the controlling unit 34. The explanation on the calculating method of the first coefficient a will be omitted since it is publicly known.

The second coefficient b is preset to a value, which suppresses the centroid slip angle when the vehicle turns, and which is stored in the memory. The second coefficient b takes a positive value to improve stability of the vehicle against disturbance, including cross wind and uneven spots on a road surface, which is applied to the vehicle.

In the above formula, the vehicle characteristics can be changed to those of the luxury car or sporty car by changing the second coefficient b in accordance with the control rule shown in Table 7. More specifically, increasing the second coefficient b provides the luxury vehicle characteristics, while decreasing the second coefficient b provides the sporty vehicle characteristics.

TABLE 7

|  | Characteristics of Car Response | Second Coefficient b |
| --- | --- | --- |
| Luxury | Roll-based (Priority is given to lateral acceleration phase.) | Increase |
| Sporty | Yaw-based (Priority is given to yaw gain.) | Decrease |

TABLE 8

|  | Running State | | |
| --- | --- | --- | --- |
| Traffic Condition | Leisurely | Average | Sporty |
| Expressway | Increase | Average | Slightly decrease |
| Mountainous Road | Slightly decrease | Decrease | Decrease |
| City Road | Average | Average | Decrease |
| Jammed Road | Average | Average | Average |

A map, exemplarily shown in Table 8, is stored in advance in the memory of the controller 15. The map provides preset optimum increasing/decreasing levels of the second coefficient b for each road traffic condition (e.g., jammed road) and the maneuvering state of the driver (sportiness).

In the map of Table 8, the road traffic condition is classified into four groups, namely, the expressway, mountainous road, city road, and jammed road, and the maneuvering state is classified into three levels, namely, leisurely, average, and sporty, as in the case of Table 3.

The second coefficient b is corrected in accordance with the aforesaid map. For instance, the second coefficient b is set to "slightly decrease," when it is estimated by the aforesaid estimating method that the road traffic condition is expressway and the maneuvering state (sportiness) of the driver is "sporty." In Table 8, "slightly decrease" refers to the increasing/decreasing level midway between "average" and "decrease."

Thereafter, the steering valve operation controlling unit 34 outputs the operation control signal SR, which corresponds to the difference between the target rear-wheel steering angle δR calculated above and the actual rear-wheel steering angle δRa. This causes the rear-wheel steering actuator 11 to work to make the actual steering angle of the rear wheels 13L and 13R match the rear-wheel steering angle δR.

Accordingly, as shown in Table 4, the steering characteristics matching each road traffic condition and maneuvering state can be achieved also in the 4-wheel steering system of the sixth embodiment in the same manner as the fourth and fifth embodiments, leading to improved drive feeling when steering the rear wheels.

The following discusses a vehicle running characteristic control method according to a seventh embodiment of the present invention.

This embodiment and the later-mentioned eighth through tenth embodiments are intended to control the vehicle running characteristic to adapt the same to the vehicle maneuvering state (sportiness) estimated by the estimating method of the first embodiment, for example. The procedure for estimating the sportiness is identical to that of the first estimating method described above; therefore, the explanation on the configuration of the equipment will be omitted.

This embodiment is applied to a motorcar equipped with a power steering unit, which is capable of controlling the steering power of a steering wheel, and which serves as an apparatus for controlling the vehicle running characteristic. In the following description and FIG. 33, the same members as those in the third embodiment are given the same numerals.

Figure 33:
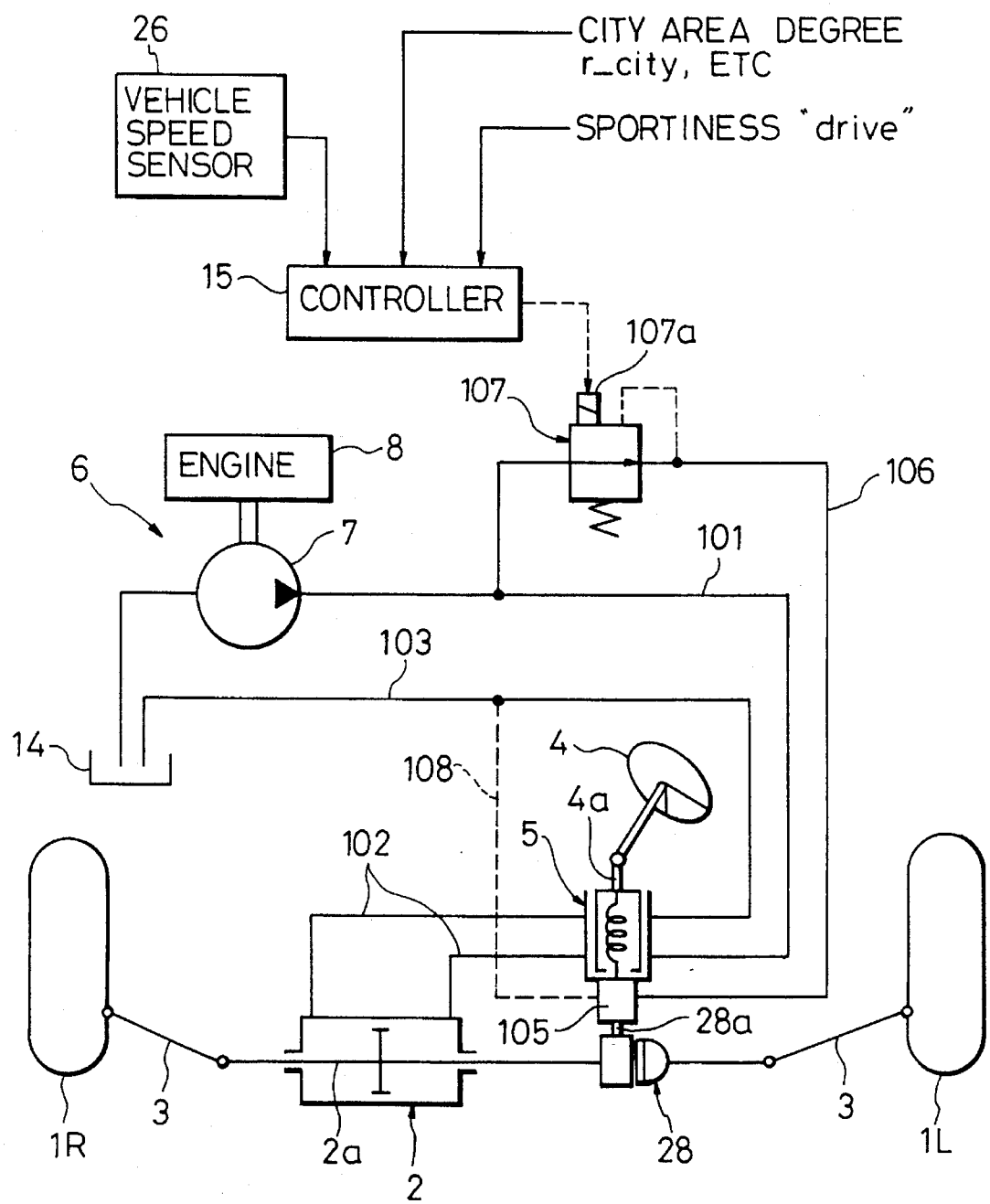
FIG. 33 is a schematic configuration diagram of a power steering unit mounted on a vehicle, to which a vehicle running characteristic control method according to a seventh embodiment of the present invention is applied.

Referring to FIG. 33, in the power steering unit, a front wheel 1R is coupled to a piston rod 2a in a power cylinder 2 via a knuckle arm 3. Specifically, the power cylinder 2 comprised of a double-rod hydraulic cylinder, and the other piston rod 2a of the power cylinder 2 is coupled to the other front wheel 1L via a knuckle arm 3.

The power cylinder 2 is connected to an oil pressure supply source 6 via a hydraulic circuit. In this case, the oil pressure supply source 6 is equipped with a hydraulic pump 7, which is driven by an engine 8 of the motorcar. The hydraulic pump 7 discharges the hydraulic oil, which has been pumped up from a reservoir tank 14, through a discharging port thereof. The hydraulic circuit has a supply line 101 extending from the discharge port of the hydraulic pump 7, and the downstream side of the supply line 101 from a direction control valve 5 is split into two branch pipes 102. These branch pipes 102 are respectively connected to two pressure chambers of the power cylinder 2.

The direction control valve 5 consists of a 4-port, 3-position directional control valve (actually a rotary valve) with a restrictor; connected to three out of the four ports are the supply line 101 and the branch pipes 102, the remaining port being connected to the reservoir tank 14 via a return pipe 103. Although the switching of the directional control valve 5 is not illustrated in detail, it is accomplished by operating the steering wheel 4. The flowing direction of the hydraulic oil supplied from the hydraulic pump 7 to the power cylinder 2 is controlled in accordance with the operating direction of the steering wheel 4. Hence, when the steering wheel 4 is steered, the power cylinder 2 is operated in accordance with the steering direction, thereby aiding the steering power of the steering wheel 4. Specifically, as publicly known, the piston rod 2a of the power cylinder 2 is actuated by a rack and pinion 104 interlocked with the operation of the steering wheel 4. At this time, the power cylinder 2 is also actuated, thus permitting easy operation of the steering wheel 4. When the steering wheel 4 is not in operation, the direction control valve 5 is in the neutral position, causing the two pressure chambers of the power cylinder 2 to be connected to the lower pressure side, i.e., to the reservoir tank 14 via the direction control valve 5. In FIG. 33, the rack of the rack and pinion 104 is indicated so that the axis thereof is different by 90 degrees.

The power steering controller of this embodiment is further provided with a steering power changing unit 105 for changing the steering power (tactile feedback) of the steering wheel 4.

The steering power changing unit 105 is provided on a coupling section located between an input shaft 4a, through which the turn of the steering wheel 4 is entered, and an output shaft 104a, which is connected integral with the pinion gear side of the rack and pinion 104. This unit 105 is actuated by the hydraulic oil supplied from the hydraulic pump 7. The input shaft 4a and the output shaft 104a are relatively rotatable within a predetermined range; the directional switching of the directional control valve 5 is performed by the difference in rotational angle between the input shaft 4a and the output shaft 104a.

The steering power changing unit 105 is equipped with a plurality of plungers which hydraulically slide toward the output shaft 104a although no detailed illustration is given. These plungers press the input shaft 4a upon receipt of oil pressure, thus suppressing the relative rotation of the input shaft 4a and the output shaft 104a. When the force of the plungers pressing the input shaft 4a is large, the relative rotation of the input shaft 4a and the output shaft 104a decreases, thus suppressing the operation of the direction control valve 5. As a result, the steering power (tactile feedback) of the steering wheel 4 increases (feels heavier). When the force of the plungers pressing the input shaft 4a is small, the relative rotation of the input shaft 4a and the output shaft 104a increases, permitting easy operation of the direction control valve 5. As a result, the steering power (tactile feedback) of the steering wheel 4 decreases (feels lighter). The steering power of the steering wheel 4 can be continuously changed by continuously changing the force of the plungers pressing the input shaft 4a.

Regarding a hydraulic system of the steering power changing unit 105, connected to the oil pressure supply port of the steering power changing unit 105 is a branch pipe 106 extending from some midpoint of a supply pipe 101, which connects the hydraulic pump 7 and the direction control valve 5. At some midpoint of the branch pipe 106, an electromagnetic pressure control valve 107 is provided, and through this pressure control valve 107, the hydraulic oil discharged from the hydraulic pump 7 is supplied to the steering power changing unit 105. The hydraulic oil supplied to the steering power changing unit 105 flows into the pressure chamber of a plunger, and is discharged into the return pipe 103 via a pipe 108 through an orifice (not shown).

The working oil pressure supplied to the steering power changing unit 105, i.e., the pressure applied to the plungers, is adjusted in accordance with the value of electric current supplied to a solenoid 107a of the pressure control valve 107 which is electrically connected to the controller 15 for controlling the value of the current supplied to the solenoid 107a. Thus, the pressure control valve 107 is controlled by the amount of current supplied to the solenoid 107a. However, turning ON or OFF of the electric current supplied to the solenoid 107a may be duty-controlled.

Hence, the steering power of the steering wheel 4 can be controlled by controlling the value of the current supplied to the solenoid 107a of the pressure control valve 107.

When the value of current supplied to the solenoid 107a is maximum, the pressure control valve 107 is closed and no working oil pressure is supplied to the steering power changing unit 105, allowing the input shaft 4a and the output shaft 104a to relatively rotate without resistance. As a result, the direction control valve 5 operates normally and the power cylinder also normally operates, resulting in low power required for steering the steering wheel 4. As the value of current supplied to the solenoid 107a decreases, the opening degree of the pressure control valve increases and the working oil pressure supplied to the steering power changing unit 105 increases, suppressing the relative rotation of the input shaft 4a and the output shaft 104a. As a result, the operation of the direction control valve 5 is suppressed and the operation of the power cylinder 2 is accordingly suppressed, leading to high power required for steering the steering wheel 4.

The controller 15 receives, as input parameters, the vehicle speed V (corresponding to the aforesaid vehicle speed signal vx) from the vehicle speed sensor 26, and the information on road traffic condition (corresponding to the aforesaid city area degree r_city, etc.) and the information on maneuvering state (corresponding to the aforesaid sportiness "drive") obtained by the estimating method described previously. Based on these input parameters, the controller 15 calculates the value of current to be supplied to the solenoid 107a of the pressure control valve 107.

The desired (ideal) steering power characteristic of the steering wheel 4 for each road traffic condition and maneuvering state are shown in Table 9. According to Table 9, lower power required for steering is preferable when the road traffic condition is a city road and the maneuvering state, i.e., the sportiness, is low, while a slightly higher power required for steering is preferable when the sportiness is high. Further, when the road traffic condition is an expressway and the sportiness is low, slightly higher power required for steering is preferable, while higher power required for steering is preferable when the sportiness is high. When the road traffic condition is a jammed road, the steering power should be low regardless of the sportiness. Moreover, when the road traffic condition is a mountainous road and the sportiness is low, the steering power should be low, and when the sportiness is high, the steering power should be high.

TABLE 9

| Road Traffic Condition | Low ←— Maneuvering State (Sportiness "drive") —→ High | |
| --- | --- | --- |
| City Area | Low steering power ←— | —→ Slightly high steering power |
| Expressway | Slightly high ←— steering power | —→ High steering power |
| Jammed Road | ←— Low steering power —→ | |
| Mountainous Road | Low steering power ←— | —→ High steering power |

The expressway degree as the road traffic condition is not estimated from the estimating method described above, however, the expressway degree can be defined as the one taking a value, which is exactly the opposite from the city road degree. Hence, when the city road degree is small, the expressway degree takes a large value, and when the city road degree is large, the expressway degree takes a small value.

Figure 34:
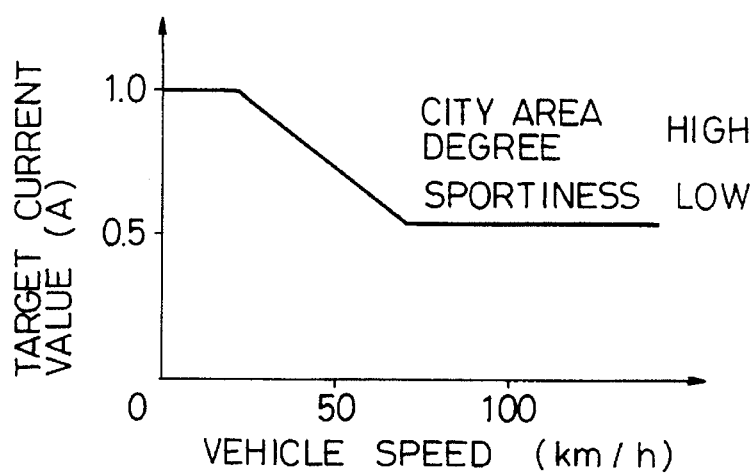
FIG. 34 is a graph showing a vehicle speed vs. electric current characteristic (low city area degree, low sportiness)

The vehicle speed vs. current characteristic map shown in FIG. 34 is stored in the memory of the controller 15 in advance. The controller 15 determines a target current value suited for the vehicle speed in accordance with the map, and supplies currents to the solenoid 107a according to the target current value. The map of characteristic is established based on a case wherein the city road degree is minimum (the expressway degree is high) and the level of sportiness is minimum.

Up to a vehicle speed of 20 km/h, for example, the target current value takes a maximum value (e.g., 1 A). When the vehicle speed is in the range of 20 to 70 km/h, for example, the target current value decreases at a fixed rate from the maximum value as the vehicle speed increases. When the vehicle speed exceeds, for example, 70 km/h, the target current value stays at a fixed current value (e.g., 0.55 A), which is approximately half the maximum value. The current supplied to the solenoid takes a different value, depending on the standard of the solenoid.

Figure 35:
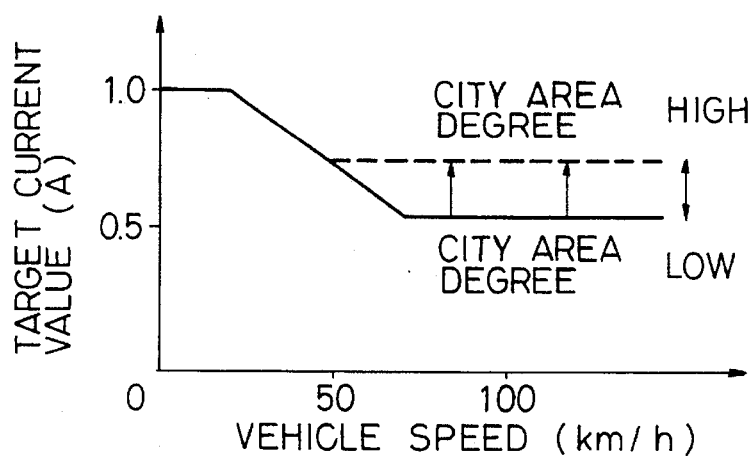
FIG. 35 is a graph showing a vehicle speed vs. electric current characteristic (increased city area degree)

The controller 15 corrects the electric current characteristic in accordance with changes in the road traffic condition and maneuvering state. More specifically, the controller 15 corrects the current characteristic as shown by the broken line in FIG. 35 in accordance with an entered city area degree (r_city). In other words, the target current value of the current characteristic is corrected so that the target current value increases as the city area degree increases. As a result, the steering power of the steering wheel 4 decreases (feels lighter) as the city area degree increases. On the other hand, the controller 15 sets the target current value to the maximum value (e.g., 1 A) regardless of the maneuvering state when it receives especially the jammed road degree as the information on the road traffic condition. This gives an extremely light steering power of the steering wheel 4, providing an optimum steering characteristic for driving on the jammed road.

Figure 36:
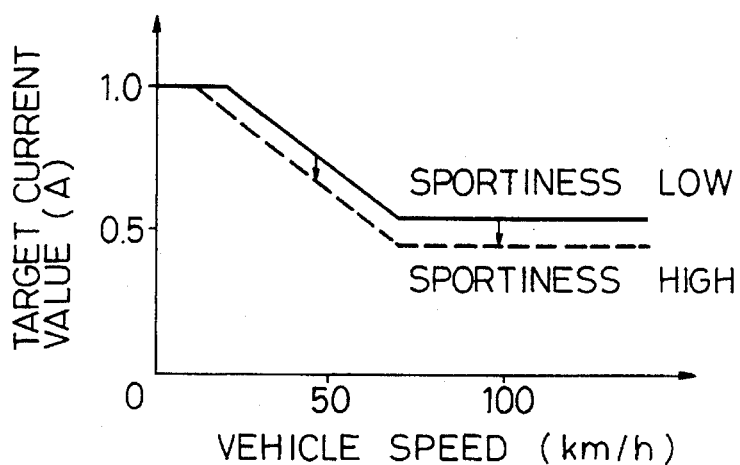
FIG. 36 is a graph showing a vehicle speed vs. electric current characteristic (sportiness)

The controller 15 corrects the current characteristic as shown by the broken line in FIG. 36 in accordance with the sportiness "drive" which it receives. Specifically, the target current value of the current characteristic is corrected so that the target current value takes a smaller value as the sportiness "drive" increases. As a result, the steering power of the steering wheel 4 increases (feels heavier).

Results of tests with an actual vehicle revealed that the mountainous road degree can be considered to lie midway between the city road degree and the expressway degree; therefore, it was decided that the parameter for correcting the current characteristic should be applied only to the city area degree (r_city).

As described above, the power steering controller of this embodiment is designed to variably control the value of current supplied to the solenoid of the pressure control valve, which is the control parameter of the power steering controller, in accordance with the city road degree and the like, serving as the road traffic condition. This makes it possible to adjust the steering power characteristic of the steering wheel in accordance with the city road degree and the like. As a result, the vehicle is provided with the steering characteristic of the steering wheel, which matches the present road traffic condition.

In addition, the value of current supplied to the solenoid of the pressure control valve, which is the control parameter of the power steering controller, is controlled in accordance with the neural network output "drive" indicative of the sportiness as the maneuvering state intended by the driver. This makes it possible to adjust the steering power characteristic of the steering wheel in accordance with the sportiness. As a result, when the driver's sportiness in driving increases, the vehicle is provided with the steering characteristic of a sporty car, while it is provided with the steering characteristic of a luxury car when the sportiness decreases and leisurely operation takes over.

A vehicle running characteristic control method according to an eighth embodiment of the present invention will now be described.

This embodiment is applied to a motorcar, which is equipped with a speed change controller of an automotive automatic transmission as the apparatus for controlling the vehicle running characteristic.

Figure 37:
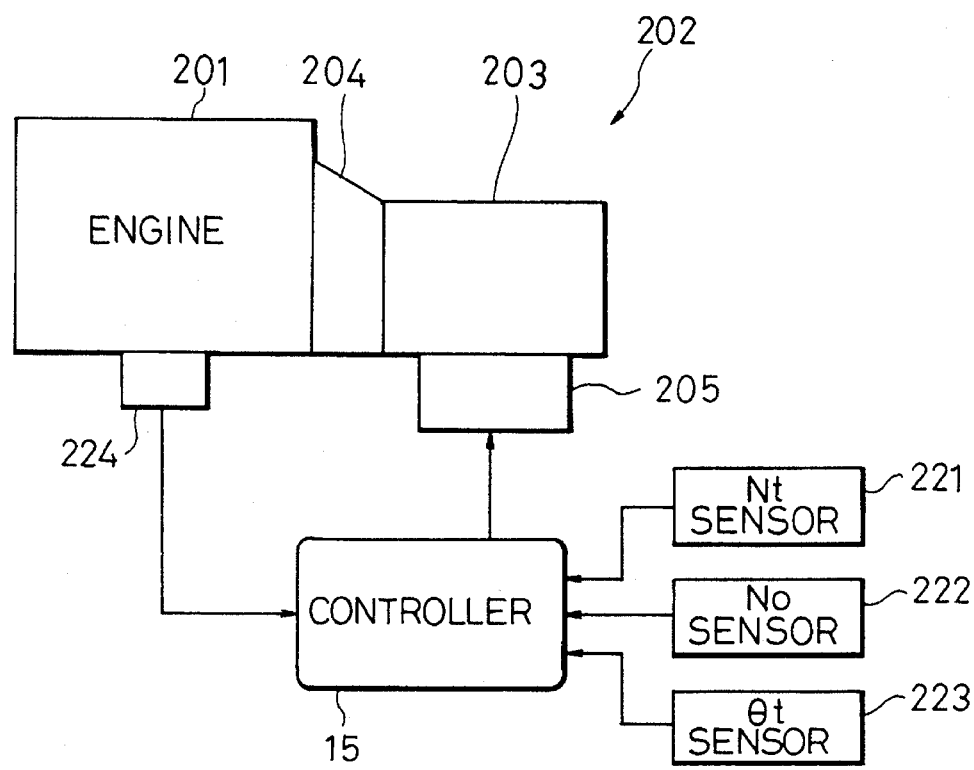
FIG. 37 is a schematic configuration diagram of a speed change controller of an automatic transmission mounted on a vehicle, to which a vehicle running characteristic control method according to an eighth embodiment of the present invention is applied.

FIG. 37 shows the schematic configuration of the automatic transmission of the motorcar according to the present invention. In the drawing, numeral 201 denotes an internal combustion engine, the output of the engine 201 being transmitted to driving wheels (not shown) via the automatic transmission 202. The automatic transmission 202 includes a torque converter 204, a gear transmission 203, a hydraulic circuit 205, a controller 15, etc. The gear transmission 203 is equipped with, for example, a gear train of 4 steps forward and 1 step backward, and many speed change friction-engaged devices for changing the gear ratio of the gear train, to thereby effect a speed change operation. The speed change friction-engaged devices are hydraulic clutches or hydraulic brakes, for example.

Figure 38:
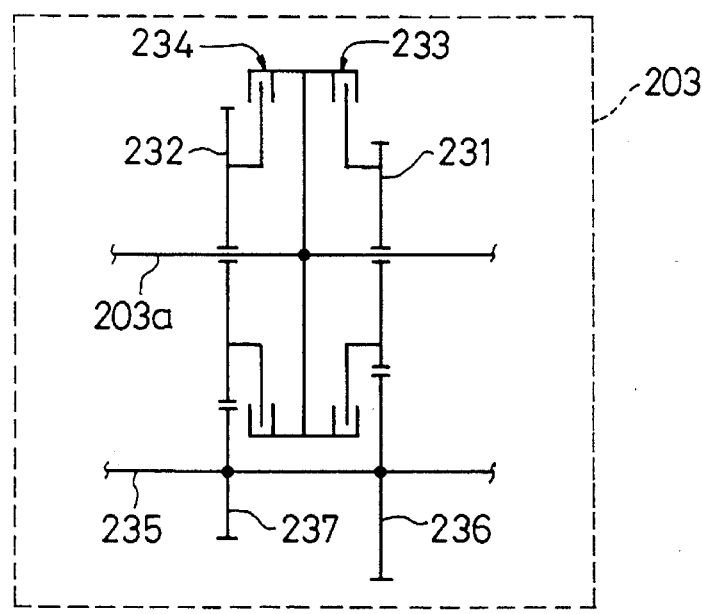
FIG. 38 is a schematic configuration diagram showing a part of a gear train in a gear transmission shown in FIG. 37.

FIG. 38 shows a part of the configuration of the gear transmission 203. A first driving gear 231 and a second driving gear 232 are rotatably disposed around the input shaft 203a. Further, hydraulic clutches 233 and 234 serving as the speed change friction-engaged means are fixed on the input shaft 203a between the first driving gear 231 and the second driving gear 232. The driving gears 231 and 232 rotate with the input shaft 203a as one piece when they are in engagement with the clutches 233 and 234. An intermediate transmission shaft 235 disposed in parallel to the input shaft 203a is coupled to a driving axle via a final reduction gear, not shown. Fixed on the intermediate transmission shaft 235 are a first driven gear 236 and a second driven gear 237. These driven gears 236 and 237 mesh with the driving gears 231 and 232.

Hence, when the clutch 233 is engaged with the first driving gear 231, the revolution of the input shaft 203a is transmitted to the clutch 233, the first driving gear 231, the first driven gear 236, and the intermediate transmission shaft 235. This establishes the first speed, for example. When the clutch 234 is engaged with the second driving gear 232, the revolution of the input shaft 203a is transmitted to the clutch 234, the second driving gear 232, the second driven gear 237, and the intermediate transmission shaft 235, thus establishing the second speed. The automatic transmission 2 upshifts the first speed to the second speed by engaging the clutch 234 on the second speed side while disengaging the clutch 233 on the first speed side. Conversely, the automatic transmission 202 downshifts the second speed to the first speed by engaging the clutch 233 while disengaging the clutch 234.

Figure 39:
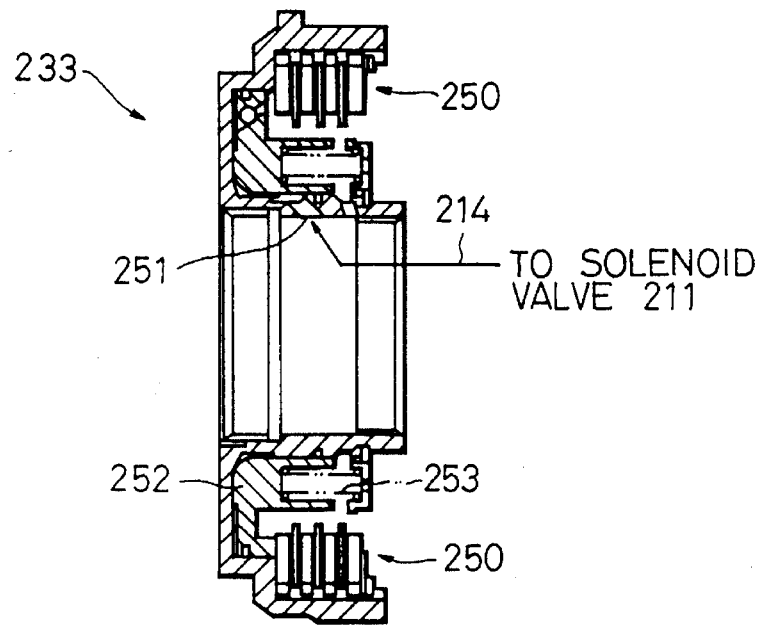
FIG. 39 shows a clutch shown in FIG. 37.

The clutches 233 and 234 are hydraulic multiple disc clutches. FIG. 39 shows the cross section of the clutch 233; the clutch 233 has many frictionally engaging discs 250. When hydraulic oil is supplied from an oil path 214, which will be discussed later, to the clutch 233 via a port 251, a piston 252 is moved forwardly to cause all the frictionally engaging discs to be frictionally engaged with each other. The frictional engagement of the frictionally engaging discs 250 is released when the piston 252 is pressed and moved back by a return spring 253, while discharging the hydraulic oil into the oil path 214 via the port 251.

The engagement of the clutch 233 can be completely released by making the frictionally engaging discs 250 stand by in a standby position thereof. In the standby position, clearances for preventing the so-called dragging torque from taking place are provided between the frictionally engaging discs 250. Therefore, to engage the clutch 233, it is necessary to remove the clearances. To be more specific, the frictionally engaging discs 250 must be moved by a dead stroke toward a position at which the aforesaid clearances are almost nulled, which is immediately short of that position at which frictional engagement takes place. The time for removing the clearances is required. On the other hand, with the clutch 233 engaged, the above-mentioned dragging torque takes place for a while after the frictionally engaging discs 250 start to separate; therefore, an oil pressure releasing time is required as an idle time, which follows the start of discharging the hydraulic oil from the clutch 233, until the engagement of the clutch 233 is completely released.

The clutch 234, which has the same configuration as that of the clutch 233, requires a predetermined clearance removing time at the time of engagement, and a predetermined oil pressure releasing time at the time of disengagement.

The hydraulic circuit 205 has duty solenoid valves (hereinafter referred to simply as solenoid valves), which correspond to the aforesaid individual speed change frictionally engaging means. It operates the individual speed change frictionally engaging means, i.e., the clutches and brakes, independently from each other. The solenoid valves operate the clutches and brakes in the same manner; therefore, the description will be given to the solenoid valve for operating the clutch 233 with reference to FIG. 40, the explanation on other solenoid valves being omitted.

Figure 40:
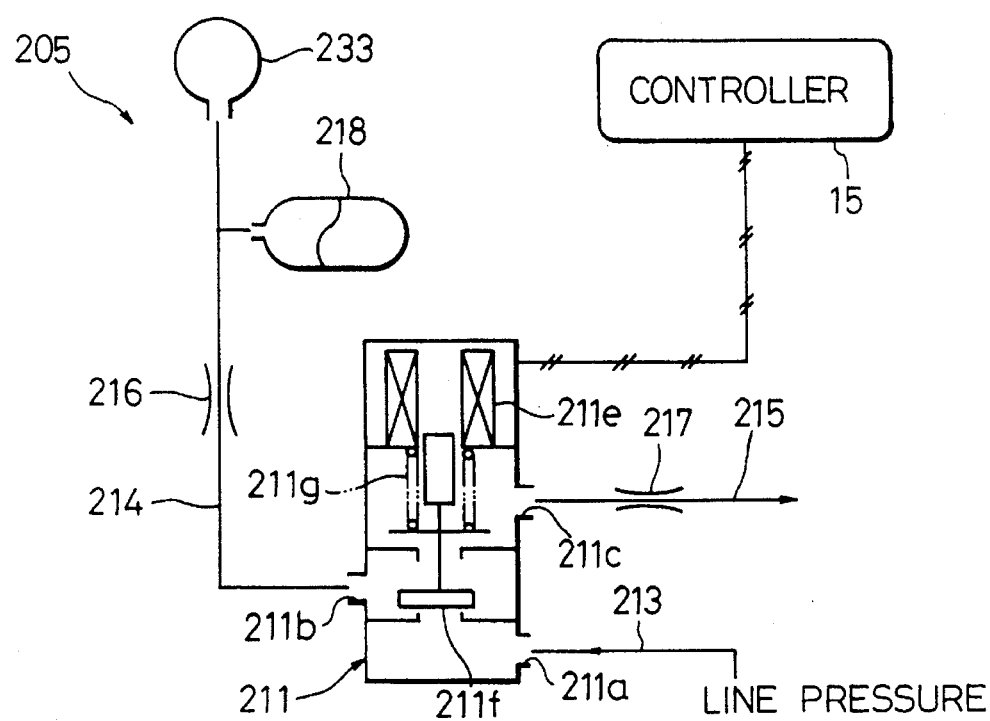
FIG. 40 is a schematic configuration diagram showing a part of a hydraulic circuit for operating the clutch shown in FIGS. 38 and 39.

FIG. 40 shows a part of the hydraulic circuit 205, which is equipped with a solenoid valve 211 for supplying oil pressure to the hydraulic clutch 233. The solenoid valve 211 is a normally-closed, 2-position switching valve, and has ports 211a through 211c at three points.

Connected to a first port 211a is a first oil path 213, which extends to an oil pump (not shown). A regulating valve or the like, not shown, is provided at some midpoint of a first oil path 213, so that a hydraulic pressure (line pressure) adjusted to a predetermined level is supplied.

Connected to a second port 211b is a second oil path 214 extending to the hydraulic clutch 233, and connected to a third port 211c is a third oil path 215 extending to an oil tank, which is not illustrated. Provided at some midpoints of these second and third oil paths 214 and 215 are restrictors 216 and 217, respectively. The passage area of the restrictor 216, which is provided in the second oil path 214, is larger than that of the passage area of the restrictor 217 provided in the third oil path 215. Further, an accumulator 218 is connected to some midpoint of the second oil path 214 between the clutch 233 and the restrictor 216.

The solenoid valve 211, which is electrically connected to the controller 15, is controlled based on duty ratio at a predetermined cycle, e.g., a 50-Hz control cycle, by the controller 15. While a solenoid 211e of the solenoid valve 211 stays de-energized, a valve body 211f is pressed by a return spring 211g to prevent communication between the first port 211a and the second port 211b and to allow communication between the second port 211b and the third port 211c. Conversely, while the solenoid 211e stays energized, the valve body 211f lifts against the spring force of the return spring 211g to permit communication between the first port 211a and the second port 211b and to prevent communication between the second port 211b and the third port 211c.

Electrically connected to the input side of the controller 15 are various sensors such as an Nt sensor 221, No sensor 222, and θt sensor 223. The Nt sensor 221 is a turbine rotational speed sensor for detecting the rotational speed Nt of the turbine of the torque converter 204 (i.e., the input shaft of the gear speed changer 203). The No sensor 222 (corresponding to the vehicle speed sensor 22 previously mentioned) is a transfer drive gear rotational speed sensor for detecting the rotational speed No of the transfer drive gear, not shown. The controller 15 computes the vehicle speed V (corresponding to the vehicle speed vx previously mentioned) in accordance with the rotational speed No. The θt sensor 223 (corresponding to the throttle opening degree sensor 23 previously mentioned) is a throttle valve opening degree sensor for detecting the valve opening degree θt of a throttle valve disposed at some midpoint of an intake passage (not illustrated) of the engine 201. These sensors 221 through 223 supply detected signals to the controller 15 at predetermined intervals.

Further supplied to the controller 15 are the road traffic condition and the parameters (e.g., jammed road degree r_jam, city road degree r_city, expressway degree r_high, mountainous road degree r_mount, and sportiness drive) indicative of the maneuvering state intended by the driver, which are calculated according to the estimating method described previously.

"Procedure for implementing a shift change"

A procedure for deciding an optimum command shift stage in accordance with received detection signals and parameters, and for carrying out a shift change according to the command shift stage is stored beforehand in the memory of the controller 15. The controller 15 causes a coupled-side clutch, e.g., the clutch 233 to be disengaged, and a released-side clutch, e.g., the clutch 234 to be engaged, to thereby accomplish the shift change in the automatic transmission 202, by repeatedly executing the shift change procedure at predetermined intervals.

Figure 41:
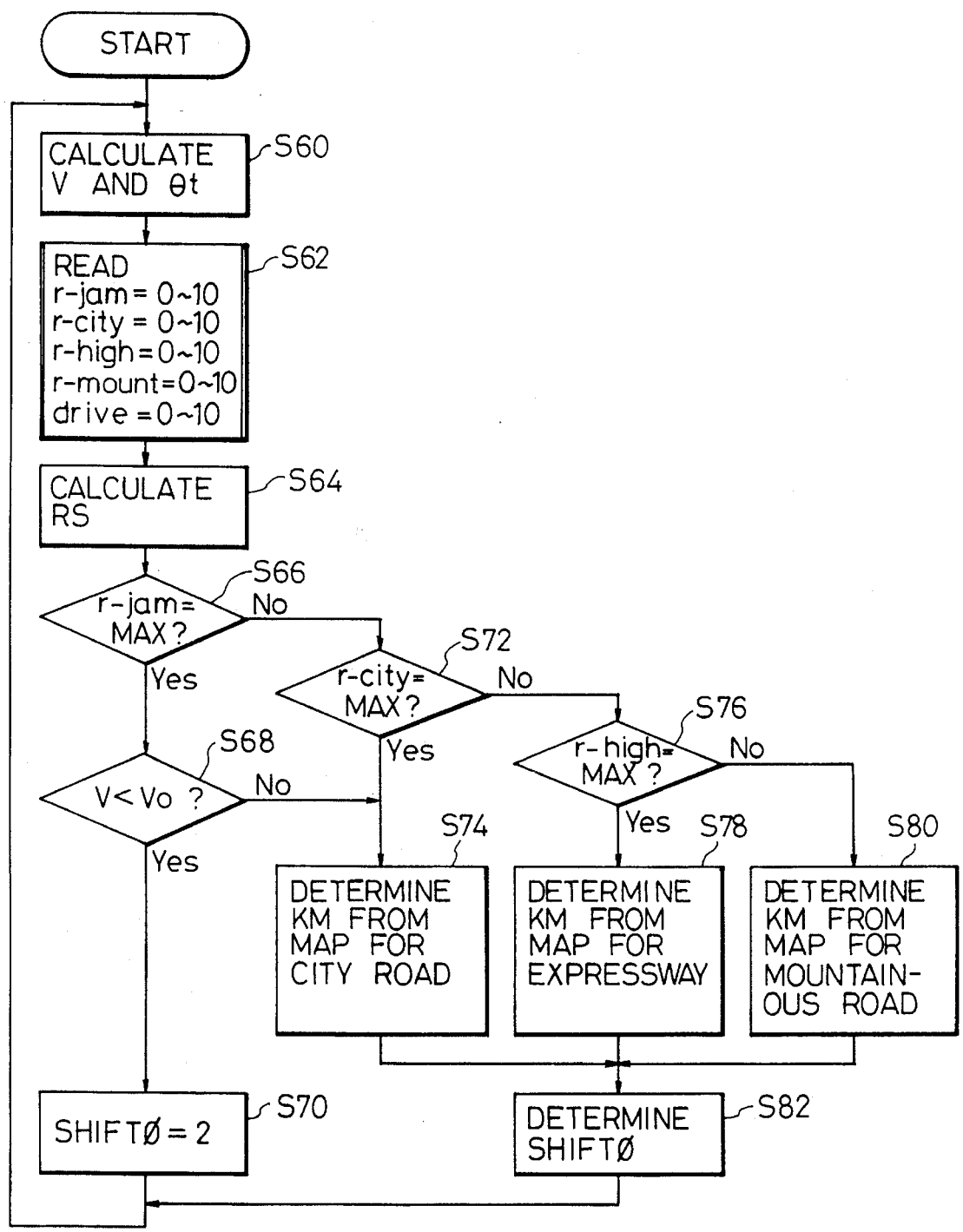
FIG. 41 is a flowchart of a shift control routine.
Figure 42:
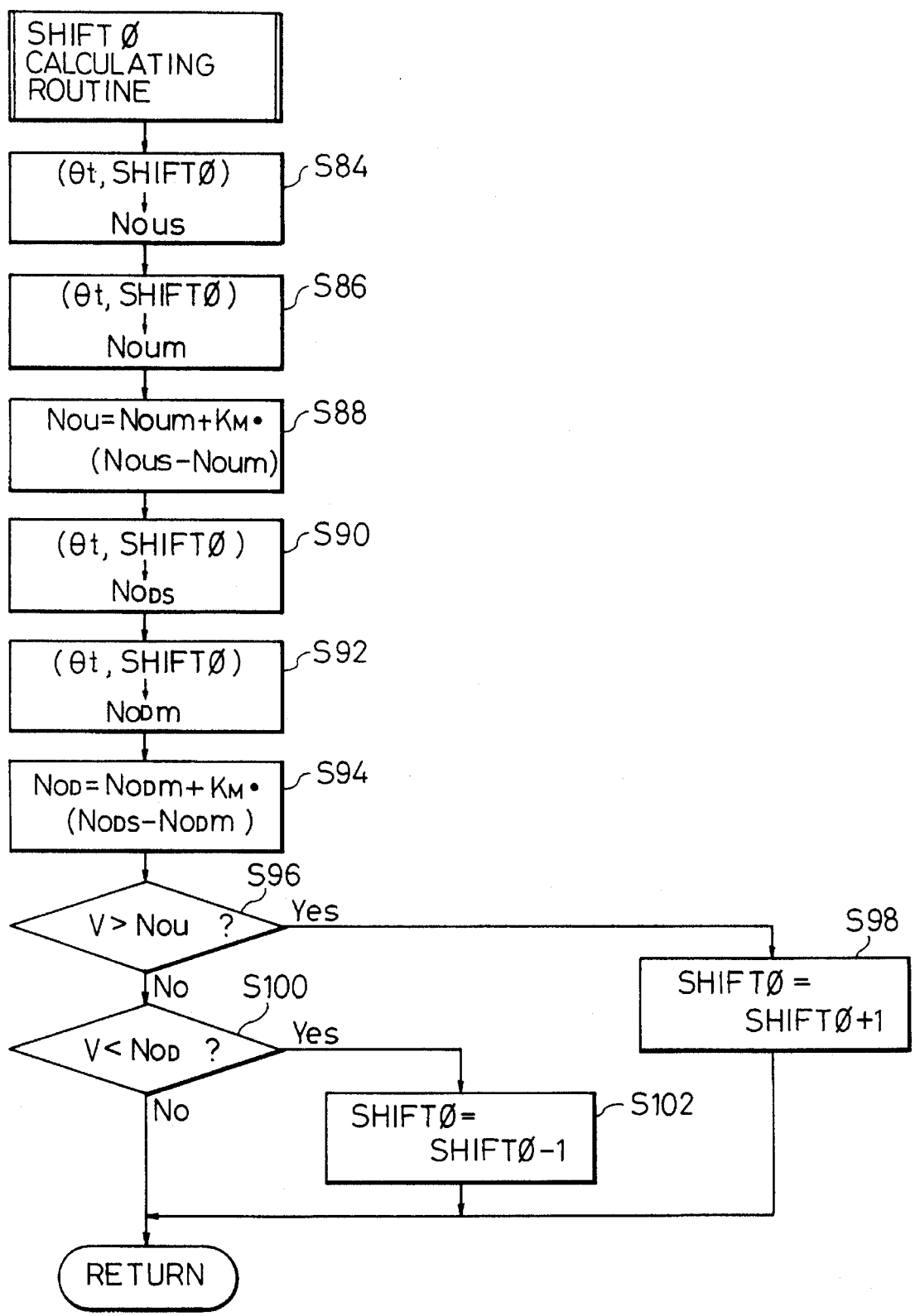
FIG. 42 is a flowchart of a command shift stage SHIFT0 calculating routine.
Figure 43:
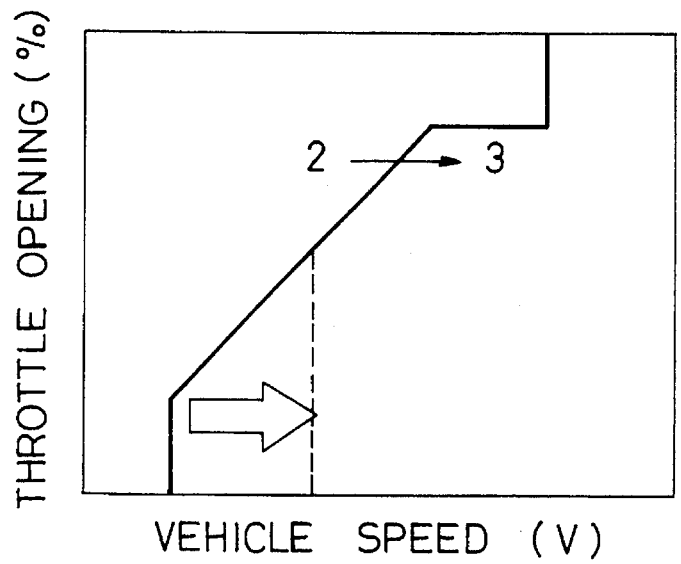
FIG. 43 is a shift map for a second-speed holding mode.

The following describes the procedure for carrying out the shift change with reference to flowcharts shown in FIGS. 41 and 42.

First, in a step S60, the controller 15 calculates the vehicle speed V from the output of the vehicle speed sensor (No sensor 22) and the throttle opening degree θt from the output of the throttle opening degree sensor (θt sensor 23). Then, in a step S62, the controller 15 reads the jammed road degree r_jam, the city road degree r_city, the expressway degree r_high, and the mountainous road degree r_mount, which are the road condition parameters calculated according to the aforesaid estimating method. Next, it converts the values of the read input values in the range of "0 to 100" into the values in the range of "0 to 10." The controller 15 also reads the sportiness "drive," which is the maneuvering state parameter calculated from the estimating method, and converts the read input value in the range of "0 to 100" into the value in the range of "0 to 10."

The expressway degree r_high is not calculated from the aforesaid estimating method, but it can be assumed to take a value, which is exactly opposite from that of the city road degree r_city. Hence, the expressway degree r_high can be defined as a value obtained by subtracting the value of the city road degree r_city from "10."

In a step S64, the controller 15 calculates a road slope RS in accordance with the output signal from a slope sensor mounted on the vehicle or in accordance with an engine output and the output signal from an acceleration sensor (not shown). The controller 15 then determines whether the obtained jammed road degree r_jam is a maximum value MAX, e.g., "10" (step S66). If the determination result is affirmative, then the controller determines whether the vehicle speed V is smaller than a predetermined vehicle speed V0 (e.g., 40 km/h) (step S68). If the determination result is affirmative, then the controller sets a shift command variable SHIFT0 to "2" (step S70), and carries out the shift change in accordance with a preset shift map for holding the second speed.

The shift map for holding the second speed has a wider vehicle speed area in which the second speed is maintained, by moving a part of the 2→3 upshift line toward the higher speed side, no 2→1 downshift line being provided. Accordingly, when the road traffic condition is the traveling on a jammed road at a vehicle speed of 40 km/h, the speed change gear is held at the second gear in accordance with the shift map for holding the second speed. In this state, wherein the second speed is held, even if the vehicle speed becomes "0" and hence the vehicle stops temporarily, the second speed state is maintained. Therefore, even if stop and start are repeated frequently, smooth start free from a speed change shock is assured, and proper engine braking is allowed to be accomplished at the time of deceleration.

Figure 44:
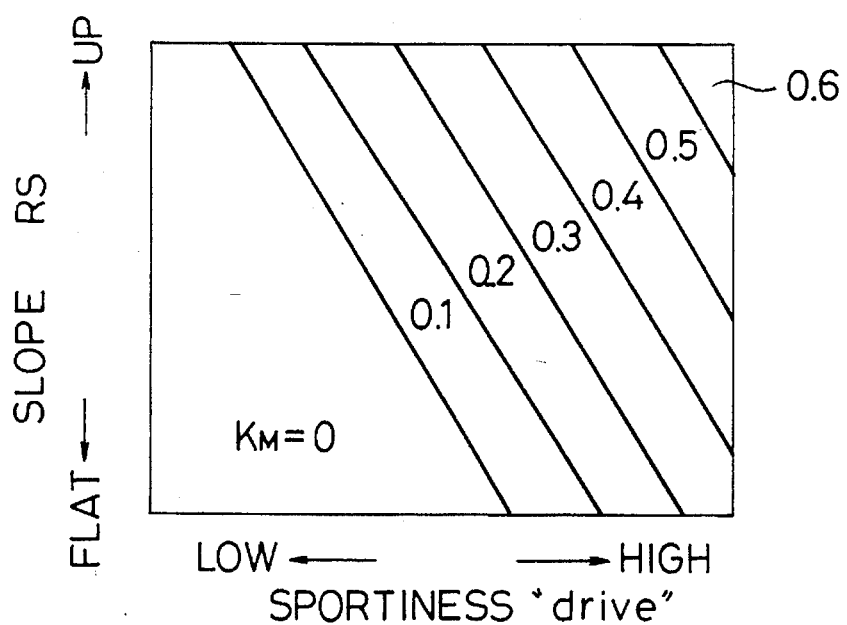
FIG. 44 is a city road map for calculating a shift line moving coefficient KM based on a relationship between sportiness and slope.

On the other hand, if the determination result in the step S66 is negative, then a shift pattern moving mode is established. The controller 15 determines whether the city road degree r_city is the maximum value MAX, e.g., "10" (step S72). If the determination result is affirmative, then the controller 15 carries out a step S74 to be discussed later. If the determination result of the step S68 is negative that is, if the vehicle speed is 40 km/h or more even if the road is determined to be jammed, then the second speed holding mode is disengaged and the shift pattern moving mode is entered. The controller 15 determines a shift line moving coefficient KM from the relationship between the sportiness "drive" and the road slope (RS) in accordance with the map for city area shown in FIG. 44 (step S74). The range of the shift line moving coefficient KM is, for example, 0 to 1.0.

Figure 45:
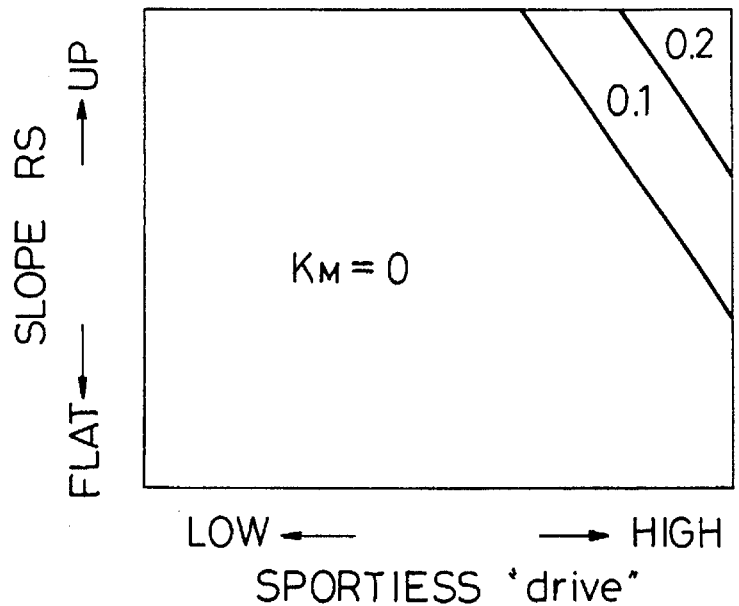
FIG. 45 is an expressway map for calculating a shift line moving coefficient KM based on a relationship between sportiness and slope.

If the determination result in the step S72 is negative, then the controller 15 determines whether the expressway degree r_high is the maximum value "10" (step S76). If the determination result is affirmative, then the controller obtains the shift line moving coefficient KM from the relationship between the sportiness "drive" and the road slope RS in accordance with the map for expressway shown in FIG. 45 (step S78).

Figure 46:
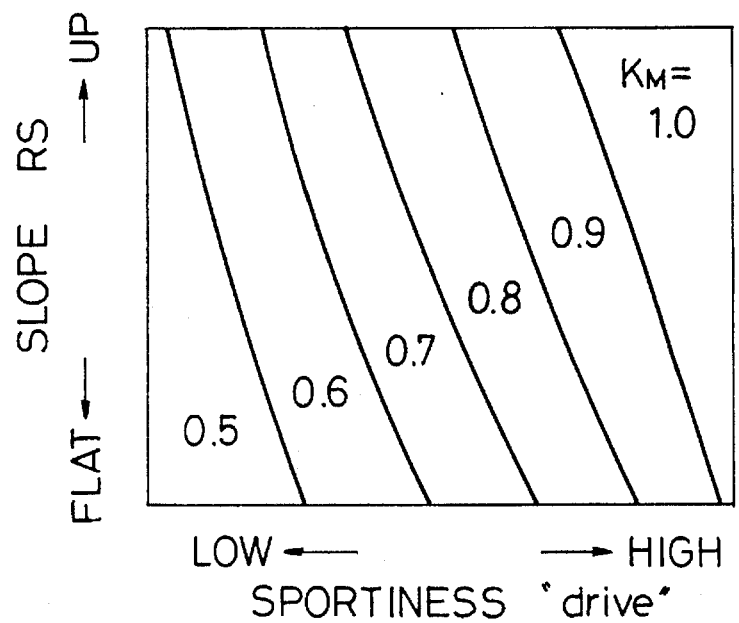
FIG. 46 is a mountainous road map for calculating a shift line moving coefficient KM based on a relationship between sportiness and slope.

If the determination result in the step S76 is negative, the controller 15 obtains the shift moving line coefficient KM from the relationship between the sportiness "drive" and the road slope RS in accordance with the map for mountainous road shown in FIG. 46 (step S80).

The shift line moving coefficient KM determined in the above steps takes a large value when the upward road slope RS is large and the sportiness "drive" indicative of the driver's maneuvering state is large. The value taken by the shift line moving coefficient KM increases in the order of the expressway, city road, and mountainous road, which indicate the road traffic conditions.

After the step S74, the step S78 or the step S80 is executed, the controller 15 implements a command shift stage SHIFT0 calculating routine in a step S82.

"Routine for calculating the command shift stage"

The procedure for implementing the command shift stage SHIFT0 calculating routine will now be described according to the flowchart of FIG. 42 with reference to FIGS. 47 and 48. In explaining the executing procedure, the present shift stage is in the second gear (command shift stage SHIFT0= 2).

Stored in the memory of the controller 15 are two types of basic shift maps; a plurality of upshift maps classified for the upshift lines of 1→2, 2→3, and 3→4, respectively, and a plurality of downshift maps classified for the downshift lines of 4→3, 3→2, and 2→1, respectively. Each shift line has two types of basic shift patterns, namely, a mild pattern for accomplishing a gentle shift change and a sport pattern for accomplishing an agile shift change. FIG. 47 shows only the upshift line of 2→3, while FIG. 48 shows only the downshift line of 2→1. The same applies to other shift lines and the explanation thereon will be omitted.

In the command shift stage calculating routine, judgment vehicle speeds (NOU, NOD) are obtained from the throttle opening degree θt and the obtained shift line moving coefficient KM, and the command shift stage SHIFT0 is decided from the judgment vehicle speeds.

Figure 47:
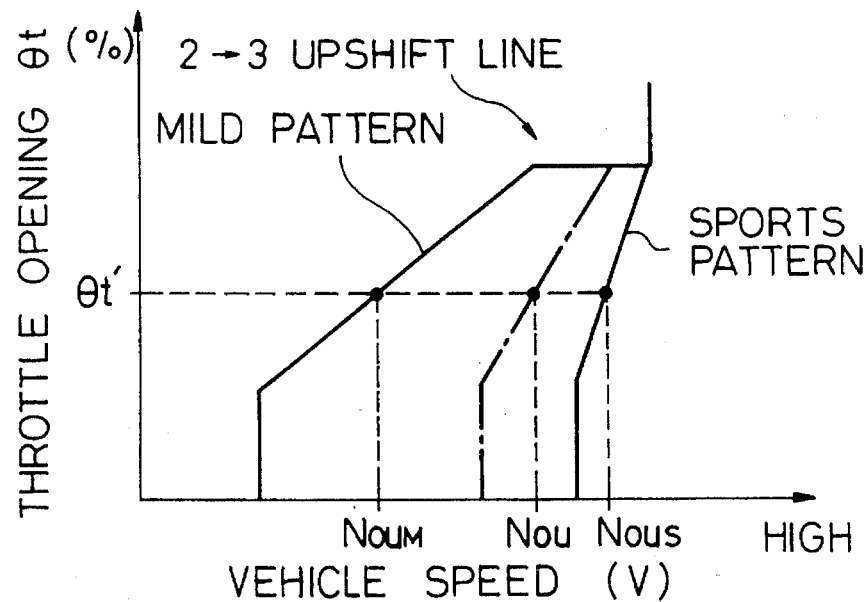
FIG. 47 is a shift map showing some upshift lines.

First, the controller 15 determines a vehicle speed value NOUS corresponding to an actual throttle opening degree θt' from the sport pattern of the upshift line as shown in FIG. 47 (step S84), and determines a vehicle speed value NOUM corresponding to the actual throttle opening degree θt' from the mild pattern of the upshift line (step S86). Further, it determines the upshift speed NOU by substituting the shift line moving coefficient KM, the vehicle speed value NOUS, and the vehicle speed value NOUM for the following computing formula, to thereby obtain the upshift speed NOU (step S88):

$$NOU = NOUM + KM \cdot (NOUS - NOUM)$$

The shift line moving coefficient KM ranges from 0 to 1.0; therefore, the upshift speed NOU obtained from this computing formula lies between the vehicle speed value NOUM and the vehicle speed value NOUS.

For example, when the shift line moving coefficient KM is "0," the upshift speed NOU becomes equal to the vehicle speed value NOUM. In other words, the upshift line becomes the mild pattern. If the shift line moving coefficient KM is "1.0," then the upshift speed NOU becomes equal to the vehicle speed value NOUS. In other words, the upshift line becomes the sport pattern. Moreover, when the shift line moving coefficient KM changes from 0 to 1.0, the upshift speed NOU changes between the vehicle speed value NOUM and the vehicle speed value NOUS.

Figure 49:
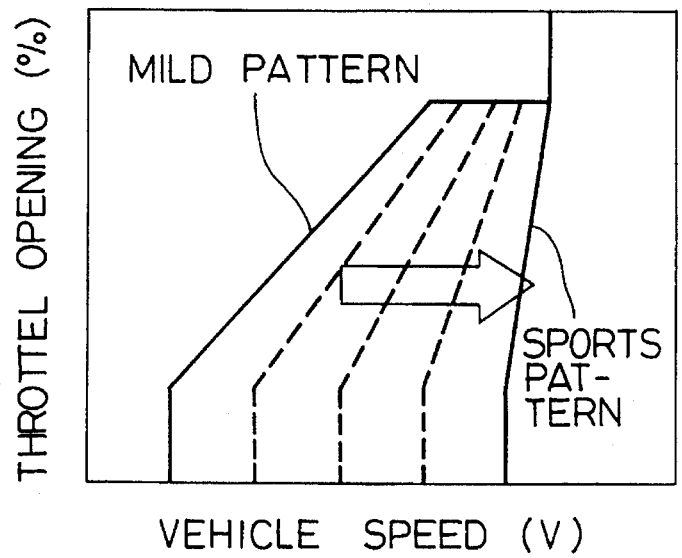
FIG. 49 is a shift map showing a moving upshift line.

Assuming that the throttle opening degree θt is changed arbitrarily with a fixed shift moving coefficient KM, a presumptive upshift line indicated by a dashed line in FIG. 47 is obtained. This means that the upshift line is corrected in accordance with the shift line moving coefficient KM. As the value of the shift line moving coefficient KM changes from 0 to 1.0, the upshift line moves to the right as shown by the broken lines from the mild pattern to the sport pattern in FIG. 49.

Figure 48:
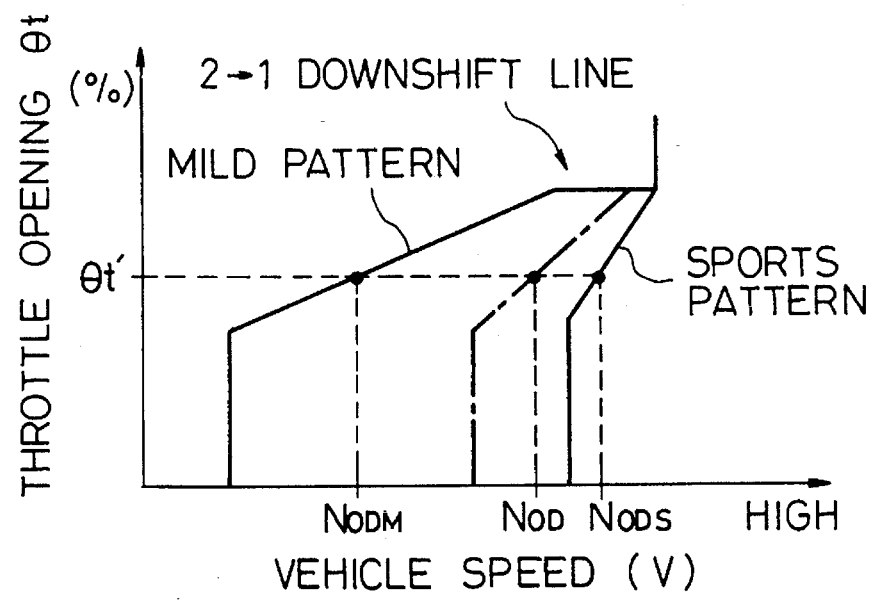
FIG. 48 is a shift map showing some downshift lines.

The controller 15 then determines a vehicle speed value NODS corresponding to the actual throttle opening degree θt' from the downshift line of the sport pattern shown in FIG. 48 (step S90), and determines the vehicle speed value NODM corresponding to the actual throttle opening degree θt' from the downshift line of the mild pattern (step S92). Further, it determines the downshift speed NOD by substituting the shift line moving coefficient KM, the vehicle speed value NODS, and the vehicle speed value NODS for the following computing formula to obtain the downshift speed NOD (step S94):

$$NOD = NODM + KM \cdot (NODS - NODM)$$

The shift line moving coefficient KM ranges from 0 to 1.0; therefore, the downshift speed NOD obtained from this computing formula lies between the vehicle speed value NODM and the vehicle speed value NODS.

For example, when the shift line moving coefficient KM is "0," the downshift speed NOD becomes equal to the vehicle speed value NODM. In other words, the downshift line becomes the mild pattern. If the shift line moving coefficient KM is "1.0," then the downshift speed NOD becomes equal to the vehicle speed value NODS. In other words, the downshift line becomes the sport pattern. Moreover, when the shift line moving coefficient KM changes from 0 to 1.0, the downshift speed NOD changes between the vehicle speed value NODM and the vehicle speed value NODS.

Figure 50:
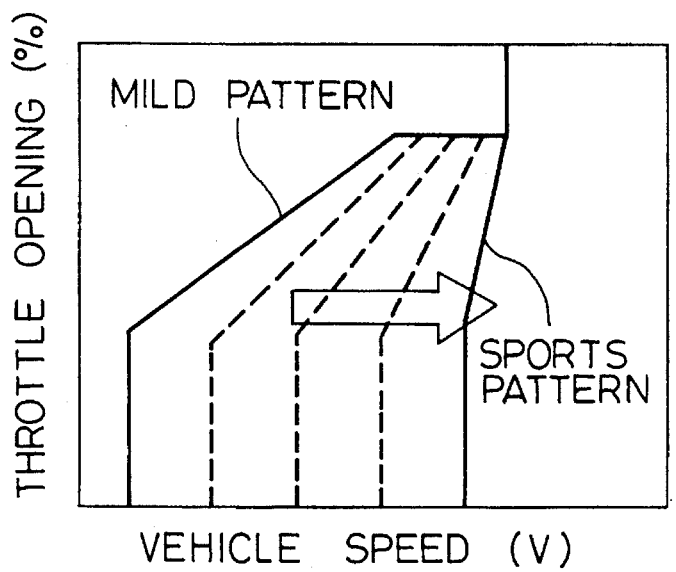
FIG. 50 is a shift map showing a moving downshift line.

Assuming that the throttle opening degree θt is changed arbitrarily with a fixed shift moving coefficient KM, a presumptive downshift line indicated by a dashed line in FIG. 48 is obtained. This means that the downshift line is corrected in accordance with the shift line moving coefficient KM. As the value of the shift line moving coefficient KM changes from 0 to 1.0, the downshift line moves to the right as shown by the broken lines from the mild pattern to the sport pattern in FIG. 50.

Then, in a step S96, the controller 15 determines whether the actual vehicle speed V read from the vehicle speed sensor is larger than the upshift speed NOU determined in the step S88. If the determination result is affirmative, then the controller adds "1" to the value of the command shift stage SHIFT0 (step S98). As a result, the controller 15 carries out upshift in accordance with the value of the command shift stage SHIFT0. In the case of this embodiment, the command shift stage SHIFT0 changes from 2 to 3; therefore, the upshift of 2→3 is implemented.

On the other hand, if the determination result in the step S96 is negative, then the controller 15 decides whether the actual vehicle speed V is smaller than the downshift speed NOD determined in the step S94 (step S100). If the determination result is affirmative, then the controller subtracts "1" from the value of the command shift stage SHIFT0 (step S102). As a result, the controller 15 carries out downshift. In the case of this embodiment, the command shift stage SHIFT0 changes from 2 to 1; therefore, the downshift of 2→1 is implemented.

If the determination result in the step S100 is negative, the routine for calculating the command shift stage SHIFT0 is terminated with the value of the command shift stage SHIFT0 kept unchanged.

As explained above, according to the speed change controller of the automotive automatic transmission according to the present invention, the shift line moving coefficient KM is determined in accordance with the road traffic conditions and the vehicle maneuvering state (sportiness "drive") obtained by the aforesaid estimating method and the road slope RS, then the shift map is obtained, wherein the upshift line and downshift line are moved (corrected) in accordance with the shift line moving coefficient KM. Based on the shift map, the command shift stage SHIFT0 is determined to carry out the shift change. This enables shift feeling best suited for each road traffic condition and vehicle maneuvering state.

For instance, when sportily driving an acute slope of a mountainous road, the upshift line and the downshift line of the shift map are both moved to the sport pattern, to provide agile shift changes. The result is sporty shifting. Conversely, when leisurely driving a flat expressway, both the upshift line and downshift line of the shift map are moved to the mild pattern, to provide gentle shift changes. The result is leisurely shifting.

The following describes a vehicle running characteristic control method according to a ninth embodiment of the present invention.

This embodiment applies to a motorcar equipped with an engine output controller (traction controller) as the apparatus for controlling the vehicle running characteristic.

Figure 51:
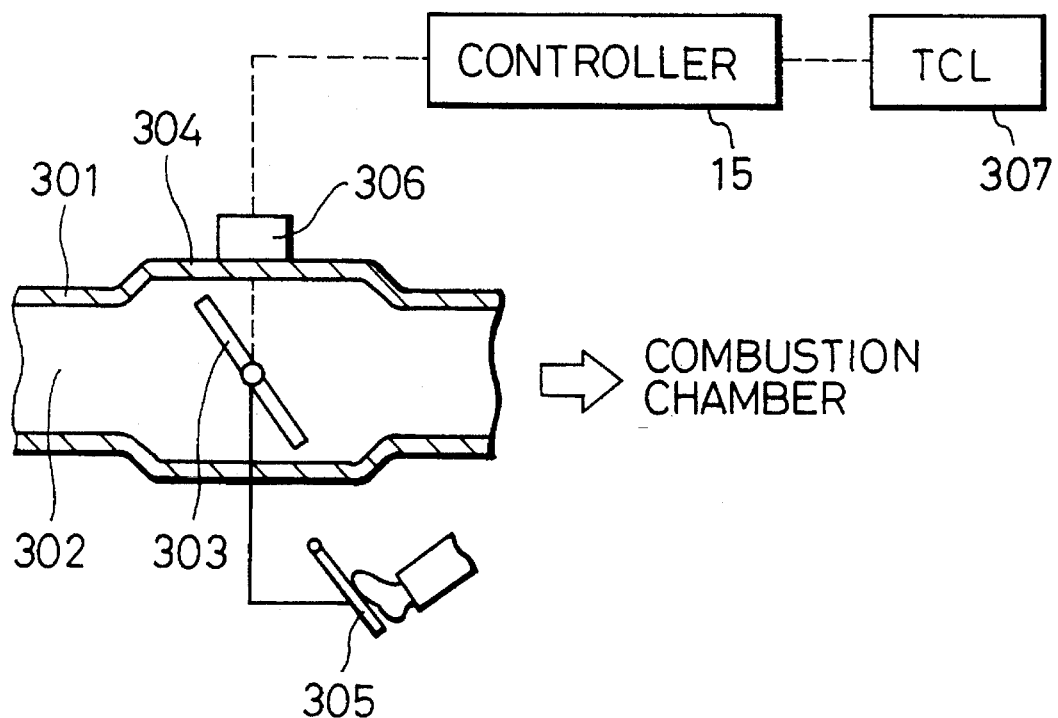
FIG. 51 is a schematic diagram showing a major section of an engine output controller mounted on a vehicle, to which a vehicle running characteristic control method according to a ninth embodiment of the present invention is applied.

Referring to FIG. 51, provided at some midpoint of an intake pipe 301 connected to the combustion chamber (not shown) of the vehicle engine is a throttle body 304 accommodating therein a throttle valve 303 which changes the opening degree (effective cross-sectional area) of the an intake passage 302 formed by the intake pipe 301, to thereby regulate the amount of intake air supplied into the combustion chamber.

The throttle valve 303 has a throttle shaft thereof rotatably journaled on the throttle body 304, so that the throttle shaft is rotated in accordance with the amount of depression of an accelerator pedal 305. The rotation of the throttle shaft turns the throttle valve 303 in the opening direction. The engine driving torque increases in accordance with the opening degree of the throttle valve 303.

The throttle valve 303 is also operated by an actuator 306 provided in the throttle body 304 in addition to the operation by the accelerator pedal 305. However, the throttle valve 303 does not open unless the accelerator pedal 305 is depressed. Specifically, the opening degree of the throttle valve 303 corresponds one-to-one to the amount of depression of the accelerator pedal 305 when the actuator 306 is not in operation. When the actuator 306 is operated, the throttle valve 303 is closed regardless of the amount of depression of the accelerator pedal 305, producing a state wherein the engine driving torque is forcibly reduced. The driving torque of the engine can be adjusted as desired, by regulating the operation of the actuator 306 in the manner described above, thereby changing the opening degree of the throttle valve 303 regardless of the amount of depression of the accelerator pedal 305.

The operation of the actuator 306 is controlled by the controller 15. The controller 15 controls the operation of the actuator 306 in accordance with the output signal received from a torque computing unit (hereinafter referred to as TCL) 307, which calculates a target driving torque of the engine. In actual use, the controller 15 carries out duty control over a torque control solenoid valve (not shown), which controls the operation of the actuator 306.

In this embodiment, when the lateral acceleration, which takes place in a turning vehicle, exceeds a preset value, the engine driving torque is decreased to prevent the vehicle from deviating from the turning road. The target driving torque of the engine for carrying out the control is computed by the TCL 307, and the engine driving torque is decreased as necessary.

Figure 52:
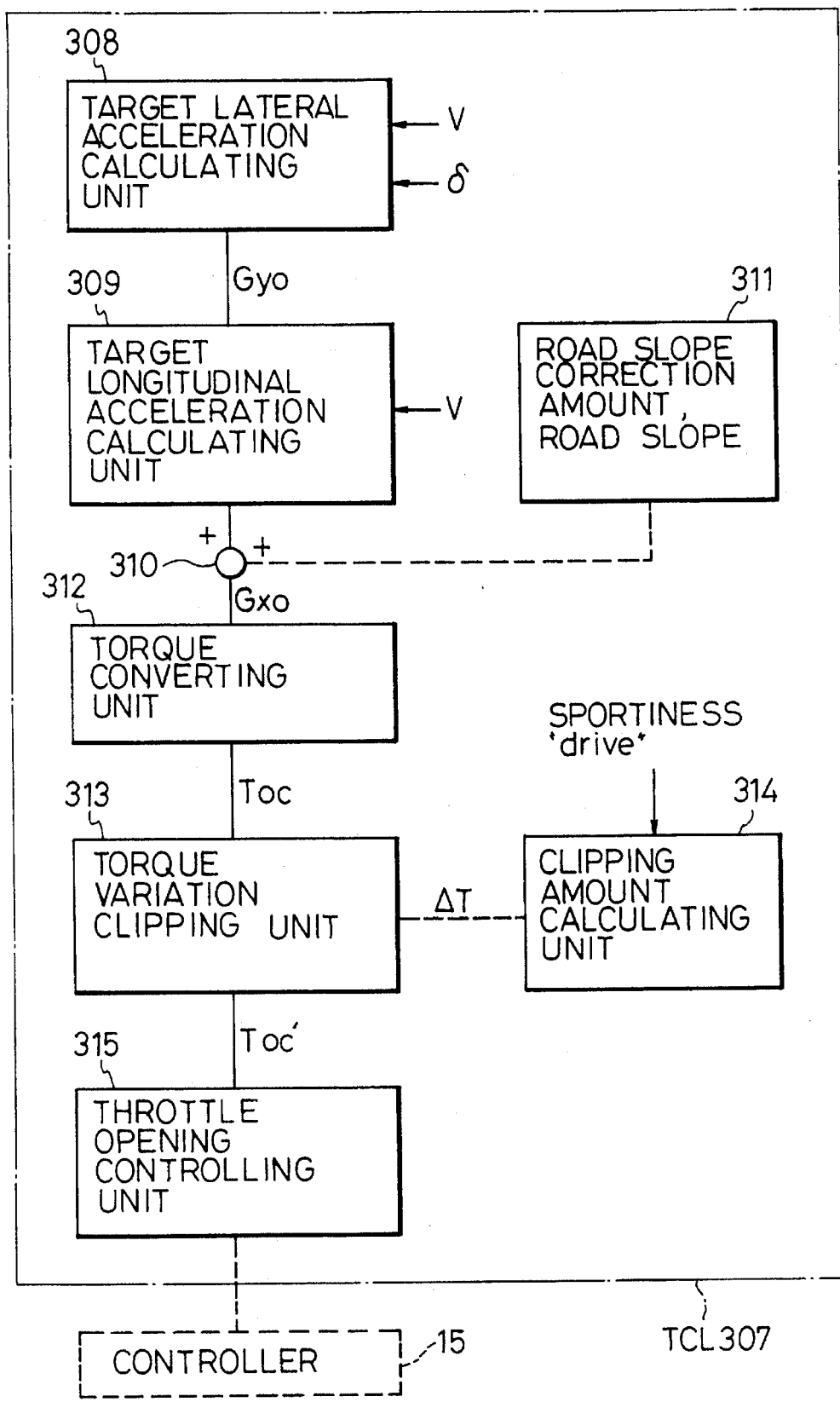
FIG. 52 is a block diagram of a torque computing unit (TCL)

The following explains the process taken by the TCL 307 to calculate the target driving torque, referring to the block diagram of FIG. 52.

The TCL 307 is equipped with a target lateral acceleration calculating unit 308 for calculating the target lateral acceleration. The target lateral acceleration calculating unit 308 receives the vehicle speed V from the vehicle speed sensor 26 and the steering angle δ of the front wheels from the steering angle sensor, as the parameters, and calculates a target lateral acceleration GY0 from the formula given below in accordance with the received parameters. The calculated target lateral acceleration GY0 is supplied to a target longitudinal acceleration calculating unit 309.

$$GY0=\delta/[\omega \cdot \{A+(1/V2)\}]$$

where ω indicates the wheel base of the vehicle, and A is a stability factor of the vehicle, which depends on the configuration of the suspension unit, the characteristics of the tires, road surface conditions or the like.

Figure 53:
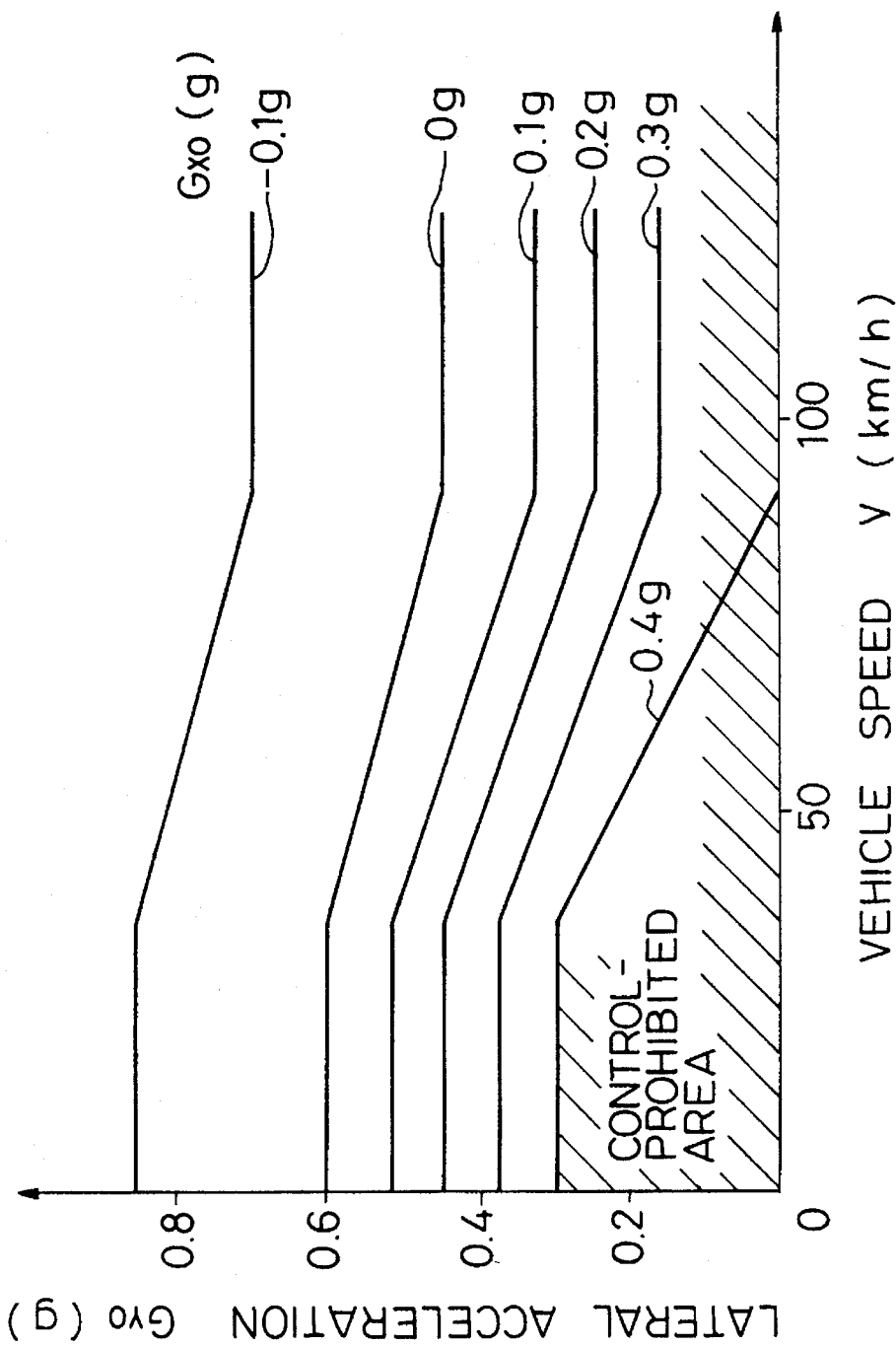
FIG. 53 is a map showing a relationship between vehicle speed, target lateral acceleration, and target longitudinal acceleration.
Figure 54:
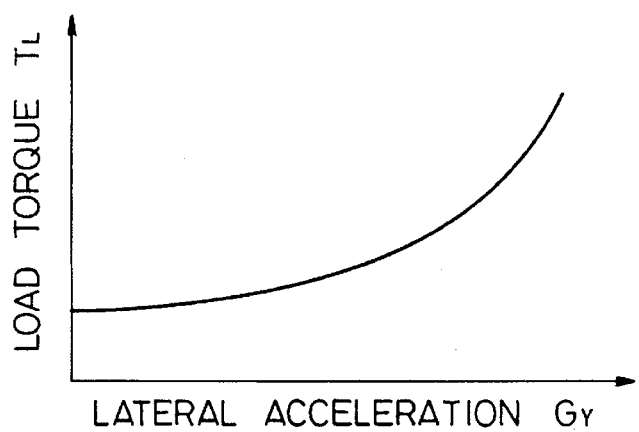
FIG. 54 is a map showing a relationship between lateral acceleration and load torque.

The target longitudinal acceleration calculating unit 309 sets the longitudinal acceleration of the vehicle, i.e., a target longitudinal acceleration Gxo, which protects the vehicle from extreme understeering in accordance with the target lateral acceleration GY0. More specifically, the target longitudinal acceleration calculating unit 309 reads the target longitudinal acceleration Gxo from the map of FIG. 53 stored beforehand in the TCL 307 in accordance with the vehicle speed V and the received target lateral acceleration GY0, and outputs the target longitudinal acceleration Gxo to a correcting unit 310.

The correcting unit 310, which receives a road slope correcting amount parameter from a road slope correcting amount calculating unit 311, corrects the received target longitudinal acceleration Gxo in accordance with the just-mentioned parameter, and outputs the result to a torque converting unit 312. The road slope correcting amount calculating unit 311 calculates the road slope correcting amount parameter in accordance with the vehicle speed V and road slope data. Hence, the torque converting unit 312 receives the target longitudinal acceleration Gxo, which has been corrected with the vehicle speed and the road slope taken into account.

Figure 55:
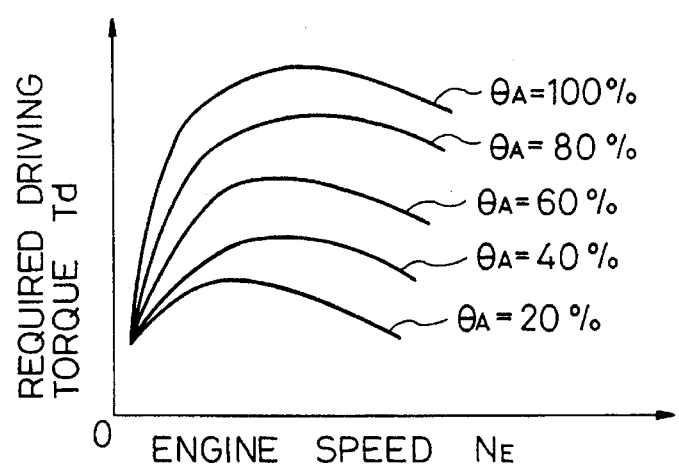
FIG. 55 is a map showing a relationship between engine speed, required driving torque, and accelerator opening degree.

The torque converting unit 312 first calculates a reference driving torque TB from the following formula in accordance with the received target longitudinal acceleration Gxo:

$$TB= (Gxo \cdot Wv \cdot r + TL)/(\rho m \cdot \rho d \cdot \rho T)$$

where TL is a road-load torque, which is the resistance of the road surface determined as a function of a lateral acceleration GL of the vehicle and which is obtained from the map of FIG. 55. Symbol Wb is a vehicle weight, ρ is a wheel radius, ρ is a speed change ratio in the transmission, ρ is a final reduction ratio, and ρ is a torque convertor ratio.

The torque converting unit 312 calculates a target driving torque Toc from the formula given below in accordance with the reference driving torque TB.

$$Toc=\alpha \cdot TB+(1-\alpha) \cdot Td$$

where Td indicates a required driving torque. The driving torque Td required by the driver is determined from the map of FIG. 55 stored in the TCL in accordance with an engine speed NE detected through a crank angle sensor and an accelerator opening degree θA detected through an accelerator opening degree sensor. Symbol α indicates a weighting coefficient, which is empirically set by turning the vehicle while driving; it is set to a value of about, 0.6, for example, for a road with a high μ.

If an increase or decrease in the target driving torque Toc of the engine, which is set at intervals of a predetermined cycle, is extremely large, then the acceleration or deceleration of the vehicle causes a shock, leading to deteriorated riding comfort. Therefore, it is necessary to restrict the increase or decrease in the target driving torque Toc when the increase or decrease in the target driving torque Toc of the engine becomes so large that it deteriorates the riding comfort of the vehicle.

The target driving torque Toc determined as described above is output to a torque variation clipping unit 313, so as to restrict the increase or decrease of the target driving torque.

In the torque variation clipping unit 313, if the absolute value |ΔT| of the difference between a target driving torque Toc(n) calculated in the present cycle and a target driving torque Toc(n−1) calculated in the preceding cycle is smaller than a predetermined clipping amount Tk, then the target driving torque Toc(n) calculated this time is adopted as it is. If a value ΔT obtained by subtracting the target driving torque Toc(n−1), which was calculated previously, from the target driving torque Toc(n), which has been calculated this time, is smaller than a first negative clipping amount Tk, that is, if it is necessary to quickly decrease the target driving torque Toc, then the target driving torque Toc calculated this time is set in accordance with the following formula:

$$Toc(n)=Toc(n-1)-Tk$$

In other words, the decrease with respect to the target driving torque Toc(n) previously calculated is restricted by the aforesaid clipping amount Tk, to ease a deceleration shock caused by the decrease in the engine driving torque.

Conversely, if the value ΔT obtained by subtracting the target driving torque Toc(n−1) calculated previously from the target driving torque Toc(n) calculated this time is the clipping amount Tk or more, that is, if it is necessary to quickly increase the target driving torque Toc, then the clipping amount Tk is added to the previous target driving torque Toc(n−1) so that the target driving torque Toc(n) for this time is determined from the following formula:

$$Toc(n)=Toc(n-1)+Tk$$

Thus, if the value ΔT obtained by subtracting the target driving torque Toc(n−1) calculated previously from the target driving torque Toc(n) calculated this time exceeds the clipping amount Tk, then the increase with respect to the previously calculated target driving torque Toc(n−1) is restricted by the clipping amount Tk, to thereby minimize an acceleration shock caused by the increase in the engine driving torque. This makes it possible to attain an accelerating characteristic, better than conventional one, at the time when the driver depresses the accelerator pedal.

Figure 56:
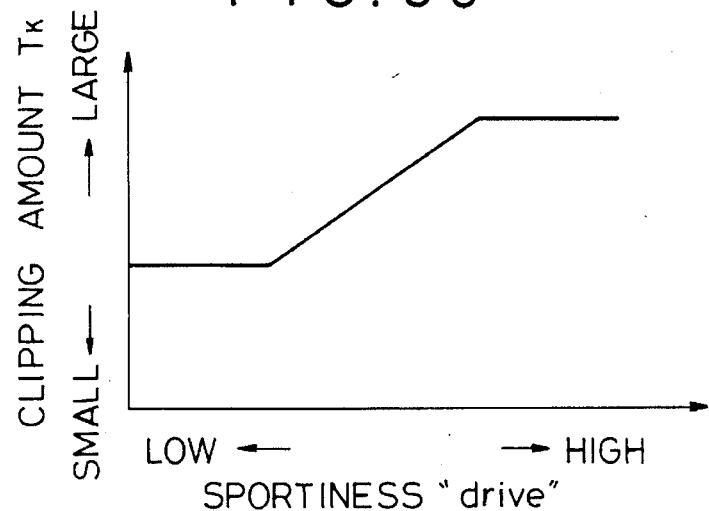
FIG. 56 is a map showing a relationship between sportiness and clipping amount.

The torque variation clipping unit 313 receives the clipping amount from a clipping amount calculating unit 314. This unit 314 calculates the clipping amount Tk from the map shown in FIG. 56, which is stored in the TCL 307 beforehand, in accordance with the sportiness "drive," which is the maneuvering state determined from the aforesaid estimating method. The calculated clipping amount Tk is output to the torque variation clipping unit 313.

Hence, in the torque variation clipping unit 313, the target driving torque Toc is restricted in accordance with the clipping amount Tk calculated according to the driver's sportiness "drive." The target driving torque Toc corrected in the torque variation clipping unit 313 is output to a throttle opening degree controlling unit 315 in the controller 15. The controlling unit 315 controls the operation of the aforesaid actuator 306 in accordance with the target driving torque Toc.

According to this embodiment, the engine output control matching the sportiness can be achieved, thus enabling sporty turning of the vehicle.

A vehicle running characteristic control method according to a tenth embodiment of the present invention will now be described.

This embodiment applies to a motorcar equipped with a suspension unit, which is capable of variably controlling the damping force, and which serves as an apparatus for variably controlling the vehicle running characteristic.

FIG. 57 shows a vehicular suspension unit. The air suspensions for the front wheels and rear wheels are denoted by reference numerals FS1, FS2, RS1, and RS2. All the air suspensions share almost the same structure; therefore, the drawing specifically shows the structure of only the air suspension RS1 of the right rear wheel.

Since the air suspensions are publicly known, only brief explanation will be given to the structures thereof. The air suspension RS1 is provided with a strut type shock absorber 401 which includes a cylinder 402, a piston 403, a piston rod 404, and a damping force switching valve 405. The controlling operation of the damping force switching valve 405 is performed by a damping force switching actuator 405a. Through this controlling operation, the cross-sectional area of a valve passage connecting a first damping chamber 406a and a second damping chamber 406b is changed, thus changing the damping force in steps. In the case of this embodiment, the shock absorber 401 has three levels of damping force, namely, soft, medium, and hard. The drive of the damping force switching actuator 405a is controlled by the controller 15. In FIG. 57, reference numerals 409a and 409b denote spring seats, and reference numeral 410 denotes a coil spring.

In connection with the selection of the damping force, the controller 15 has two modes, namely, an auto mode and a sport mode. When the controller 15 is in the auto mode, the damping force of the shock absorber 401 can be appropriately changed in the above-mentioned three steps. When the controller 15 is in the sport mode, the damping force of the shock absorber 401 is set for "hard." These modes can be selected by a changeover switch, however, they can be designed so that they may be selected in accordance with the information supplied by the aforesaid estimating means as it will be discussed later.

The air suspension RS1 is equipped with an air spring chamber 407 at the upper part of the shock absorber 401, a part thereof being defined by bellows 408. The air spring chamber 407 can be selectively connected to a pneumatic source side or to the atmospheric side through an internal passage 404a of the piston rod 404; therefore, the spring constant can be changed by supplying or discharging the air inside.

To be specific, the air in a high-pressure reservoir 415a, which is a part of the pneumatic source, can be supplied to the air spring chamber 407 via a flow control valve 419, a rear-wheel air supply solenoid valve 424, a check valve 425, and a solenoid valve 427 for right rear wheel. The air can also be supplied to the air spring chamber of the air suspension RS2 on the rear left wheel through the check valve 425 via a solenoid valve 426 for the left rear wheel. The air can be also be supplied to the air spring chambers of the air suspensions FS1 and FS2 of the right and left front wheels through the flow control valve 419 via an air supply solenoid valve 420 on the front-wheel side, a check valve 421, and solenoid valves 423 and 422.

There are two routes for discharging the air from the air suspensions RS1 and RS2 of right and left rear wheels; one route returns the discharged air from the air suspensions RS1 and RS2 of the right and left rear wheels to a low-pressure reservoir 415b via corresponding rear-wheel solenoid valves 427 and 426, a common rear-wheel exhaust valve 431, and a remaining pressure valve 432; the other route releases the discharged air to the atmosphere through the rear-wheel exhaust valve 431 via a dryer 413, an exhaust valve 430, and an air cleaner 412. Likewise, there are two routes for the air discharged from the air suspensions FS1 and FS2 of the right and left front wheels; one route returns the discharged air from the air suspensions FS1 and FS2 of the right and left front wheels to the low-pressure reservoir 415b via corresponding front-wheel solenoid valves 423 and 422, a common front-wheel exhaust valve 428, and a remaining pressure valve 429; the other route releases the discharged air to the atmosphere through the front-wheel exhaust valve 428 via the dryer 413, the exhaust valve 430, and the air cleaner 412.

In FIG. 57, reference numeral 445 denotes a compressor relay for driving a compressor 411. Reference numeral 446 denotes a pressure switch adapted to be turned ON when the pressure of the high-pressure reservoir 415a reduces to a predetermined value or less. The output signals from the compressor relay 445 and the pressure switch 446 are supplied to the controller 15 which controls the drive of the compressor 411 in accordance with these output signals. Specifically, when the pressure switch 446 is turned ON, the controller 15 actuates the compressor 411 to supply compressed air to the high-pressure reservoir 415a via the dryer 413. Hence, the pressure of the high-pressure reservoir 415a is maintained at a predetermined value or higher. The pressure of the low-pressure reservoir 415b is also monitored by a pressure switch 418. When the pressure of the low-pressure reservoir 415b exceeds a preset pressure, causing the pressure switch 418 to turn ON, a compressor 416 is actuated by a compressor relay 417.

In FIG. 57, the routes for supplying the compressed air from the high-pressure reservoir 415a to the air suspensions are indicated by solid-line arrows, while the routes for discharging air from the air suspensions are indicated by broken-line arrows.

Connected to the controller 15 are various sensors in addition to the aforesaid pressure switches and compressor relays. Such sensors include an indicator 440 for indicating an oil pressure, a steering wheel angle sensor 441 for detecting the steering wheel angle of the steering wheel 4, a throttle opening degree sensor 444 for detecting the opening degree of the engine throttle valve, i.e., the opening degree of the throttle, a vehicle speed sensor 438 built in a speedometer for detecting the vehicle speed, a lateral acceleration sensor 439, e.g., of a differential transformer type for detecting the lateral acceleration applied to the vehicle body, and an engine speed sensor 447 for detecting the engine speed.

The controller 15 has functions of changing the aforesaid damping force of the air suspensions and the spring constants of the air springs to effect control, by which the rolling of the vehicle body caused when the vehicle turns is minimized, in response to the signals received from the aforesaid sensors. For a standard road surface, i.e., a flat road surface, the damping forces of the air suspensions are set for "soft," and the spring constant of the air springs is set for a predetermined value.

The controller 15, which receives the information on the road traffic conditions and maneuvering states determined by the estimating method discussed previously, effects changeover between the auto mode and the sport mode in accordance with the received information.

The characteristics map shown in Table 10 is stored in the memory of the controller 15 beforehand. The controller 15 selects the mode in accordance with this map.

TABLE 10

| Road Traffic Condition | Maneuvering State | | |
| --- | --- | --- | --- |
| | Leisurely | Average | Sporty |
| Expressway | Auto | Auto | Sport |
| Mountainous road | Auto | Auto | Sport |
| City Road | Auto | Auto | Sport |
| Jammed Road | Auto | Sport | Sport |

Of the city road degree, the jammed road degree, and the mountainous road degree (0 to 100%) calculated as the road traffic conditions according to the aforementioned estimating method, and the expressway degrees obtained by subtracting the city road degree from "100," the one having the largest value is selected as an optimum road traffic condition. The sportiness indicative of the maneuvering state, is classified into three levels, namely, leisurely, average, and sporty.

When the maneuvering state is sporty, the controller 15 sets the mode to the sport mode. The controller 15 sets the mode to the sport mode also when the driving state is average and the road traffic condition is the mountainous road. In other cases, the controller 15 sets the mode to the auto mode.

According to the suspension unit described above, the damping force of the air suspensions can be set to an optimum level in accordance with the road traffic condition and the driver's maneuvering state, thus accomplishing good riding comfort throughout the travel.

The present invention is not limited to the foregoing embodiments, but may be modified in various manners.

For instance, in the embodiments in connection with the estimating method, the vehicle speed, the opening degree of the accelerator, and the longitudinal acceleration and lateral acceleration are used as the parameters for which detection of the frequency distributions (frequency analyses) is to be made, and the mean values and variances of the frequency distributions are used as the parameters to be input to the neural network. However, it is not essential to use all of these parameters in carrying out the estimating method of the present invention. Other parameters may be used.

In the embodiments, the parameters indicative of the road traffic condition are determined using the fuzzy inference, however, this is not essential.

In the embodiments related to the vehicle running characteristic control method, the weighted total sum of the parameters, which parameters are supplied to the controller 15 serving as the neural network, is determined as the output parameter from the neural network, so as to easily accomplish the neural network function by the controller 15. However, the output parameter may alternatively be determined, by subjecting the weighted total sum of the input parameters to nonlinear conversion in the neural network.

Further, the controller 15 may be provided in each controlling apparatus.

Moreover, in the embodiments, explanations have been given to cases wherein the vehicle running characteristic is controlled, by adjusting the operating characteristic of the 4-wheel steering unit (rear-wheel steering unit), power steering unit, automatic transmission, traction controller, or suspension unit. However, the present invention can be applied to a vehicle equipped with various apparatuses, capable of variably adjusting the vehicle running characteristic, other than the above apparatuses.

From the above-described embodiments of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the invention as defined solely by the appended claims.

What is claimed is:

1. A method for estimating a vehicle maneuvering state, comprising the steps of:

(a) detecting a plurality of vehicle driving parameters;

(b) carrying out a frequency analysis of each of said plurality of vehicle driving parameters, said step (b) including determining a frequency distribution of each of said vehicle driving parameters, and determining a plurality of types of analysis values for each of said vehicle driving parameters, said plurality of types of analysis values characterizing said frequency distribution; and (c) estimating a vehicle maneuvering state intended by a driver in accordance with results of the frequency analyses, said step (c) including outputting an output parameter, indicative of the vehicle maneuvering state, in accordance with a weighted total sum of input parameters, in parallel with each other, defined by said plurality of types of analysis values for each of said vehicle driving parameters.

2. The method for estimating a vehicle maneuvering state according to claim 1, wherein said step (b) includes determining a mean value and variance of the frequency distribution on each of said vehicle driving parameters, as said plurality of types of analysis values.

3. A method for estimating a vehicle maneuvering state, comprising the steps of:

(a) detecting a plurality of vehicle driving parameters;

(b) carrying out a frequency analysis on each of said plurality of vehicle driving parameters, said step (b) including determining a frequency distribution of each of said vehicle driving parameters, and determining at least one analysis value of each of said vehicle driving parameters, said at least one analysis value characterizing said frequency distribution;

(c) estimating a vehicle maneuvering state intended by a driver in accordance with results of the frequency analyses; and (d) outputting at least one estimated value independently of step (c), the at least one estimated value being determined using at least one of the detected vehicle driving parameters of step (a) and being indicative of a road traffic condition under which a vehicle is traveling, said step (c) including outputting an output parameter, indicative of the vehicle maneuvering state, in accordance with a weighted total sum of input parameters, defined by said at least one estimated value indicative of the road traffic condition and said at least one analysis value for each of said vehicle driving parameters.

4. The method for estimating a vehicle maneuvering state according to claim 3, wherein said step (b) includes determining a mean value and variance of the frequency distribution on each of said vehicle driving parameters, as said at least one analysis value.

5. The method for estimating a vehicle maneuvering state according to claim 3, wherein said step (d) includes outputting said at least one estimated value in accordance with at least one of the detected vehicle driving parameters and a plurality of preset fuzzy rules.

6. The method for estimating a vehicle maneuvering state according to claim 3, wherein said step (d) includes outputting a city area degree and a jammed road degree, as said at least one estimated value, in accordance with an average speed and a traveling time ratio, each calculated from at least one of the detected vehicle driving parameters of step (a).

7. The method for estimating a vehicle maneuvering state according to claim 3, wherein said step (d) includes outputting a mountainous road degree, as said at least one estimated value, in accordance with an average lateral acceleration calculated from at least one of the detected vehicle driving parameters of step (a).

8. The method for estimating a vehicle maneuvering state according to claim 1 or 3, wherein said step (a) includes detecting a vehicle speed, an opening degree of an accelerator, and a longitudinal vehicular acceleration, as said plurality of vehicle driving parameters.

9. The method for estimating a vehicle maneuvering state according to claim 1 or 3, wherein said step (b) includes determining said frequency distribution by changing percentage of a detected value of each said vehicle driving parameter in dependence of a relationship between the detected value and a predetermined value.

10. The method for estimating a vehicle maneuvering state according to claim 1 or 3, wherein said step (c) includes determining said output parameter by supplying said input parameters to a neural network.

11. The method for estimating a vehicle maneuvering state according to claim 1 or 3, wherein said output parameter indicates a degree of driving sportiness of the driver.

12. A method for controlling a vehicle running characteristic, comprising the steps of:

(a) detecting a plurality of vehicle driving parameters;

(b) carrying out a frequency analysis on each of said plurality of vehicle driving parameters, said step (b) including determining a frequency distribution of each of said vehicle driving parameters, and determining a plurality of types of analysis values for each of said vehicle driving parameters, the plurality of types of analysis values characterizing said frequency distribution;

(c) estimating a vehicle maneuvering state, intended by a driver, in accordance with results of the frequency analyses, said step (c) including outputting an output parameter, indicative of the vehicle maneuvering state, in accordance with a weighted total sum of input parameters, in parallel with each other, defined by said plurality of types of analysis values for each of said vehicle driving parameters; and (d) variably controlling a running characteristic of the vehicle by variably controlling an operating characteristic of an apparatus mounted on the vehicle in accordance with said estimated vehicle maneuvering state.

13. A method for controlling a vehicle running characteristic, comprising the steps of:

(a) detecting a plurality of vehicle driving parameters;

(b) carrying out a frequency analysis on each of said plurality of vehicle driving parameters, said step (b) including determining a frequency distribution of each of said vehicle driving parameters, and determining at least one analysis value for each of said vehicle driving parameters, said at least one analysis value characterizing said frequency distribution;

(c) estimating a vehicle maneuvering state, intended by a driver, in accordance with results of the frequency analyses;

(d) variably controlling a running characteristic of the vehicle by variably controlling an operating characteristic of an apparatus mounted on the vehicle in accordance with said estimated vehicle maneuvering state; and (e) outputting at least one estimated value independently of step (c), the at least one estimated value being determined using at least one of the detected vehicle driving parameters of step (a) and being indicative of a road traffic condition under which the vehicle is traveling, said step (c) including outputting an output parameter, indicative of the vehicle maneuvering state, in accordance with a weighted total sum of input parameters defined by said at least one estimated value of the road traffic condition and said at least one analysis value for each of said vehicle driving parameters.

14. The method for controlling a vehicle running characteristic according to claim 12 or 13, wherein said step (d) includes variably controlling an operating characteristic of a rear-wheel steering apparatus, which serves as said apparatus mounted on the vehicle and which sets a target rear-wheel steering angle by multiplying a value indicative of a front-wheel steering state or a value indicative of a vehicle behavior by a coefficient, by variably controlling said coefficient in accordance with said output parameter.

15. The method for controlling a vehicle running characteristic according to claim 12 or 13, wherein said step (d) includes variably controlling a steering reaction force vs. vehicle speed characteristic of a power steering unit in accordance with said output parameter, the power steering unit serving as said apparatus mounted on the vehicle and changing a steering reaction force in accordance with vehicle speed, detected as a vehicle driving parameter in step (a).

16. The method for controlling a vehicle running characteristic according to claim 12 or 13, wherein said step (d) includes variably setting a speed change map in accordance with said output parameter, the map being based on vehicle speed and throttle opening degree and being provided for an automatic transmission, which serves as said apparatus mounted on the vehicle.

17. The method for controlling a vehicle running characteristic according to claim 12 or 13, wherein said step (d) includes variably controlling an operating characteristic of a traction control unit, which serves as said apparatus mounted on the vehicle and which restricts an engine output to a target driving torque based on a turning state of the vehicle, detected as a vehicle driving parameter in step (a), and also restricts a variation amount of target driving torque to a predetermined amount, by variably controlling said predetermined amount in accordance with said output parameter.

18. The method for controlling a vehicle running characteristic according to claim 12 or 13, wherein said step (d) includes switchingly controlling of a damping force or a spring constant of a suspension unit in accordance with said output parameter, said suspension unit being of a variable damping force or variable spring constant type and serving as said apparatus mounted on the vehicle.

19. An apparatus for estimating a vehicle maneuvering state, comprising:

a driving parameter detecting means for detecting a plurality of vehicle driving parameters;

a frequency analyzing means for carrying out frequency analysis on each of said plurality of vehicle driving parameters, for determining a frequency distribution of each of said vehicle driving parameters and for determining a plurality of types of analysis values for each of said vehicle driving parameters, the plurality of types of analysis values characterizing said frequency distribution; and a vehicle maneuvering state estimating means for estimating a vehicle maneuvering state intended by a driver in accordance with results of the frequency analyses, and for outputting an output parameter, indicative of the vehicle maneuvering state, in accordance with a weighted total sum of input parameters, input in parallel with each other, defined by said plurality of types of analysis values for each of said vehicle driving parameters.

20. The apparatus for estimating a vehicle maneuvering state according to claim 19, wherein said frequency analyzing means determines a mean value and variance of the frequency distribution for each of said vehicle driving parameters, as said plurality of types of analysis values.

21. An apparatus for estimating a vehicle maneuvering state, comprising:

a driving parameter detecting means for detecting a plurality of vehicle driving parameters;

a frequency analyzing means for carrying out frequency analysis on each of said plurality of vehicle driving parameters, for determining a frequency distribution of each of said vehicle driving parameters and for determining at least one analysis value for each of said vehicle driving parameters, said at least one analysis value characterizing said frequency distribution;

a road traffic condition estimating means for outputting at least one estimated value independently of an estimated vehicle maneuvering state, the at least one estimated value being determined using at least one of the detected vehicle driving parameters and being indicative of a road traffic condition under which a vehicle is traveling; and a vehicle maneuvering state estimating means for estimating a vehicle maneuvering state intended by a driver in accordance with results of the frequency analyses, and for outputting an output parameter, indicative of the vehicle maneuvering state, in accordance with a weighted total sum of input parameters, defined by said estimated value of the road traffic condition and said at least one analysis value for each of said vehicle driving parameters.

22. The apparatus for estimating a vehicle maneuvering state according to claim 21, wherein said frequency analyzing means determines a mean value or variance of the frequency distribution for each of said vehicle driving parameters, as said at least one analysis value.

23. The apparatus for estimating a vehicle maneuvering state according to claim 21, wherein said road traffic condition estimating means outputs said at least one estimated value in accordance with at least one of the detected vehicle driving parameters and a plurality of preset fuzzy rules.

24. The apparatus for estimating a vehicle maneuvering state according to claim 21, wherein said road traffic condition estimating means outputs a city area degree and a jammed road degree, as said at least one estimated value, in accordance with an average speed and a traveling time ratio, each calculated from at least one of the detected vehicle driving parameters.

25. The apparatus for estimating a vehicle maneuvering state according to claim 21, wherein said road traffic condition estimating means outputs a mountainous road degree, as said at least one estimated value, in accordance with an average lateral acceleration calculated from at least one of the detected vehicle driving parameters.

26. The apparatus for estimating a vehicle maneuvering state according to claim 19 or 21, wherein said driving parameter detecting means detects a vehicle speed, an opening degree of an accelerator, and a longitudinal vehicular acceleration, as said plurality of vehicle driving parameters.

27. The apparatus for estimating a vehicle maneuvering state according to claim 19 or 21, wherein said frequency analyzing means determines said frequency distribution by changing percentage of a detected value of each said vehicle driving parameter in dependence of a relationship between the detected value and a predetermined value.

28. The apparatus for estimating a vehicle maneuvering state according to claim 19 or 21, wherein said vehicle maneuvering state estimating means determines said output parameter by supplying said input parameters to a neural network.

29. The apparatus for estimating a vehicle maneuvering state according to claim 19 or 22, wherein said output parameter indicates driving sportiness of a driver.

30. An apparatus for controlling a vehicle running characteristic, comprising:

a driving parameter detecting means for detecting a plurality of vehicle driving parameters;

a frequency analyzing means for carrying out frequency analysis on each of said plurality of vehicle driving parameters, for determining a frequency distribution of each of said vehicle driving parameters and for determining a plurality of types of analysis values for each of said vehicle driving parameters, the plurality of types of analysis values characterizing said frequency distribution;

a vehicle maneuvering state estimating means for estimating a vehicle maneuvering state intended by a driver in accordance with results of the frequency analyses, and for outputting an output parameter, indicative of the vehicle maneuvering state, in accordance with a weighted total sum of input parameters, input in parallel with each other, defined by said plurality of types of analysis values for each of said vehicle driving parameters; and a characteristic controlling means for variably controlling a running characteristic of the vehicle by variably controlling an operating characteristic of an apparatus mounted on the vehicle in accordance with said estimated vehicle maneuvering state.

31. An apparatus for controlling a vehicle running characteristic, comprising:

a driving parameter detecting means for detecting a plurality of vehicle driving parameters;

a frequency analyzing means for carrying out frequency analysis on each of said plurality of vehicle driving parameters, for determining a frequency distribution of each of said vehicle driving parameters and for determining at least one analysis value of each of said vehicle driving parameters, said at least one analysis value characterizing said frequency distribution;

a road traffic state estimating means for outputting at least one estimated value independently of an estimated vehicle maneuvering state, the at least one estimated value being determined using at least one of the detected vehicle driving parameters and being indicative of a road traffic condition under which a vehicle is traveling;

a vehicle maneuvering state estimating means for estimating a vehicle maneuvering state intended by a driver in accordance with results of the frequency analyses and for outputting an output parameter, indicative of the vehicle maneuvering state, in accordance with a weighted total sum of input parameters, defined by said at least one estimated value of road traffic condition and said at least one analysis value for each of said vehicle driving parameters; and a characteristic controlling means for variably controlling a running characteristic of the vehicle by variably controlling an operating characteristic of an apparatus mounted on the vehicle in accordance with said estimated vehicle maneuvering state.

32. The apparatus for controlling a vehicle running characteristic according to claim 30 or 31, wherein said characteristic controlling means variably controls an operating characteristic of a rear-wheel steering unit, which serves as said apparatus mounted on the vehicle and which sets a target rear-wheel steering angle by multiplying a value indicative of a front-wheel steering state or a value indicative of vehicle behavior by a coefficient, by variably controlling said coefficient in accordance with said output parameter.

33. The apparatus for controlling a vehicle running characteristic according to claim 30 or 31, wherein said characteristic controlling means variably controls a steering reaction force vs. vehicle speed characteristic of a power steering unit in accordance with said output parameter, the power steering unit serving as said apparatus mounted on the vehicle and changing the steering reaction force in accordance with vehicle speed detected as a vehicle driving parameter.

34. The apparatus for controlling a vehicle running characteristic according to claim 30 or 31, wherein said characteristic controlling means variably sets a speed change map in accordance with said output parameter, the map being based on vehicle speed and throttle opening degree and being provided for an automatic transmission, which serves as said apparatus mounted on the vehicle.

35. The apparatus for controlling a vehicle running characteristic according to claim 30 or 31, wherein said characteristic controlling means variably controls an operating characteristic of a traction control unit, which serves as said apparatus mounted on the vehicle, which restricts an engine output to a target driving torque based on a turning state of the vehicle, detected as a vehicle driving parameter, and which restricts a variation amount of target driving torque to a predetermined amount, by controlling said predetermined amount in accordance with said output parameter.

36. The apparatus for controlling a vehicle running characteristic according to claim 30 or 31, wherein said characteristic controlling means variably controls a damping force or a spring constant of a suspension unit in accordance with said output parameter, said suspension unit being of a variable damping force or variable spring constant type and serving as said apparatus mounted on the vehicle.

* * * * *